United States Patent [19]

Barrett et al.

[11] Patent Number: 6,005,597
[45] Date of Patent: Dec. 21, 1999

[54] METHOD AND APPARATUS FOR PROGRAM SELECTION

[75] Inventors: David S. Barrett, Needham; Gillian M. Lee, Cambridge; Scott N. Miller, Winchester; M. O. S. C. Jasba Simpson, Cambridge, all of Mass.; Eric D. Rosenthal, Freehold, N.J.

[73] Assignee: Disney Enterprises, Inc., Burbank, Calif.

[21] Appl. No.: 08/958,656

[22] Filed: Oct. 27, 1997

[51] Int. Cl.[6] ...................................................... H04N 7/00
[52] U.S. Cl. .................................. 348/1; 348/2; 348/564; 348/10; 455/2
[58] Field of Search .................................. 348/564, 1, 7, 348/10, 12; 455/2

[56] References Cited

U.S. PATENT DOCUMENTS

| | | |
|---|---|---|
| 4,740,834 | 4/1988 | Mobarry . |
| 4,769,697 | 9/1988 | Gilley et al. . |
| 4,955,070 | 9/1990 | Welsh et al. . |
| 5,047,867 | 9/1991 | Strubbe et al. . |
| 5,075,771 | 12/1991 | Hashimoto . |
| 5,179,439 | 1/1993 | Hashimoto . |
| 5,223,924 | 6/1993 | Strubbe . |
| 5,251,324 | 10/1993 | McMullan, Jr. . |
| 5,289,271 | 2/1994 | Watson . |
| 5,323,240 | 6/1994 | Amano et al. . |
| 5,351,075 | 9/1994 | Herz et al. . |
| 5,374,951 | 12/1994 | Welsh . |
| 5,410,344 | 4/1995 | Graves . |
| 5,421,031 | 5/1995 | De Bey . |
| 5,444,499 | 8/1995 | Saitoh . |
| 5,465,113 | 11/1995 | Gilboy . |
| 5,469,206 | 11/1995 | Strubbe et al. . |
| 5,483,278 | 1/1996 | Strubbe et al. . |
| 5,534,911 | 7/1996 | Levitan . |
| 5,541,638 | 7/1996 | Story . |
| 5,564,088 | 10/1996 | Saitoh . |
| 5,596,373 | 1/1997 | White et al. . |
| 5,635,978 | 6/1997 | Alten ............................................ 348/7 |
| 5,635,989 | 6/1997 | Rothmuller .............................. 348/563 |
| 5,734,720 | 3/1998 | Salganicoff .............................. 380/20 |

*Primary Examiner*—Andrew I. Faile
*Assistant Examiner*—Reuben M. Brown
*Attorney, Agent, or Firm*—Hecker & Harriman

[57] ABSTRACT

The present invention comprises a method and apparatus for television program selection that monitors the viewing preferences of a viewer to create a dynamic viewer profile that is used to rate available programs. Based on the viewer profile, available programs are sorted and presented to the viewer in descending order of predicted interest. The invention allows a viewer to quickly find the program of greatest interest to the viewer without having to tediously search through large numbers of available programs. The invention may also be used for selecting from among a plurality of programs other than television programs, such as, for example, radio programs or audio or video programs stored on digital storage media such as CD's and DVD's.

37 Claims, 14 Drawing Sheets clickTV — personalized listings

[ listings ]     clickTV home   sitemap   search   [ listings ]   features   links   feedback   help

| Day | Time | Begin at ... |
|---|---|---|
| Thursday 07/17/97 | 6:00 PM - 9:00 PM | CANNBC |

Your selected lineup is Los Angeles, CA [ Select another lineup ]   Show Grid
Current time: 6:48 PM PDT

| ◄▲ | 6:00 p.m. | 6:30 p.m. | 7:00 p.m. | 7:30 p.m. | 8:00 p.m. |
|---|---|---|---|---|---|
| CANNBC | Noticias en Espanol ||||| 
| CBBM | Community Bulletin Board ||||| 
| CMTV | Signature Series || Nonstop Country (3 hr 0 min) ►► |||
| CNBC | Rivera Live || News With Brian Willams || Charles Grodin |
| CNN | Larry King Live || World Today || CNN/Sports Illustrated |
| COMEDYP | Tick | Make Me Laugh | Daily Show | Best of Comic Relief | 'Crocodile' Dundee |
| COURT | Cochran & Company || Trial Story || Prime Time Justice |
| CSN | 1950 World Series: New York Yankees vs. Philadelphia Phillies || Way It Was -- New York Yankee Dynasty || Classic Years in Sports: 1941 |
| CSPAN2 | ◄◄ (5:00 p.m.) Prime Time Public Affairs |||| Prime Time Public ►► |
| DISNEYP | Flash Forward | Torkelsons | The Rescuers |||
| ◄▼ | 6:00 p.m. | 6:30 p.m. | 7:00 p.m. | 7:30 p.m. | 8:00 p.m. |

Copyright © 1997 clickTV -- a service of TVData. All rights reserved. Hosted by WebWay

| Key Word(s) | Interest | Confidence |
|---|---|---|
| SATIRE | 0.255 | 0.211 |
| SCIENCE FICTION | 0.678 | 0.622 |
| SEINFELD (COMEDY/SATIRE) | 0.955 | 0.745 |
| SERIAL | | |
| SHOPPING | 0.144 | 0.255 |
| SILK STALKINGS (CRIME DRAMA) | | |
| SIMPSONS (ANIMATION/COMEDY) | 0.422 | 0.322 |
| SLIDERS (SCIENCE FICTION/ADVENTURE) | | |
| SOCIAL STUDIES | | |
| SPECULATION | | |
| SPEECH | | |
| SPORTS | 0.711 | 0.621 |
| STAR TREK (SCIENCE FICTION/DRAMA) | 0.655 | 0.456 |
| STAR TREK - THE NEXT GENERATION (SCIENCE FICTION/DRAMA) | 0.603 | 0.533 |
| STAR TREK - DEEP SPACE NINE (SCIENCE FICTION/DRAMA) | 0.755 | 0.774 |
| SUDDENLY SUSAN (COMEDY) | | |

FIG. 3

| Key Word(s) | Yes | No |
|---|---|---|
| SHOWS | | |
| *** | | |
| SEINFELD (COMEDY/SATIRE) | 4 | 2 |
| SILK STALKINGS (CRIME DRAMA) | | |
| SIMPSONS (ANIMATION/COMEDY) | 5 | 1 |
| SLIDERS (SCIENCE FICTION/ADVENTURE) | | |
| STAR TREK (SCIENCE FICTION/DRAMA) | 3 | 2 |
| STAR TREK - THE NEXT GENERATION (SCIENCE FICTION/DRAMA) | 4 | 1 |
| STAR TREK - DEEP SPACE NINE (SCIENCE FICTION/DRAMA) | 6 | 0 |
| SUDDENLY SUSAN (COMEDY) | 0 | 2 |
| *** | | |
| | | |
| TOPICS | | |
| *** | | |
| SATIRE | 11 | 3 |
| SCIENCE FICTION | 25 | 11 |
| SERIAL | | |
| SHOPPING | | |
| SOCIAL STUDIES | | |
| SPECULATION | | |
| SPEECH | | |
| SPORTS | 45 | 28 |
| *** | | |

FIG. 4

| KEY WORD(S) | YES | NO |
|---|---|---|
| SHOWS | | |
| *** | | |
| 1566 (15/78) | 4 | 2 |
| 1567 (18) | | |
| 1568 (6/15) | 5 | 1 |
| 1569 (79/4) | | |
| 1570 (79/23) | 3 | 2 |
| 1571 (79/23) | 4 | 1 |
| 1572 (79/23) | 6 | 0 |
| 1573 (15) | 0 | 2 |
| *** | | |
| | | |
| TOPICS | | |
| *** | | |
| 78 | 11 | 3 |
| 79 | 25 | 11 |
| 80 | | |
| 81 | | |
| 82 | | |
| 83 | | |
| 84 | | |
| 85 | 45 | 28 |
| *** | | |

FIG. 5

METHOD AND APPARATUS FOR PROGRAM SELECTION

BACKGROUND OF THE INVENTION

1. Field of the Invention

The invention relates to a method and apparatus for selecting from among a plurality of available programs, such as television programs.

2. Background Art

As new technologies are developed for providing television programming to viewers, the number of television programs available to viewers continues to increase. Broadcast television, cable television, satellite television, and other television program distribution systems such as VCR's, DVD's, and laser disks provide a viewer with the choice of hundreds and even thousands of simultaneously presented programs. With all of this programming it is difficult for a viewer to select the most desirable program from those available for viewing.

In the past, a viewer's options were limited. For example, if a viewer could receive only three or four broadcast television channels, the viewer could easily switch between channels and, within a few seconds, find the channel with the most desirable program. As the number of available channels increased, televisions with remote controls became available. Remote controls made switching between channels easier, but did nothing to filter or sort the available channels or reduce the amount of time needed to preview the available channels.

Printed television program listings have long been available that provide program schedules and brief descriptions. However, with the increasing number of available programs, it has become difficult and inconvenient to locate listings for a particular time and date and to read through all of the available program descriptions.

Chart form printed television listings have been developed that attempt to provide program information in a concise, graphical form. However, the chart form listing leaves little room to provide information about the content of a program other than its name. Further, the chart form printed listing still requires obtaining the listing, physically locating the chart for the date and time of interest, and reading through the program names for each program shown on the chart.

On-screen versions of chart form television listings have also been developed to eliminate the need for a viewer to obtain and look through a printed program guide. However, the on-screen versions of the chart form still suffer from the other disadvantages of the printed chart form listings: little information about a program other than its title is available and a viewer must still scroll through the whole chart to identify all programs of potential interest.

Certain on-screen charts have been developed that use a limited color coding scheme to indicate general categories of programs. The color coding provides some additional information about program content. However, the information available is still minimal, and a viewer must still scroll through the whole chart to find all the programs of potential interest.

More recently, internet program guides have become available. One example of a web page from an internet program guide is shown in FIG. 1. The program guide is presented in the same form as a printed chart, providing time, channel, and program name information. However, the internet program guide allows a user to obtain additional information about a program by clicking on the program's name, thereby activating a hyperlink to an additional information page. Accordingly, the online guide allows a user to obtain additional information about programs. However, it still requires excessive effort, since the viewer must click every title and go to every linked web page, and read every description, to find every available program the user might be interested in watching.

There is a need for a method and apparatus that allows a television viewer to quickly and conveniently identify the available programs in which the viewer has the greatest interest and that allows the viewer to quickly select the program of greatest interest for viewing.

SUMMARY OF THE INVENTION

The present invention comprises a method and apparatus for television program selection that monitors the viewing preferences of a viewer to create a dynamic viewer profile that is used to rate available programs. Based on the viewer profile, available programs are sorted and presented to the viewer in descending order of predicted interest. The invention allows a viewer to quickly find the program of greatest interest to the viewer without having to tediously search through large numbers of available programs.

In one embodiment, the invention monitors a viewer's television viewing habits and builds an evolving model of the viewer's viewing preferences using parameters such as the name of a program, the topic area, the date, the day of the week, and the time of day. Using the model, together with data about viewing preferences of other viewers having characteristics similar to the viewer, the invention ranks currently available programs, and presents them to the viewer in order, from the best match to worst. For example, if the viewer habitually watches "Star Trek," and if data from other viewers indicates that viewers that like "Star Trek" usually like watching science fiction, the invention will conclude that the viewer has a preference for science fiction shows. Similarly, if the viewer habitually watches "Friends," and if data from other viewers indicates that viewers that like "Friends" usually also like "Seinfeld," the invention will conclude that the viewer has a preference for "Seinfeld" as well.

The present invention obtains data about titles and topics of available television programs from a television program information source. One example is a web site on the Internet that provides TV listings and that codes programs by topics or provides descriptive information about programs. In one embodiment, the invention uses a parser to parse the descriptive program information to sort programs into categories. In one embodiment, the invention sorts the currently available programs according to the degree to which each program matches the current profile for the viewer. In one embodiment, the sort is based on the viewing preferences of the viewer according to criteria such as the date, the time of day, the day of the week, the title and/or the topic(s) of each program. In one embodiment, collaborative information from other viewers having similar viewer profiles is also used. In one embodiment, the invention presents the program choices to the viewer in order, from best match to worst. In one embodiment, the choices are presented to the user in the form of an on-screen menu. In another embodiment, the choices are presented in the form of preview windows. Using the invention, a viewer can conveniently select the most preferable program to watch from among the programs of greatest potential interest without having to search aimlessly among hundreds of channels.

BRIEF DESCRIPTION OF THE DRAWINGS

FIG. 1 shows an example of an on-line internet chart form television program listing of the prior art.

FIG. 3 shows a portion of an example viewer profile for an embodiment of the invention.

FIG. 4 shows a portion of an example viewer profile for an embodiment of the invention.

FIG. 5 shows a portion of an example viewer profile for an embodiment of the invention.

DETAILED DESCRIPTION OF THE INVENTION

A method and apparatus for television program selection is described. In the following description, numerous specific details are set forth in order to provide a more thorough understanding of the present invention. It will be apparent, however, to one skilled in the art, that the present invention may be practiced without these specific details. In other instances, well-known features have not been described in detail in order not to obscure the present invention.

Figure 2:
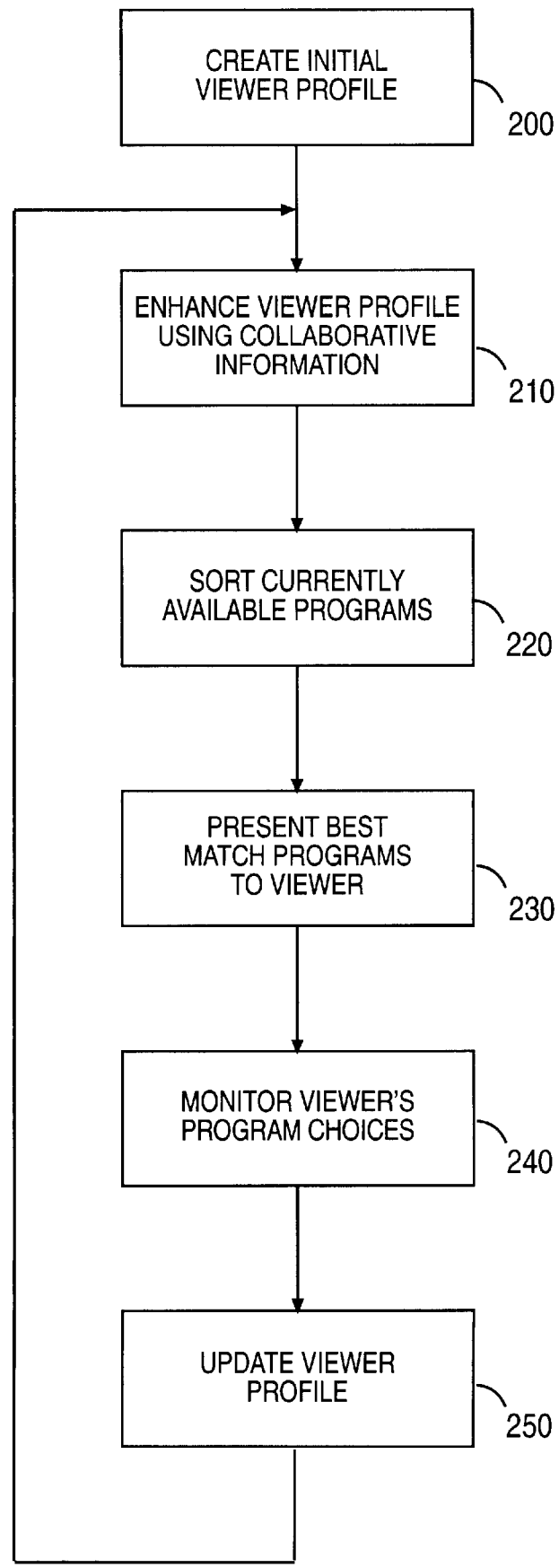
FIG. 2 is a block diagram of a process used in one embodiment of the invention.

FIG. 2 is a block diagram of a process used in one embodiment of the invention. As shown in FIG. 2, the process begins by creating an initial viewer profile of a new viewer or user at block 200 (the terms "viewer" and "user" are used interchangeably herein). The initial viewer profile may be created, for example, by presenting to the viewer, in quick succession, a selection of sample program choices and asking the viewer to indicate a "yes" or a "no" for each program choice.

At block 210 the viewer profile is compared to collaborative information. Collaborative information is information obtained from viewer profiles for other existing viewers. The viewer profiles may, for example, be stored in a viewer profile database. The collaborative information is used to augment the viewer profile by inferring program choices based on similarities with other users.

At block 220, the currently available programs are sorted based on the viewer profile as augmented by the collaborative information. The programs are sorted according to the expected amount of viewer interest in a program based, for example, on the augmented viewer profile and the identity and content of the programs.

At block 230, the highest ranking programs, which represent the programs having the best match with the viewer profile, are presented to the viewer in order of ranking. The programs may be presented to the viewer in a number of ways. In one embodiment, for example, upon turning on a television receiver, the current highest ranking program is presented to the viewer in the main viewing area of a television screen, while the next highest ranking program is shown in a smaller "picture-in-a-picture" preview window. By activating an appropriate command via a remote control device the viewer may cause successively lower ranking programs to be displayed in the main and preview windows.

At block 240, the viewer's actual program choices are monitored. These choices are used to update the viewer's viewer profile at block 250. From block 250, the process returns to block 210.

Viewer Profile

A component of one or more embodiments of the invention is a viewer profile. A viewer profile may have any of a number of specific forms, but in general contains information relating to a viewer's interest in various television programs and/or television program categories or topics. In one embodiment, the viewer profile includes a table of key words and key phrases (i.e. program names, program topics, network names, etc.), interest levels, and confidence levels. In another embodiment, the viewer profile includes separate tables for programs (shows) and for program topics (topics), as well as a tabulation of positive and negative factors for each show and topic. In one embodiment, the viewer profile contains viewer interest information for topics, only. A separate table relates programs to program topics. In one or more embodiments, the user profile is stored in electronic form in apparatus implementing the invention.

FIG. 3 shows a portion of an example viewer profile for one embodiment of the invention.

The viewer profile shown in FIG. 3 consists of a three column look-up table.

In the embodiment of FIG. 3, the first column includes key words and key phrases arranged in alphabetical order. The key words and phrases include entries for programs or shows (for example, "Seinfeld") and entries for topics (for example, "Satire"). In the embodiment of FIG. 3, an entry for a show also may identify one or more topics for the show. For example, in FIG. 3, the "Seinfeld" key word entry lists the topics "Comedy" and "Satire." Other types of key words may also be included in the viewer profile, such as, for example, television channel or network names or names of actors.

The second column of the viewer profile of FIG. 3 includes a number that represents a relative level of interest of the viewer in the item represented by the key word for a particular row. In the example of FIG. 3, the level of interest is a number between 0 and 1. For example, the level of interest listed for the topic "Science Fiction" is 0.678.

The third column of the viewer profile of FIG. 3 includes a number that represents a relative level of confidence in the level of interest value in column two. In the embodiment of FIG. 3, the level of confidence value is used with the level of interest value to obtain a value for an expectation that the viewer will choose to watch that particular show.

FIG. 4 shows a portion of an example viewer profile for a second embodiment of the invention. In the example of FIG. 4, the viewer profile is divided into separate sections for shows and for topics. As shown in FIG. 4, each section contains three columns. The first column contains a key word or key words for a show and/or topic, respectively. The second column contains numbers that represent a number of positive factors for a show or topic. In one embodiment, these positive factors are referred to as "yes votes." The third column contains numbers that represent a number of negative factors for a show or topic. In one embodiment, these negative factors are referred to as "no votes." In one embodiment, the process of obtaining values for the positive factors and the negative factors is referred to as "voting." This process is described in greater detail below in the discussion on voting. In one or more embodiments, the positive and negative factors are used during the show ranking process of the invention as is performed, for example, at block 220 of FIG. 2. This process is described in greater detail below in the discussion on show ranking.

FIG. 5 shows an alternative embodiment of the viewer profile of FIG. 4 in which the entries in the key word column have been replaced with coded, numerical values, which reduces the size of the viewer profile for storage and transmission purposes.

In the embodiments of FIGS. 3, 4 and 5 the values shown are derived from the viewer's viewing choices obtained from the viewer's input during an initial viewer profile creation process (e.g. block 200 of FIG. 2) and/or from monitoring the viewer's actual program choices (e.g. block 240 of FIG. 2). It should be noted that for certain rows there are no values. For these rows, no information has yet been obtained from the viewer. Values for these rows may be inferred from collaborative information, as will be described in greater detail below.

Voting

Figure 6:
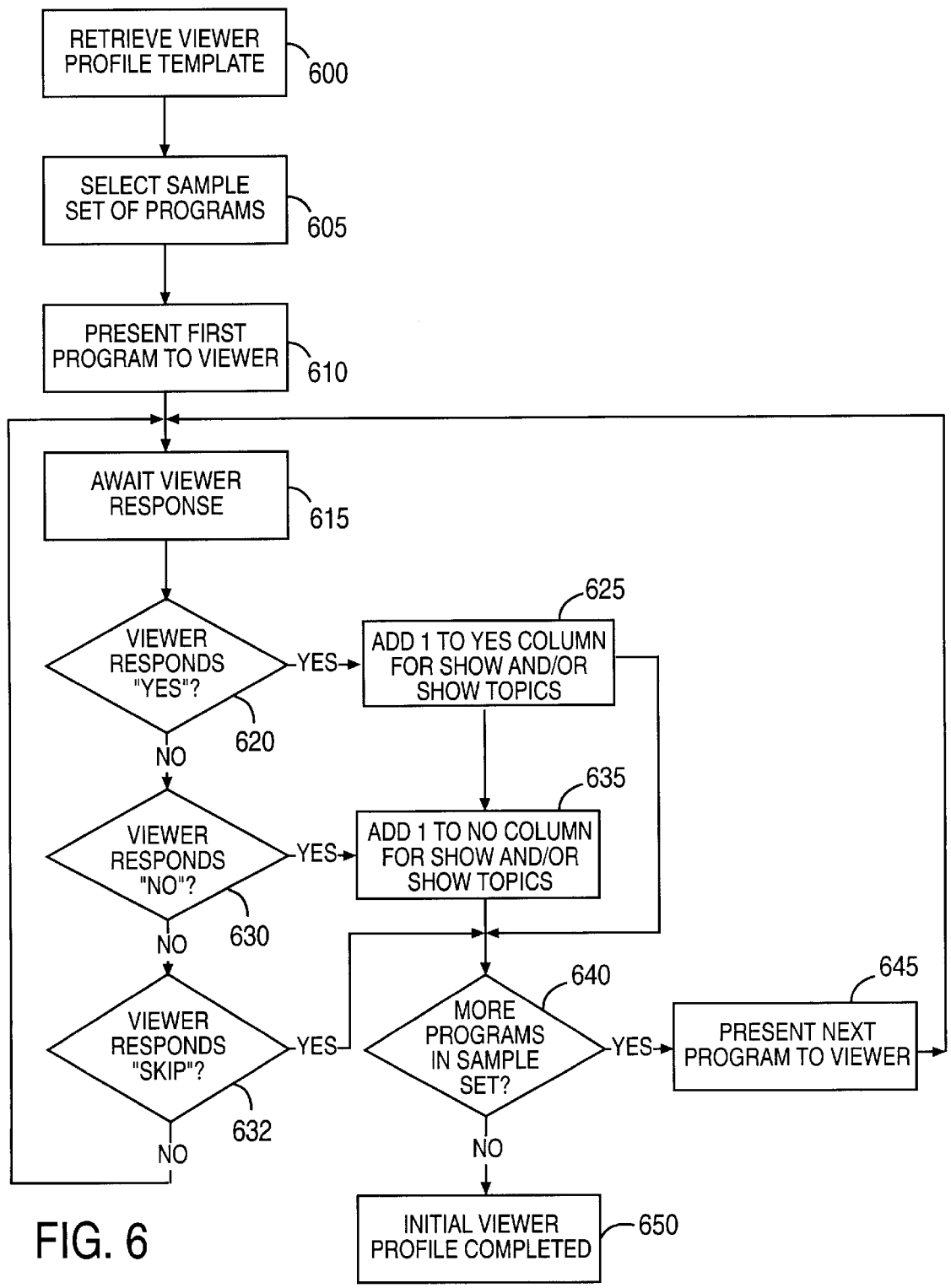
FIG. 6 is a block diagram of a voting process used in an embodiment of the invention to create an initial viewer profile.
Figure 7:
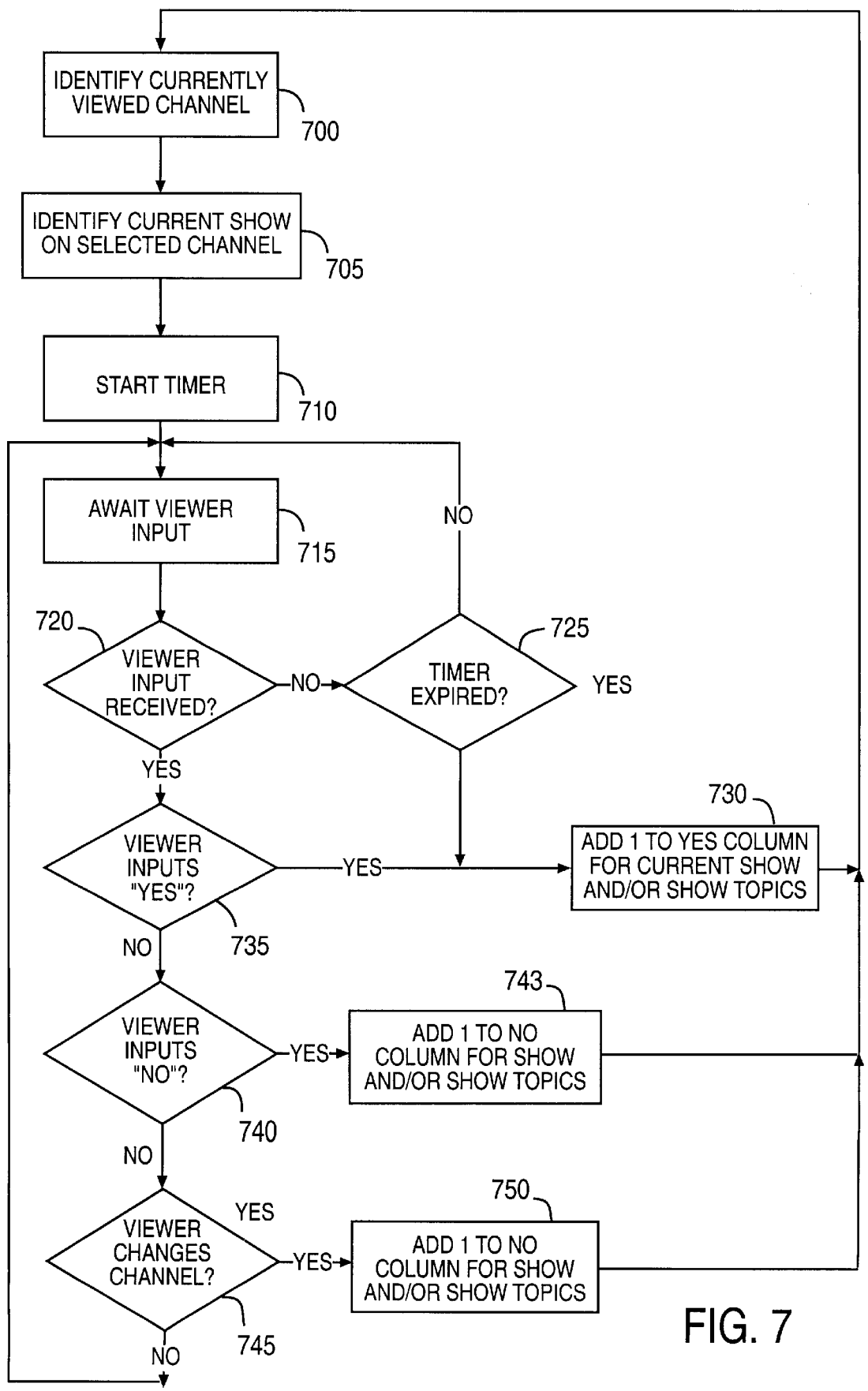
FIG. 7 is a block diagram of a voting process used in an embodiment of the invention to dynamically update a viewer profile.

Voting is a name used to refer to a process for creating and dynamically updating a viewer profile in one or more embodiments of the invention. FIGS. 6 and 7 are block diagrams showing examples of voting processes used in one embodiment of the invention.

FIG. 6 shows a voting process used to create an initial viewer profile in one or more embodiments of the invention. The initial viewer profile may be created, for example, at block 200 of the embodiment of FIG. 2.

As shown in FIG. 6, a viewer profile template is retrieved at block 600. In one embodiment, the viewer profile template is a viewer profile shell that contains entries for keywords for topics and shows but for which the values indicating degree of viewer preference (e.g. the interest and confidence values of FIG. 3, or the yes and no vote values of FIGS. 4 and 5) are blank. In one embodiment, the template is stored during manufacture in non-volatile local storage of a television receiving apparatus implementing the invention, and retrieved from local storage during the initial viewer profile creation process. In one embodiment, the template is downloaded via telephone or internet link from a central databank. In one or more embodiments, the viewer profile template also includes a list of topics for some or all listed shows. The retrieved viewer profile template forms an initially empty viewer profile to which viewer profile information is added according to the process of FIG. 6.

At block 605 a set of sample programs from the programs in the viewer profile template is selected to be used to create the initial viewer profile. In one or more embodiments, the set of sample programs is predetermined. In other embodiments, the set of sample programs is selected at run time according to predetermined criteria.

At block 610 the first program is presented to a viewer. In one or more embodiments the program title and program topics are displayed to the viewer as text on a television display, along with a prompt requesting the viewer to indicate "yes" or "no" for the program. In one or more embodiments, the viewer indicates "yes" or "no" by pushing an appropriate button on a remote control device. In one or more embodiments, the viewer may also decline to enter "yes" or "no" by pushing a "skip" button on the remote control device.

At block 615, a response from the viewer is awaited. When a response is received, a determination is made at blocks 620, 630, and 632 as to whether the response received from the viewer is a "yes", "no" or "skip" response, respectively.

If the viewer responds "yes" to the current show being presented to the user, the number of yes votes in the yes votes column for the current show is incremented by 1 at block 625 in the viewer profile being created. The number of yes votes in the yes votes column for each topic of the current show is also incremented by one at block 625. From block 625, processing proceeds to block 640.

If the viewer responds "no" to the current show being presented to the user, the number of no votes in the no votes column for the current show is incremented by 1 at block 635 in the viewer profile being created. The number of no votes in the no votes column for each topic of the current show is also incremented by one at block 635. From block 635, processing proceeds to block 640.

If the viewer responds "skip" to the current show being presented to the viewer, processing proceeds to block 640. If the viewer response is neither "yes," "no," or "skip," processing proceeds back to block 615.

At block 640 a determination is made as to whether any show remains in the set of sample shows selected for the user profile creation process. If all shows have been presented to the viewer, the initial viewer profile is complete at block 650. If one or more shows remain in the sample set, the next show in the set is presented to the viewer at block 645. From block 645, processing proceeds back to block 615.

FIG. 7 shows an embodiment of a voting process used to dynamically update a viewer profile in one or more embodiments of the invention. This process may be used, for example, at blocks 240 and 250 of the embodiment of FIG. 2.

As shown in FIG. 7, at block 700, the currently viewed channel is identified. At block 705, the current show is identified based on the current time and the current channel. In one embodiment, the current show is identified by comparing the time and channel to a schedule of shows for the current day. In one embodiment, the schedule is obtained by downloading from an online database, for example via the internet.

At block 710 a timer of predetermined length is started. In one embodiment, the predetermined length of the timer is between 5 and 20 minutes. At block 715, input from a viewer is awaited.

In one embodiment, the viewer may indicate interest in the currently displayed show by pressing a "yes" button on a remote control device, or disinterest in the show by pressing a "no" button. The viewer may also change channel, for example by pressing a "next" or "previous" button on the remote control device.

At block 720, a determination is made as to whether viewer input has been received. If no input has been received, a determination is made at block 725 as to whether the predetermined length of the timer has been exceeded.

If the timer has not expired, processing returns to block 715.

If the timer has expired, the number of yes votes in the viewer profile for the current show and/or each topic of the current show are each incremented by 1 at block 730. Processing then returns to block 710.

If it is determined at block 720 that viewer input has been received, a determination is made at blocks 735, 740 and 745 as to whether the input received is a "yes," "no," or change channel command, respectively.

If the input received from the viewer is a "yes" command, the number of yes votes in the viewer profile for the current show and/or the current show topics are each incremented by 1 at block 730. Processing then returns to block 700.

If the input received from the viewer is a "no" command, the number of no votes in the viewer profile for the current show and/or the current show topics are each incremented by 1 at block 743. Processing then returns to block 700.

If the input received from the viewer is a change channel command, the number of no votes in the viewer profile for the current show and/or the current show topics are each incremented by 1 at block 750. Processing then returns to block 700.

If the input received from the viewer is neither a "yes," "no," or change channel command, processing returns to block 715.

The viewer profile is thus continuously updated as the viewer selects shows to view.

In other embodiments, additional factors may be used to update viewer profiles. In one embodiment, for example, votes for topics and/or shows are automatically decremented over time according to some predetermined criteria. In one embodiment, votes for shows and/or topics are decremented by a preset amount per day. In one embodiment, votes for shows and/or topics are reduced by a predetermined percentage every week.

Determining of Program Interest/Scoring

Information in a viewer profile is used to obtain an estimated measure ("score") of the viewer's predicted interest in currently available programs so as to be able to rank the available programs in order of predicted viewer interest. Any of a large variety of well known analytical techniques can be used.

Figure 8:
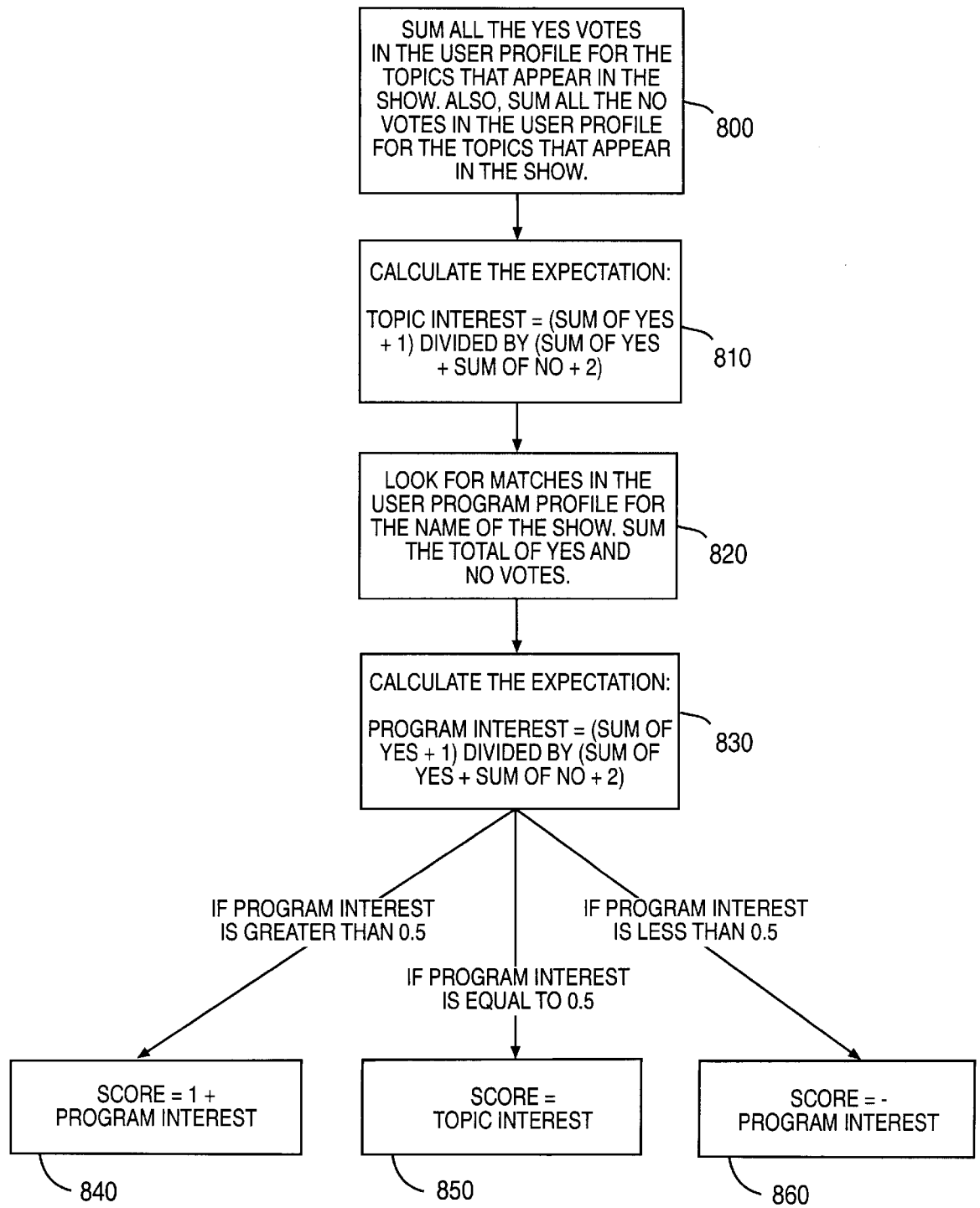
FIG. 8 is a block diagram of an embodiment of a process that is used for determining viewer's program interest or "score" for a program in one or more embodiments of the invention.

FIG. 8 is a block diagram of an embodiment of a process that is used for determining viewer's program interest or "score" for a program in one or more embodiments of the invention. In the embodiment of FIG. 8, the yes votes and the no votes for all topics in the program being scored are separately summed at block 800. Using these sums, the viewer's expected "topic interest" for the show is calculated at block 810. In the embodiment of FIG. 8, the expected topic interest is calculated using the expression:

$$\text{Topic Interest} = \frac{(\text{sum of yes votes for each topic} + 1)}{(\text{sum of yes votes for each topic} + \text{sum of no votes for each topic} + 2)}$$

At block 820, a search is made for the name of the program in the viewer profile. If a match for the program is found, the sum of yes votes and the no votes for the program are obtained from the viewer profile. If no match for the program name is found, the sum of yes votes and the sum of no votes for the program are each deemed to be equal to zero.

Using these sums, the viewer's expected "program interest" for the show is calculated at block 830. In the embodiment of FIG. 8, the expected program interest is calculated using the expression:

$$\text{Program Interest} = \frac{(\text{sum of yes votes for program} + 1)}{(\text{sum of yes votes for program} + \text{sum of no votes for program} + 2)}$$

As shown in FIG. 8, the value obtained for the program interest is used to select the method used to determine the program's score. If the value of the program interest is greater than 0.5, as shown in block 840, the expression used to calculate the score for the program is:

Score=1+Program Interest

If the value of the program interest equals 0.5 (which occurs, for example, when no match for the program name is found in the viewer profile), as shown in block 850, the expression used to calculate the score for the program is:

Score=Topic Interest

If the value of the program interest is less than 0.5, as shown in block 860, the expression used to calculate the score for the program is:

Score=−(Program Interest)

It will be apparent to those skilled in the art that other methods may be used to calculate program scores.

Collaborative Information

Collaborative information is information that may be used to augment a viewer's viewer profile. In one or more embodiments of the invention collaborative information is used to provide information for programs and topics for which viewer preference information is currently absent in the viewer profile. Collaborative information may, for example, be obtained from viewer profiles of other viewers that have viewing profiles similar to the viewer profile of the viewer whose profile is being augmented.

Collaborative information may also be obtained from composite or simulated viewer profiles or from templates of topics and programs related to specific interest areas or to general viewing habits. Such templates may be compiled from actual viewer preference data, may be generated using the subjective reasoning of the person generating the template, or may be compiled in some other manner. A template may relate to topics, shows, or both. In one or more embodiments, the use of a particular template to augment a viewer profile is triggered by the existence of preferences for one or more particular topics or shows in the viewer profile being augmented.

For example, there may be a "Friends/Seinfeld" template that is used to augment a viewer's viewer profile when the viewer profile (prior to being augmented) indicates that the viewer has a viewing preference for both "Seinfeld" and "Friends." The "Friends/Seinfeld" template contains a list of other shows and/or show categories or topics that it is anticipated would be of interest to a viewer who likes "Seinfeld" and "Friends." For example, the template may indicate that viewers who exhibit a preference for "Seinfeld" and "Friends" are expected to like other shows, such as "Frasier," "The Simpsons" and "Saturday Night Live," as well. Accordingly, if a viewer profile indicates a preference for "Seinfeld" and "Friends," the viewer profile is augmented by adding preferences for "Frasier," "The Simpsons" and "Saturday Night Live," and any other show or topic listed in the template but absent from the viewer profile. A template may also indicate a relative degree of correlation between the shows and/or topics in the template shows and/or topics that trigger use of the template by indicating relative strengths of preferences for the items listed in the template. For example, the "Friends/Seinfeld" template may specify that the preference for "Frasier" is greater than the preference for "The Simpsons." Accordingly, when the viewer profile is augmented, a greater preference value is added for "Frasier" than for "The Simpsons."

In one or more embodiments, the collaborative information comprises data from a collaborative viewer profile obtained from a database of viewer profiles. In one or more embodiments, collaborative information is periodically obtained by selecting a best matching collaborative profile from a database of viewer profiles, based on information contained in the viewer's viewer profile. In one embodiment, a collaborative information is obtained once a day.

Figure 9:
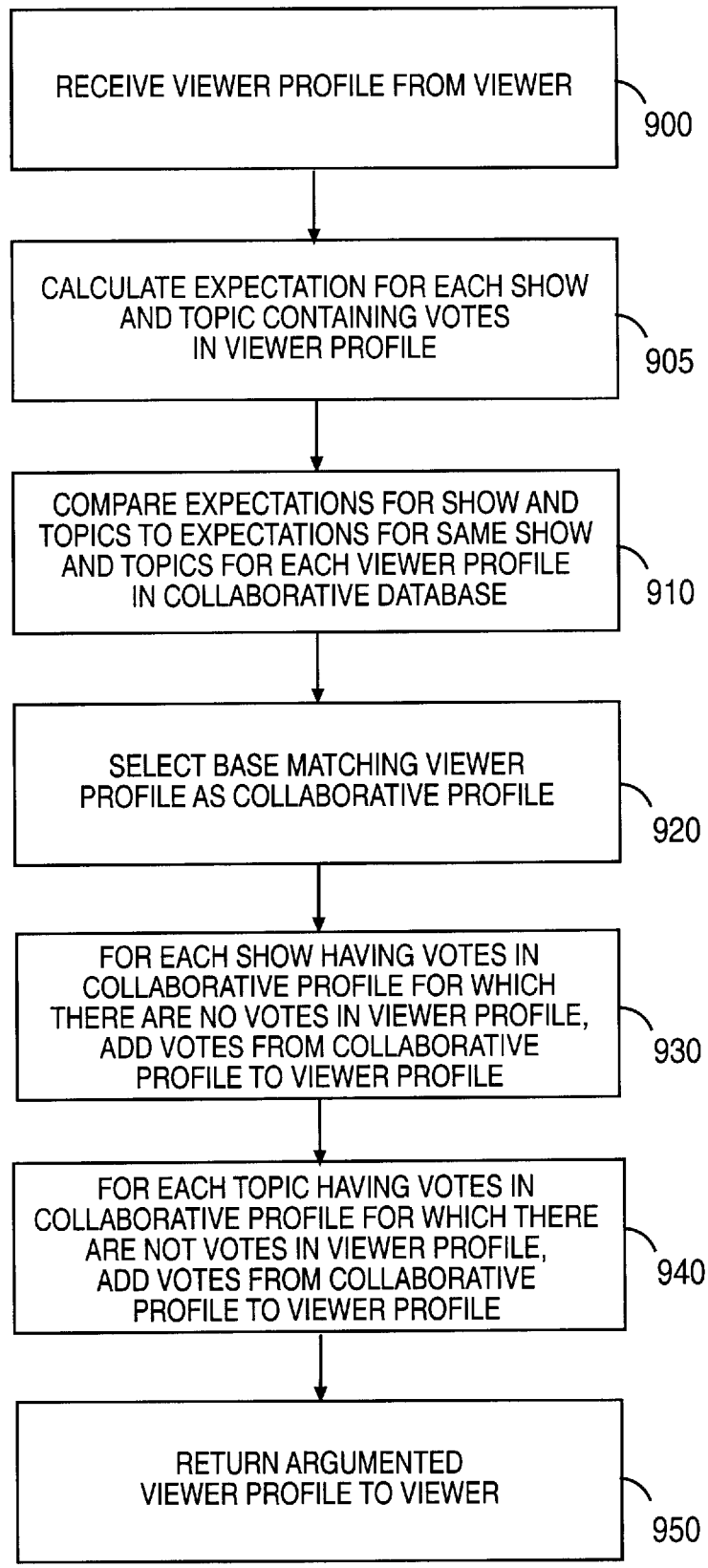
FIG. 9 is a block diagram of a process used to obtain collaborative information in an embodiment of the invention.

FIG. 9 is a block diagram of a process used to obtain collaborative information in an embodiment of the invention. In one embodiment, the process of FIG. 9 is performed at a server computer with which television receiver apparatus at the viewer's site is in periodic electronic communication. The process of FIG. 9 may be performed, for example, at block 210 of FIG. 2.

In the process of FIG. 9, a viewer profile is received from a viewer at block 900. An expectation for each show and each topic for which votes are contained in the viewer profile are calculated at block 905. In one embodiment, an expression used to calculate the expectations is:

$$\text{Expectation for program or topic} = \frac{(\text{sum of yes votes} + 1)}{(\text{sum of yes votes} + \text{sum of no votes} + 2)}$$

At block 910, the expectations for each show and topic in the viewer profile are compared to the expectations for the same shows and topics calculated in the same manner for each viewer profile in the collaborative database. In one embodiment, the comparison between the viewer profile and a collaborative viewer profile is made by determining the difference between the expectation calculated for the viewer profile and the expectation calculated for the collaborative profile for each show and topic in the viewer profile, and then summing the absolute values of each of those differences.

At block 920, the best matching (according to predetermined criteria) viewer profile from the database of collaborative viewer profiles is selected as the collaborative viewer profile. In one embodiment, for example, the collaborative viewer profile for which the sum of the absolute value of the differences between expectations for the viewer profile and the collaborative profile is a minimum is selected as the collaborative viewer profile.

At blocks 930 and 940 information in the collaborative profile is used to augment the viewer profile.

At block 930, the yes and no votes for each show for which there are votes in the collaborative profile but not in the viewer profile are added to the viewer profile. If necessary, the name of any such show is also added to the viewer profile.

At block 940, the yes and no votes for each topic for which there are votes in the collaborative profile but not in the viewer profile are added to the viewer profile. If necessary, the name of any such topic is also added to the viewer profile.

At block 950, the augmented viewer profile is returned to the viewer.

Sorting Programs

Figure 10:
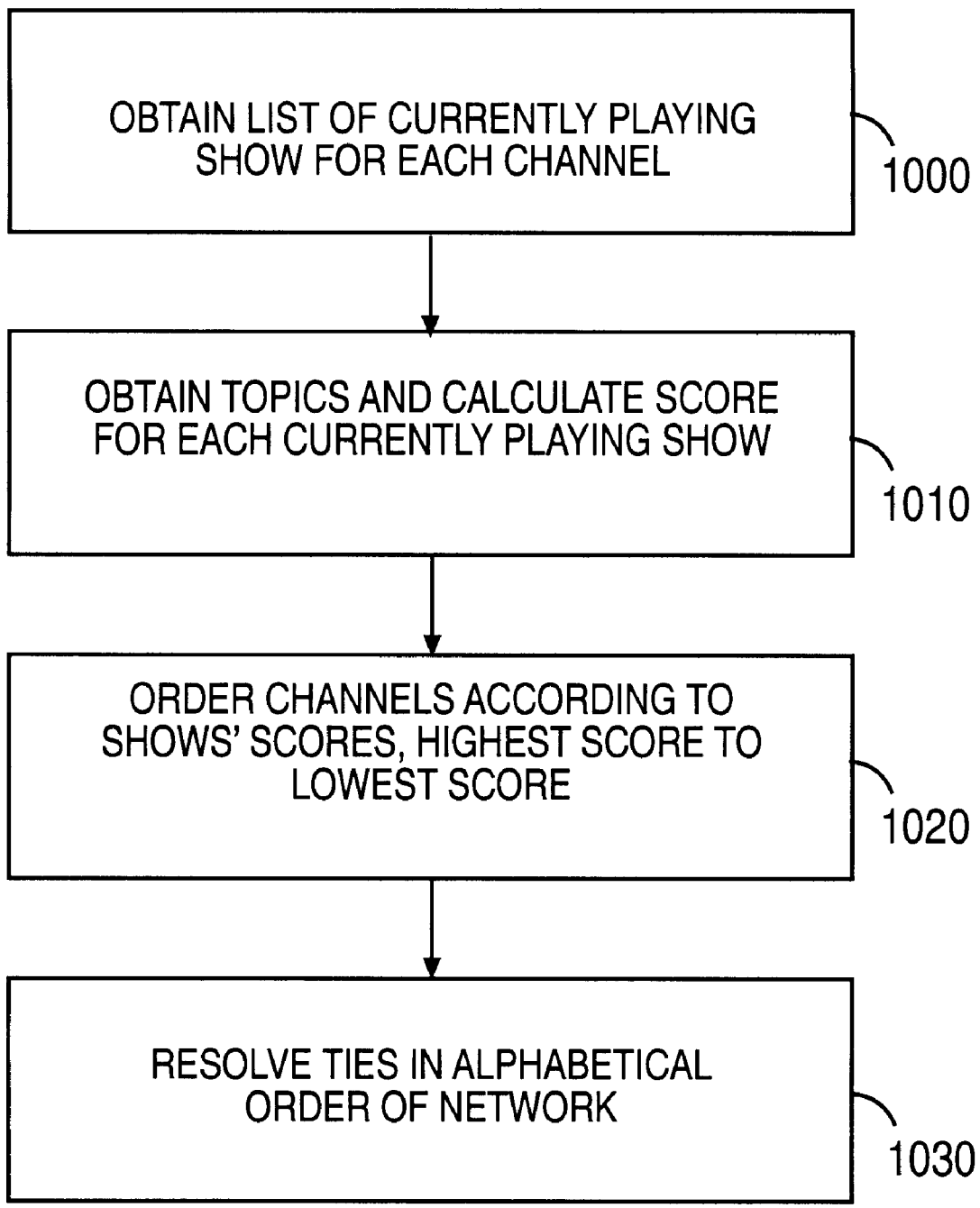
FIG. 10 is a block diagram of an embodiment of a process used to identify and sort currently available programs that may be used with one or more embodiments of the invention.

FIG. 10 is a block diagram of an embodiment of a process used to identify and sort currently available programs that may be used with one or more embodiments of the invention. In one or more embodiments, the sorting of currently available programs is done periodically. In one or more embodiments, the sorting is done continuously.

According to the embodiment of FIG. 10, a list of currently playing shows for each available channel is obtained at block 1000. The list may be obtained, for example, from a program schedule obtained from an internet web server, from information broadcast in a vertical blanking interval of a television transmission, from a locally stored schedule, or from other sources. The topics for each currently playing show are obtained, and the score for each currently playing show is calculated, using information from the viewer profile, at block 1010. The topics for each show may be obtained, for example, from a locally stored table listing topics for each show. The score for each show may be calculated, for example, using the process of FIG. 8.

At block 1020 the available channels are ranked according to the score for the current program showing on each channel, from highest score to lowest score. As shown in block 1030, ties are resolved by ordering channels whose shows have tie scores in alphabetical order of network name or acronym (i.e. if there is a tie in the score for shows playing on CNN and CBS, CBS would be ordered ahead of CNN).

Program Parser

In one or more embodiments of the invention, the topics for currently playing programs are extracted from program description information using a parsing process. The program description information is obtained, for example, from an internet server, from information contained in a vertical blanking interval of a television broadcast, or from some other source.

Figure 11:
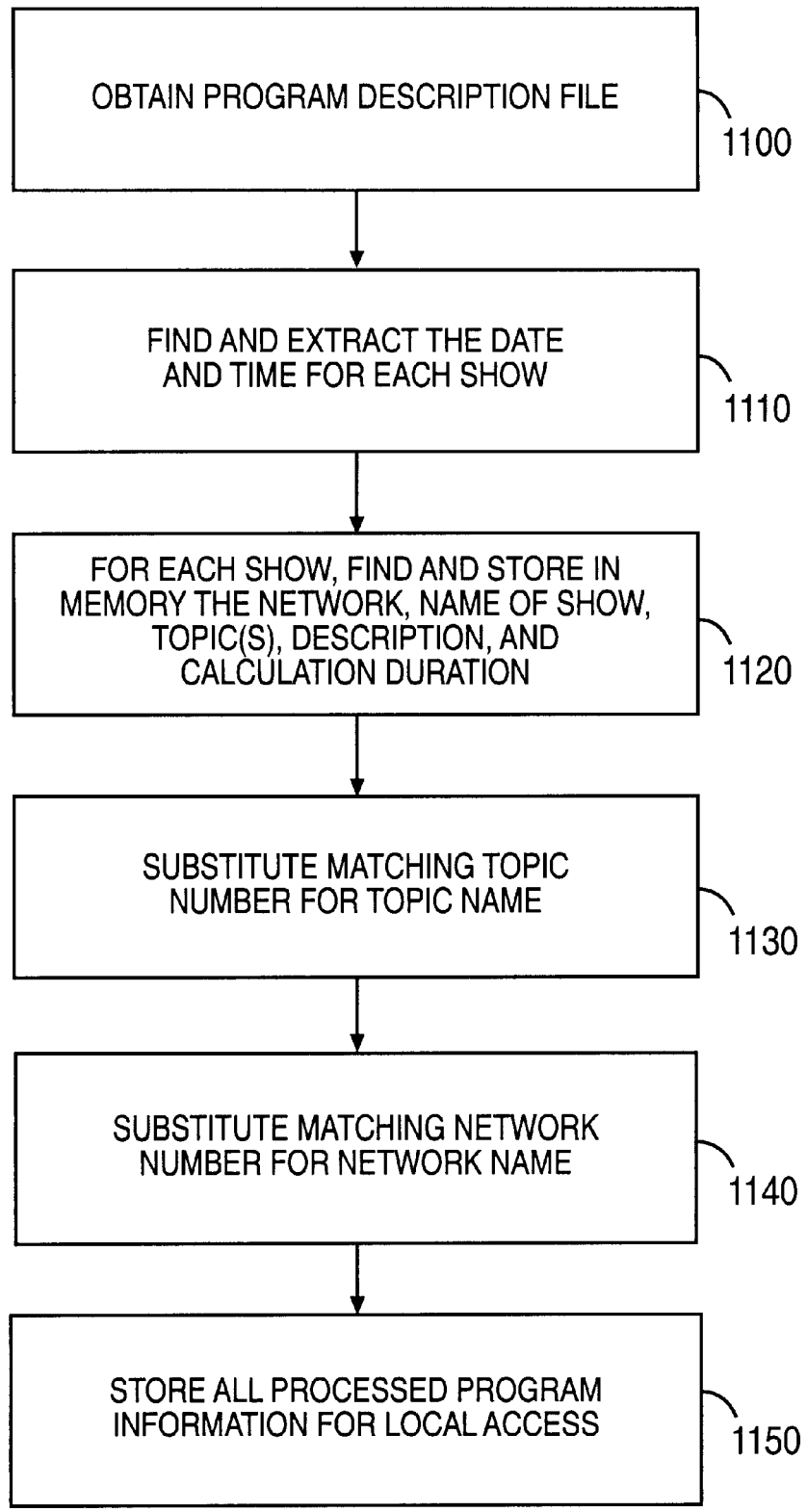
FIG. 11 is a block diagram of an example of a parsing process used in an embodiment of the invention.

An example of a parsing process used in an embodiment of the invention is shown in FIG. 11. In the parsing process of FIG. 11, a program description file is obtained at block 1100. In one embodiment, the program description file contains information about all shows scheduled to be broadcast during a period of time, such as, for example, a day or a week. In one embodiment, the program description file contains, for each program, a program name, a network name, program topic(s), a program description, and a broadcast time and date.

At blocks 1110 and 1120, program information for each program is extracted from the program description file by the parsing process. At block 1110 the date and time for each show are extracted and stored in memory. At block 1120 the program name, program network, program topic(s) and program description are extracted and stored in memory. The program length is also calculated, for example by comparing a program's beginning broadcast time with the broadcast time for the next program on the same network.

At block 1130, corresponding topic numbers are substituted for the topic text names extracted at block 1120. At block 1140, corresponding network numbers are substituted for the network text names extracted at block 1120.

At block 1150, all of the extracted and processed information is stored for local access by the viewer's apparatus implementing the invention.

Hardware Environment

Figure 12:
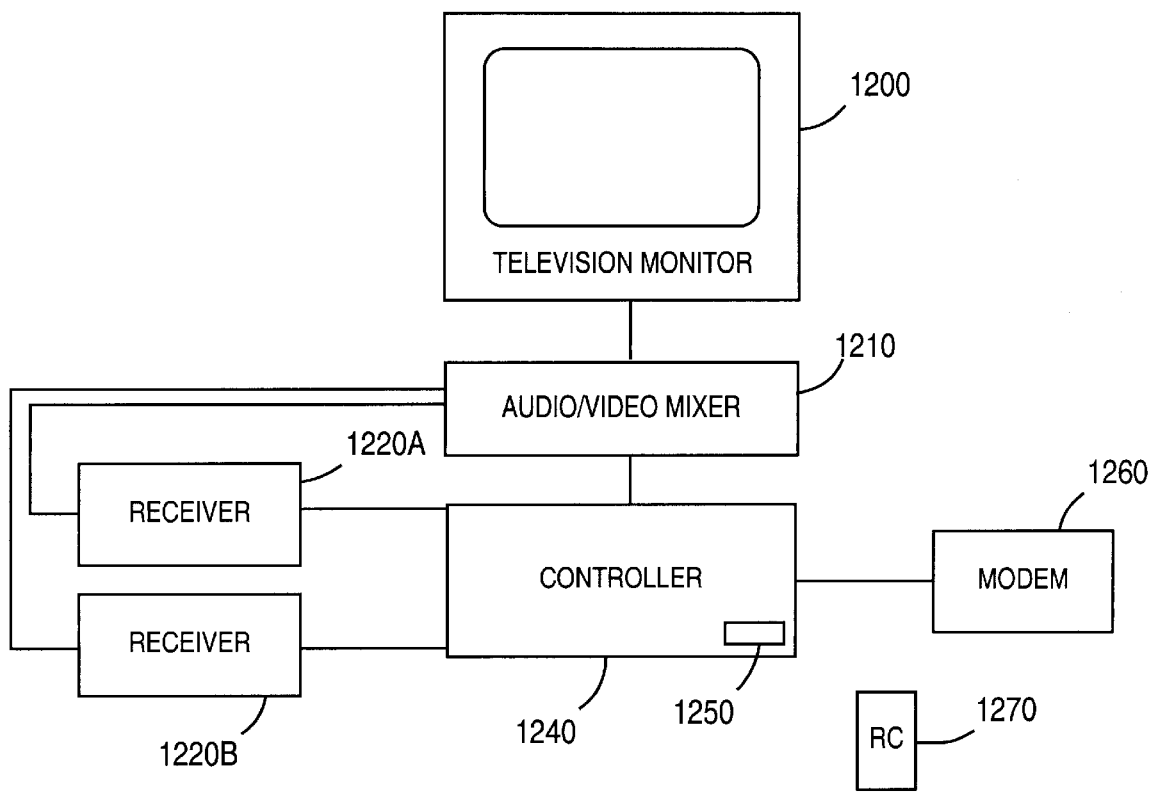
FIG. 12 is a block diagram of example hardware components that can be used to implement an embodiment of the invention.

FIG. 12 is a block diagram of example hardware components that can be used to implement an embodiment of the invention. The hardware components shown in FIG. 12 include a controller 1240 that is coupled to an audio/video ("A/V") mixer 1210, receivers 1220a and 1220b, and modem 1260. Also included are a television monitor 1200 coupled to A/V mixer 1210 and a remote control device 1270.

Controller 1240 functions as a controller of the system, performing, in one embodiment, processes such as the processes of FIGS. 2, 6, 7, 8, 10 and 11. In one embodiment, controller 1240 has the processing capabilities of a personal computer, including a CPU motherboard, internal RAM memory, and an internal hard disk drive. The controller performs processes of the invention by means of appropriate software programming. In the embodiment of FIG. 12, controller 1240 has an infra-red port 1250 used to accept viewer input entered by the viewer on remote control device 1270. Controller 1240 may also have provision for attaching additional input/output devices such as, for example, a computer monitor, a keyboard, a mouse, speakers, or other computer peripherals.

Receivers 1220a and 1220b are receivers each preferably capable of receiving all channels available to a viewer. For example, receivers 1220a and 1220b may comprise receiver portions of video cassette recorders, satellite receivers, tuner sections of television receivers, etc. Receivers 1220a and 1220b preferably have audio and video outputs and control interfaces that allow controller 1240 to control the channels to which each of receivers 1220a and 1220b are tuned. By having two receivers, two channels may be simultaneously displayed on television monitor 1200. For example, one channel may be displayed full screen, while a second channel, representing, for example, the channel containing the next highest scoring program, is displayed in a smaller preview (e.g. picture-in-a-picture) window. However, in other embodiments, a single receiver, or more than two receivers, can be used. Receivers 1220a and 1220b may receive input signals from television antennas, cable connections, satellite dishes, microwave dishes, etc.

The audio and video outputs of receivers 1220a and 1220b are coupled to A/V mixer 1210. A/V mixer 1210 is able to accept multiple video inputs, including video input from receivers 1220a and 1220b and computer generated video input from controller 1240, and generate a composite output of the inputs that can be displayed on television monitor 1200. The composite output can take a number of forms. For example, one output form may be a picture-in-a-picture form with overlaid computer generated text and/or graphics.

Modem 1260 allows controller 1240 to electronically communicate with other electronic devices via telephone line and/or other communications networks, such as the internet. Modem 1260 may be used, for example, to obtain program description files from an internet server as at block 1100 of FIG. 11.

Although the components are shown as separate blocks in FIG. 12, one or more blocks can be incorporated into other blocks. For example, all blocks (except remote control 1250) may be physically incorporated in a single television receiver unit. Furthermore, other components or arrangements of components can be used to implement the invention, as will be recognized by those skilled in the art.

Software Environment

In one or more embodiments, two main software modules are used to implement processes of the invention. These software modules are a main control program and a parsing program. The software modules may be executed, for example, by a microprocessor of controller 1240 of FIG. 12.

The parsing program performs the function of extracting relevant program information from program description files. In one embodiment, the parsing program implements the process of FIG. 11. Source code for an embodiment of a parsing program of the invention is attached as Appendix A.

The main control program performs one or more of the remaining processes of the invention. In one embodiment, for example, the main control program implements one or more of the processes of FIGS. 2, 6, 7, 8, 10 and 11. Source code for an embodiment of a main control program of the invention is attached as Appendix B.

User Interface Displays

Figure 13:
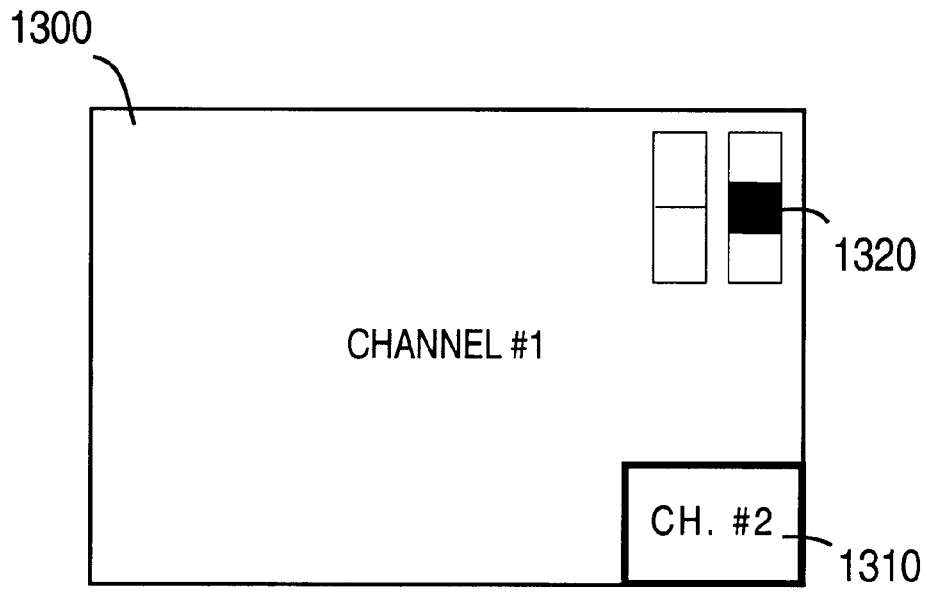
FIG. 13 shows an example user interface display that may be provided by one or more embodiments of the invention.
Figure 14:
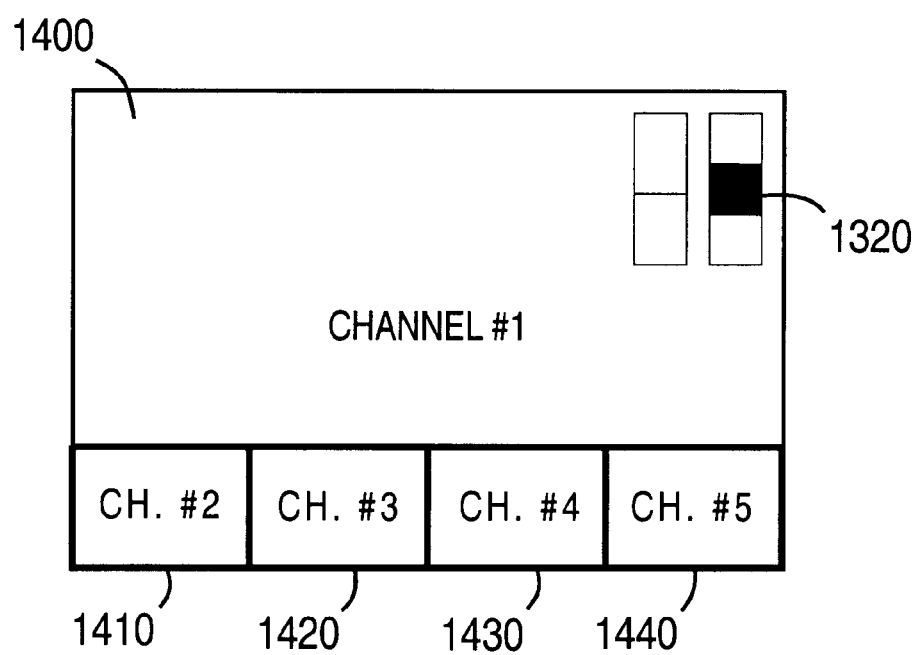
FIGS. 14 shows an example user interface display that may be provided by one or more embodiments of the invention.

FIGS. 13 and 14 show examples of user interface displays that may be provided by one or more embodiments of the invention. These displays may be displayed, for example, on a viewer's television monitor.

Figure 15:
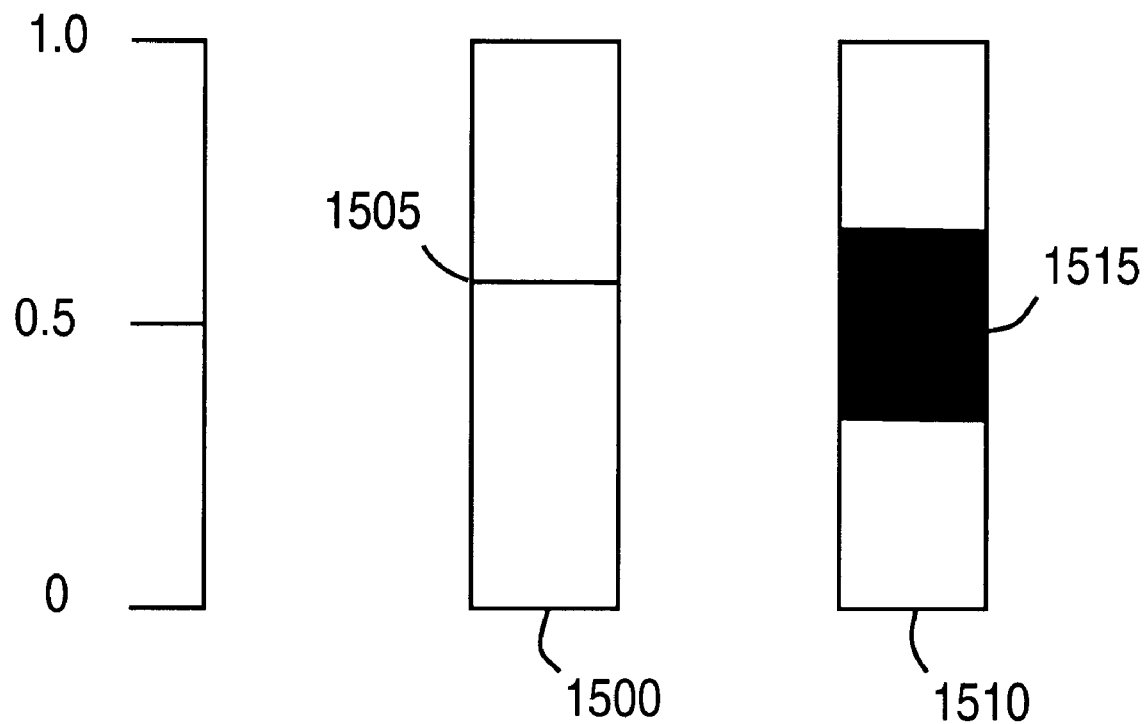
FIG. 15 is a detail view of interest indicators 1320 of FIGS. 13 and 14.

The user interface display of FIG. 13 includes a main display area 1300 in which a first channel is displayed, a first preview window 1310 in which a second channel (normally the channel showing the program having the next highest score after the program being shown in main display area 1300) is displayed, and interest indicators 1320, which are shown in greater detail in FIG. 15. Because two channels are simultaneously displayed in the embodiment of FIG. 13, two receivers, such as receivers 1220a and 1220b of FIG. 12, may be required in a system implementing the display of FIG. 13.

The user display of FIG. 14 is similar to the display of FIG. 13, except that it includes four preview windows 1410, 1420, 1430 and 1440 in addition to main display area 1400 and interest indicators 1320. Preview windows 1410, 1420, 1430 and 1440 may be used to display the channels containing the succeeding next highest scoring programs after the program being shown in main display area 1400. Alternatively, some of the preview windows may display the next higher scoring shows, if any, if a viewer has selected a program other than the highest scoring program for viewing. A separate receiver may be required for each preview window.

FIG. 15 is a detail view of interest indicators 1320 of FIGS. 13 and 14. In the embodiment of FIG. 15, there are two interest indicators 1500 and 1510. The interest indicators (and or the preview windows of FIGS. 13 and 14) may be displayed to a user intermittently or continuously, or in response to a viewer command.

Interest indicator 1500 comprises a vertical bar with a slider 1505 that indicates a degree of current user interest in the program being displayed. The degree of interest is a number between 0 and 1. In the example of FIG. 15, slider 1505 is positioned at a value of approximately 0.6.

Interest indicator 1510 comprises a vertical bar with a slider 1515 that indicates an estimated program interest in the show being displayed, as well as a confidence level in that estimate. Unlike slider 1505 of interest indicator 1500, which has a fixed width, slider 1515 has a variable width. The height of the center of slider 1515 indicates the value, from 0 to 1, of an estimated program interest of the viewer in the program being displayed. The width of slider 1515 indicates a degree of confidence in the indicated estimated program interest. The wider the slider, the lower the confidence. For example, for a confidence of zero (indicating no confidence in the estimated interest value, meaning that the actual interest value could be any value), slider 1515 fills the entire height of bar 1510. For a confidence value of 1 (meaning there is 100% confidence that the estimated interest is the same as the actual interest), on the other hand, slider 1515 becomes essentially a straight line.

In one embodiment, the initial level of program interest indicated in interest indicator 1500 when a program is first displayed is equal to the value of the estimated viewer interest for that program as calculated from data in the viewer profile.

In one embodiment, slider 1505 rises with time (indicating greater viewer interest) as a viewer continues to watch the same channel.

In one embodiment, the viewer can change the displayed viewer interest by manipulation of appropriate control buttons on a remote control device. The viewer can thereby manually adjust the program interest recorded in the viewer profile for particular shows.

Thus, a method and apparatus for television program selection has been described. Although the invention has been described with respect to certain example embodiments, it will be apparent to those skilled in the art that the present invention is not limited to these specific embodiments. For example, although the invention has been described with respect to television program selection, the invention may be used for other types of program selection, such as, for example, radio programs or music contained on CD's or DVD's. Further, although the operation of certain embodiments has been described in detail using certain detailed process steps, some of the steps may be omitted or other similar steps may be substituted without departing from the scope of the invention. Other embodiments incorporating the inventive features of the invention will be apparent to those skilled in the art.

Appendix A

PARSER

```
# go.ksh

# Parser Control script
Jasba Simpson ls ../orig >orig.all
rm ./topics/*.dat
awk -f go.awk <orig.all >tmp.ksh
#tmp.ksh
#rm tmp.ksh
#rm orig.all
cp ./lists/*.txt ../desc/
```

---

```
# go.awk

# Parser set up file
# Jasba Simpson

{
        name = $1
        sub("\.sml","\.txt",name)
        sub("\.SML","\.txt",name)
        print "awk -v FILE="name " -f pre.awk <../orig/" $1 " | awk -f post.awk >../desc/" name
        print "date"
}
```

---

```
# pre.awk

# Pre-processor for Learntv Parser
# Jasba Simpson

BEGIN {
DATE_LIM = "<FONT SIZE=\+1><B>"
DATE = NULL
TIME = NULL
BUFFER = NULL
MONTH=int(substr(FILE,2,2)-1)
DAY_FILE=int(substr(FILE,4,2))
DAY=DAY_FILE
}
{
        desc = $0;
        # Find the Time and Date
        if (match(desc,DATE_LIM))
        {
                # First one is the DATE
                if (DATE == NULL) {
                DATE = desc
                sub(".*<B>","",DATE)
                sub("</B>.*","",DATE)
                }
                else
                {
                # Assume Description is TIME
                TIME = desc
                sub(".*<B>","",TIME)
                sub("</B>.*","",TIME)

# Calculate Hour
                tmp = TIME
                sub(":.*","",tmp)
                HOUR = int(tmp)
                if ((match(TIME,"pm"))&&(!match(TIME,12)))
                {
```

APPENDIX A
92500.937

```
                    HOUR = HOUR + 12
            )
            if ((match(TIME,"am")) &&
                    (HOUR == 12))
            {
                    HOUR = 0
                    DAY = DAY_FILE +1
            )
            #-Calculate Minute
            tmp = TIME
            sub(".*:","",tmp)
            sub("[[:alpha:]]*","",tmp)
            MINUTE = int(tmp)

)
    )
    gsub("<IMG[^>]*>","",BUFFER)

if ((DATE != NULL) &&
        (TIME != NULL))
    {
      if (match(BUFFER,"<BR>|<HR>|<TD>|<td>"))
      {
            NUM_ITEMS = split(BUFFER,ITEMS,"<B>|<\/B>")
            #for (i=1;i<=NUM_ITEMS;i++){print i ":"ITEMS[i]} if (match(BUFFER,"^[[:space:]]*<B>"))
            {
                    pointer = 2
                    NETWORK = ITEMS[pointer]
                    while (match(ITEMS[++pointer],"<")) ()
                    SHOW_NAME = ITEMS[pointer++]
                    while (match(ITEMS[++pointer],"<")) ()
                    SHOW_TYPE = ITEMS[pointer++]

for (i=2;i<=NUM_ITEMS;i++)
                    {
                            if (match(ITEMS[i],"cc|min"))
                            {
                            SHOW_DESC = ITEMS[i]
                            }
                    }
                    for (i=0;i<=NUM_ITEMS;i++)
                    {delete ITEMS[i]}

# Remove all <> HTML code from SHOW_DESC
                    gsub("<[^>]*>","",SHOW_DESC)
                    # Remove leading spaces
                    sub("^[[:space:]]*","",SHOW_DESC)

len = length(SHOW_DESC)
                    dash = match(SHOW_DESC,"--")
                    TMP=substr(SHOW_DESC,dash,len-dash)
                    min =match(TMP,"min")

DURATION=int(substr(TMP,min-4,4))

if (int(DURATION)==0)
                    {
                            DURATION = 0
                    }
                    if ((length(SHOW_DESC)<30)||
                        (match(SHOW_DESC,"---")))
                    {
                            SHOW_DESC = "<No Description>"
                    }
                    else
                    {
                            #print SHOW_DESC >> "./lists/desc.dat"
                    }
```

APPENDIX A
92500.937

```
                if (length(SHOW_TYPE)<1)
                {
                        SHOW_TYPE = "<Unknown>"
                }
                # Program Description
                if ((NETWORK != NULL)&&
                    (SHOW_NAME != NULL) &&
                    (int(DURATION) != 0))
                {

OUTPUT SHOW INFORMATION:

print NETWORK
                        print "<INSERT NETWORK>"
                        #print NETWORK >> "./lists/network.dat"
                        print SHOW_NAME
                        #print "<INSERT PROGRAM>"
                        #print SHOW_NAME >> "./lists/show.dat"
                        print SHOW_DESC
                        print SHOW_TYPE
                        #print SHOW_TYPE >> "./lists/type.dat"
                        print MONTH
                        print DAY
                        print HOUR
                        print MINUTE
                        print DURATION
                        print "<INSERT TOPICS>"
                        }
                }
                BUFFER = desc
        }
        else
        {
                BUFFER = BUFFER desc
        }
    }
}
END {
}
```

3

APPENDIX A
92500.937

Express Mail #EM100740937US

```awk
# post.awk

# Parser Post-processor for Learntv
# Jasba Simpson

BEGIN (
# Load up the TOPIC file

"wc ./lists/topics.txt | awk '(print $1)'" |getline word_count
  max_topics = int(word_count)
  for (i=0;i<max_topics;i++)
  (
        getline tmp < "./lists/topics.txt"
        TOPIC[i]= tolower(tmp)
  )
 #for (i=0;i<max_topics; i++) (print TOPIC[i]);

"wc ./lists/network.txt | awk '(print $1)'" |getline word_count
  max_networks = int(word_count)
  for (i=0;i<max_networks;i++)
  (
        getline tmp < "./lists/network.txt"
        NETWORK[i]= tolower(tmp)
  )

skip = 3
n=skip +1;
)
(
        prev = preprev
        preprev = $0
        n++;
        if (match($0,"<INSERT TOPICS>"))
        (
                for (i=0;i<max_topics;i++)
                (
                        if (match(tolower(BUFFER),TOPIC[i]))
                        (
                        print i
                        )
                )
                print "-1"
                BUFFER = NULL
        )
        else
        if (match($0,"<INSERT NETWORK>"))
        (
                found = 0
                for (i=0;i<max_networks;i++)
                (
                        if ((match(tolower(prev),NETWORK[i]))&&
                            (length(prev)==length(NETWORK[i])))
                        (
                                found = 1
                                print i
                                i=max_networks
                        )
                )
                if (found == 0) print "-1"
                n=0;
        )
        else
        (
                if (n==skip) BUFFER = $0
                print $0
                #BUFFER = BUFFER $0
        )
)
END ()
```

4

APPENDIX A
92500.937

ORIGINAL WEB PAGE EXAMPLE

```html
<HTML>

<HEAD>
<BODY BGCOLOR="#FFFFFF" LINK="#0000FF" VLINK="#0000FF">
<TITLE>Eastern Timezone, Full Listing, Monday 9/9, 11 am to 3 pm</TITLE>
</HEAD>

<!--         Thanks for looking at my source!          -->
<!--         These pages created by Marc Eaddy         -->
<!--      Friday, September 06, 1996 09:33 PM EDT      -->

<BODY>
<A NAME="TOP"></A>

<a href="/tv/tvguide/images/h_navbar.map"><img ismap width="580" height="48" border="0"
src="/navbars/images/h_navbar.gif"></a>

<TABLE WIDTH=586 BORDER=0>
<TR ALIGN=CENTER>
<TD>
<A HREF="/tv/tvguide/ez/images/banner.map">
<IMG SRC="/tv/tvguide/images/banvfull.gif" WIDTH=580 HEIGHT=50 BORDER=0 ISMAP></A>
</TD>
</TR>
<!-- Log Navigation -->
<TR ALIGN=CENTER>
<TD>
<FONT SIZE=-1>
<!--LOG NAVIGATION-->
<font size="-1">
<a href="l0909dez.sml"> M 9</a> |
<a href="l0910dez.sml"> T 10</a> |
<a href="l0911dez.sml"> W 11</a> |
<a href="l0912dez.sml"> Th 12</a> |
<a href="l0913dez.sml"> F 13</a> |
<a href="l0914dez.sml"> S 14</a> |
<a href="l0915dez.sml"> Su 15</a>

<a href="l0916dez.sml"> M 16</a> |
<a href="l0917dez.sml"> T 17</a> |
<a href="l0918dez.sml"> W 18</a> |
<a href="l0919dez.sml"> Th 19</a> |
<a href="l0920dez.sml"> F 20</a> |
<a href="l0921dez.sml"> S 21</a> |
<a href="l0922dez.sml"> Su 22</a>
</font>

<HR>
<A HREF="l0909eez.sml">3 am to 7 am</A> |
<A HREF="l0909mez.sml">7 am to 11 am</A> |
<B>11 am to 3 pm</B> |
<A HREF="l0909aez.sml">3 pm to 7 pm</A> |
<A HREF="l0909pez.sml">7 pm to 11 pm</A> |
<A HREF="l0909nez.sml">11 pm to 3 am</A>

</FONT>
<HR>
</TD>
</TR>
<TR ALIGN=CENTER>
<TD>
<FONT SIZE=+1><B>Monday, September 9, 1996</B></FONT>
</TD>
</TR>
</TABLE>
```

APPENDIX A
92500.937

```
<!-- Logs Proper -->

<HR NOSHADE SIZE=2>
<BR>
<TABLE WIDTH=586 BORDER=0>
<TR>
<TD ALIGN=LEFT><A HREF="#TOP">
<IMG SRC="/tv/tvguide/images/top.gif" WIDTH=40 HEIGHT=27 BORDER=0 ALIGN=LEFT BORDER=0></A></TD>
<TD ALIGN=CENTER><FONT SIZE=-1>
<A NAME="1100">
<TABLE>
<TR ALIGN=CENTER>
<TD WIDTH=75></TD><TD></TD>
<TD WIDTH=75></TD><TD></TD>
<TD WIDTH=75></TD><TD></TD>
<TD WIDTH=75><FONT SIZE=+1><B>11:00 am</B></FONT></TD><TD>|</TD>
<TD WIDTH=75><A HREF="#1200">12:00 pm</A></TD><TD>|</TD>
<TD WIDTH=75><A HREF="#1300"> 1:00 pm</A></TD><TD>|</TD>
<TD WIDTH=75><A HREF="#1400"> 2:00 pm</A></TD>
</TR>
</TABLE>
</FONT>
</A></TD>
<TD ALIGN=RIGHT><A HREF="#BOTTOM">
<IMG SRC="/tv/tvguide/images/bottom.gif" WIDTH=40 HEIGHT=27 BORDER=0 ALIGN=RIGHT BORDER=0></A></TD>
</TR>
</TABLE>
<HR>
 <B>ABC</B>  <A HREF="/tv/tvguide/programs/21/004wyslr.sml">
<B>Caryl & Marilyn: Real Friends</B></A>
 -- 60 min. [cc]
<BR>
 <B>CBS</B>  <A HREF="/tv/tvguide/programs/46/001ilp4r.sml">
<B>Price Is Right</B></A>
 <B>Game</B> -- 60 min. [cc]
<BR>
 <B>NBC</B>  <A HREF="/tv/tvguide/programs/89/004yhfnr.sml">
<B>Leeza</B></A>
 <B>Discussion</B> -- 60 min.
<BR>
 <B>A&E</B>  <A HREF="/tv/tvguide/programs/09/001joejr.sml"> <B>Mickey Spillane's Mike Hammer</B></A>
<B>Crime Drama</B> -- 60 min.<BR>
 <B>BET</B>  <A HREF="/tv/tvguide/programs/95/001778rr.sml"> <B>Video Vibrations</B></A>
<B>Music</B> -- 120 min.<BR>
 <B>BRAV</B>  <A HREF="/tv/tvguide/programs/48/001atzqr.sml"> <B>Brideshead Revisited</B></A>
<B>Drama</B> Part 6. Julia's relationship with Rex Mottram (Charles Keating) is cause for family
concern. Diana Quick, Claire Bloom, Simon Jones. -- British, 55 min.<BR>
 <B>CAR</B>  <A HREF="/tv/tvguide/programs/73/001i7d7r.sml"> <B>Scooby Doo</B></A>  <B>Cartoon</B> --
60 min.<BR>
 <B>CNN</B>  <A HREF="/tv/tvguide/programs/89/0017731r.sml"> <B>Newsroom</B></A>
<B>Frassrand/Henderson</B> -- 30 min. [cc]<BR>
 <B>COM</B>  <A HREF="/tv/tvguide/programs/28/001hsker.sml"> <B>Tracey Ullman</B></A>  <B>Comedy</B>
-- 30 min.<BR>
 <B>DSC</B>  <A HREF="/tv/tvguide/programs/48/004xebsr.sml"> <B>Lynette Jennings Housesmart!</B></A>
<B>Home Improvement</B> -- 60 min.<BR>
 <B>E!</B>  <A HREF="/tv/tvguide/programs/09/004ys3lr.sml"> <B>Gossip Show</B></A>  -- 60 min.<BR>
 <B>ESPN</B>  <IMG SRC="/tv/tvguide/images/bulletb2.gif" WIDTH=8 HEIGHT=9 BORDER=0>  <A
HREF="/tv/tvguide/programs/53/0017a2dr.sml"> <B>SportsCenter</B></A>  -- 60 min.<BR>
 <B>ESP2</B>  <IMG SRC="/tv/tvguide/images/bulletb2.gif" WIDTH=8 HEIGHT=9 BORDER=0>  <A
HREF="/tv/tvguide/programs/73/004xw65r.sml"> <B>Cory Everson's Gotta Sweat</B></A>  <B>Fitness</B> -
- 30 min.<BR>
 <B>F&V</B>  <A HREF="/tv/tvguide/programs/16/004yh9ur.sml"> <B>Word with Father Michael
Manning</B></A>  <B>Religion</B> -- 30 min.<BR>
 <B>f/X</B>  <A HREF="/tv/tvguide/programs/53/001bsbzr.sml"> <B>Hart to Hart</B></A>  <B>Crime
Drama</B> -- 60 min.<BR>
 <B>FOOD</B>  <A HREF="/tv/tvguide/programs/52/004xm4gr.sml"> <B>From My Garden</B></A>  -- 30
min.<BR>
 <B>GALA</B>  <A HREF="/tv/tvguide/programs/10/004yooar.sml"> <B>Nuevo día</B></A>  <B>Revista</B> --
90 min.<BR>
 <B>HGTV</B>  <A HREF="/tv/tvguide/programs/71/004xmwrr.sml"> <B>Decorating with Style</B></A>  -- 30
min.<BR>
```

APPENDIX A
92500.937

```
  <B>HIST</B>  <A HREF="/tv/tvguide/programs/22/001i7sgr.sml">  <B>Shogun</B></A>   <B>Drama</B>  -- 120
min.<BR>
  <B>HSN</B>  <A HREF="/tv/tvguide/programs/16/004y3x9r.sml">  <B>Beauty</B></A>   -- 60 min.<BR>
  <B>INSP</B>  <A HREF="/tv/tvguide/programs/27/004ws0br.sml">  <B>Hope for Life's Journey</B></A>
<B>Religion</B>  -- 30 min.<BR>
  <B>JCN</B>  <A HREF="/tv/tvguide/programs/81/004yqs1r.sml">  <B>Home Computing</B></A>   -- 30
min.<BR>
  <B>LIFE</B>  <A HREF="/tv/tvguide/programs/81/004wz5dr.sml">  <B>Main Ingredient</B></A>
<B>Cooking</B>  -- 30 min.<BR>
  <B>ME/U</B>  <A HREF="/tv/tvguide/programs/59/004y6vwr.sml">  <B>Language Around the World</B></A>  -
- 30 min.<BR>
  <B>NICK</B>  <A HREF="/tv/tvguide/programs/35/004y5h8r.sml">  <B>Allegra's Window</B></A>
<B>Children</B>  -- 30 min.<BR>
  <B>SCI</B>  <A HREF="/tv/tvguide/programs/20/0019qxer.sml">  <B>Dark Shadows</B></A>   <B>Serial</B>  -
- 30 min.<BR>
  <B>TEL</B>  <A HREF="/tv/tvguide/programs/28/004xl3lr.sml">  <B>Sevcec</B></A>   <B>Discusión</B>
  -- 60 min.<BR>
  <B>TLC</B>  <A HREF="/tv/tvguide/programs/39/004ys0nr.sml">  <B>Elementary Spanish</B></A>   -- 60
min.<BR>
  <B>TNT</B>  <A HREF="/tv/tvguide/programs/19/001k65pr.sml">  <B>Knots Landing</B></A>   <B>Drama</B>  -
- 60 min. [cc]<BR>
  <B>TRAV</B>  <A HREF="/tv/tvguide/programs/45/004z5xar.sml">  <B>Taste for Travel with Burt
Wolf</B></A>   -- 30 min.<BR>
  <B>UNI</B>  <A HREF="/tv/tvguide/programs/52/0017j0kr.sml">  <B>Pícara soñadora</B></A>
<B>Novela</B>  -- Mexicana, 60 min.<BR>
  <B>USA</B>  <A HREF="/tv/tvguide/programs/36/001bc1er.sml">  <B>Just the Ten of Us</B></A>
<B>Comedy</B>  -- 30 min.<BR>
  <B>WGN</B>  <A HREF="/tv/tvguide/programs/31/001bfntr.sml">  <B>Charlie's Angels</B></A>   <B>Crime
Drama</B>  -- 60 min.<BR>
  <B>WOR</B>  <A HREF="/tv/tvguide/programs/65/001bi2vr.sml">  <B>Partridge Family</B></A>
<B>Comedy</B>  -- 30 min.<BR>
  <B>DIS</B>  <A HREF="/tv/tvguide/programs/48/0019v46r.sml">  <B>DuckTales</B></A>   <B>Cartoon</B>  --
25 min. [cc]<BR>

<BR>
<HR NOSHADE SIZE=2>
<CENTER><FONT SIZE=+1><B>11:05 am</B></FONT></CENTER>
<HR>
  <B>TBS</B>  <A HREF="/tv/tvguide/programs/73/004yvo5r.sml">  <B>Saved by the Bell: The College
Years</B></A>   <B>Comedy</B>  -- 30 min. [<no>]<BR>

<BR>
<HR NOSHADE SIZE=2>
<CENTER><FONT SIZE=+1><B>11:15 am</B></FONT></CENTER>
<HR>
  <B>ENC</B>   <IMG SRC="/tv/tvguide/images/bulletr2.gif" WIDTH=8 HEIGHT=9 BORDER=0>   <A
HREF="/tv/tvguide/programs/94/003idauv.sml">  <I><B>Henry V</B></I></A>   <IMG
SRC="/tv/tvguide/images/starb.gif" WIDTH=12 HEIGHT=11 BORDER=0><IMG
SRC="/tv/tvguide/images/starb.gif" WIDTH=12 HEIGHT=11 BORDER=0><IMG
SRC="/tv/tvguide/images/starb.gif" WIDTH=12 HEIGHT=11 BORDER=0>   <B>Drama, 1989</B>  Kenneth Branagh
directed and stars in Shakespeare's patriotic call to arms.  Derek Jacobi, Brian Blessed, Ian Holm.
 -- British, 145 min. Rated NR: Violence.<BR>

<BR>
<BR>
<A HREF="#TOP">
<IMG SRC="/tv/tvguide/images/top.gif" WIDTH=40 HEIGHT=27 BORDER=0 ALIGN=LEFT BORDER=0></A>
<BR CLEAR=ALL>

<HR>
<br clear="all"><table>
<tr><td colspan="2"><img width="322" height="2" src="/tv/tvguide/images/sep2.gif"></td></tr>
<tr><td width="60"><img width="42" height="13" valign="top" border="0"
src="/tv/tvguide/images/view.gif"></td>
<td><font size="-1"><b>
<a href="/tv/tvguide/ez/grids">GRIDS</a>  |
<a href="/tv/tvguide/ez/logs">LISTINGS</a><br>
</b></font></td></tr>
<tr><td colspan="2"><img width="322" height="2"src="/tv/tvguide/images/sep2.gif"></td></tr>
```

APPENDIX A
92500.937

```
<tr><td><img width="57" height="13" valign="top" border="0"
src="/tv/tvguide/images/search.gif"></td>
<td><font size="-1"><b>
<a href="/tv/tvguide/ez/search/sport.sml">SPORTS</a> |
<a href="/tv/tvguide/ez/search/movie.sml">MOVIES</a> |
<a href="/tv/tvguide/ez/search/other.sml">OTHER PROGRAMS</a> |
<a href="/tv/tvguide/ez/search/all.sml">ALL</a>
</b></font></td></tr>
<tr><td colspan="2"><img width="322" height="2" src="/tv/tvguide/images/sep2.gif"></td></tr>
</table><br clear="all">

<TABLE CELLPADDING="0">
<TR>
<TD ALIGN="CENTER"><IMG SRC="/tv/tvguide/images/boxrd.gif"></TD>
<TD> = Movie</TD>
</TR>
<TR>
<TD ALIGN="CENTER"><IMG SRC="/tv/tvguide/images/boxgn.gif"></TD>
<TD> = Sport</TD>
</TR>
<TR>
<TD ALIGN="CENTER"><IMG SRC="/tv/tvguide/images/diabk.gif"></TD>
<TD> = Noted by TV Guide editors</TD>
</TR>
</TABLE>
<A NAME="BOTTOM"></A>

<P>
<FONT SIZE=-2>©1996 News America Publications, Inc.<BR>
TV GUIDE is a registered trademark.</FONT>

</BODY>
</HTML>
```

PROCESSED WEB PAGE EXAMPLE

```
ABC
1
Caryl & Marilyn: Real Friends
<No Description>
<Unknown>
8
9
11
0
60
-1
CBS
7
Price Is Right
<No Description>
Game
8
9
11
0
60
49
-1
NBC
41
Leeza
<No Description>
Discussion
8
```

APPENDIX A
92500.937

```
9
11
0
60
31
-1
A&E
0
Mickey Spillane's Mike Hammer
<No Description>
Crime Drama
8
9
11
0
60
27
36
-1
BET
4
Video Vibrations
<No Description>
Music
8
9
11
0
120
75
-1
BRAV
5
Brideshead Revisited
Part 6. Julia's relationship with Rex Mottram (Charles Keating) is cause for family concern. Diana
Quick, Claire Bloom, Simon Jones. -- British, 55 min.
Drama
8
9
11
0
55
36
-1
CAR
6
Scooby Doo
<No Description>
Cartoon
8
9
11
0
60
19
-1
CNN
9
Newsroom
<No Description>
Frassrand/Henderson
8
9
11
0
30
-1
COM
10
Tracey Ullman
<No Description>
```

APPENDIX A
92500.937  5  Express Mail #EM100740937US

```
Comedy
8
9
11
0
30
22
-1
DSC
15
Lynette Jennings Housesmart!
<No Description>
Home Improvement
8
9
11
0
60
55
56
-1
E!
16
Gossip Show
<No Description>
<Unknown>
8
9
11
0
60
-1
ESPN
19
SportsCenter
<No Description>
<Unknown>
8
9
11
0
60
-1
ESP2
18
Cory Everson's Gotta Sweat
<No Description>
Fitness
8
9
11
0
30
47
-1
F&V
20
Word with Father Michael Manning
<No Description>
Religion
8
9
11
0
30
94
-1
f/X
67
Hart to Hart
<No Description>
```

APPENDIX A
92500.937

```
Crime Drama
8
9
11
0
60
27
36
-1
FOOD
23
From My Garden
<No Description>
<Unknown>
8
9
11
0
30
-1
GALA
26
Nuevo día
<No Description>
Revista
8
9
11
0
90
-1
HGTV
31
Decorating with Style
<No Description>
<Unknown>
8
9
11
0
30
-1
HIST
32
Shogun
<No Description>
Drama
8
9
11
0
120
36
-1
HSN
33
Beauty
<No Description>
<Unknown>
8
9
11
0
60
-1
INSP
34
Hope for Life's Journey
<No Description>
Religion
8
```

APPENDIX A
92500.937

```
9
11
0
30
94
-1
JCN
35
Home Computing
<No Description>
<Unknown>
8
9
11
0
30
-1
LIFE
36
Main Ingredient
<No Description>
Cooking
8
9
11
0
30
25
-1
ME/U
39
Language Around the World
<No Description>
<Unknown>
8
9
11
0
30
-1
NICK
42
Allegra's Window
<No Description>
Children
8
9
11
0
30
21
-1
SCI
48
Dark Shadows
<No Description>
Serial
8
9
11
0
30
104
-1
TEL
54
Sevcec
<No Description>
Discusión
8
9
```

APPENDIX A
92500.937

```
11
0
60
-1
TLC
55
Elementary Spanish
<No Description>
<Unknown>
8
9
11
0
60
-1
TNT
58
Knots Landing
<No Description>
Drama
8
9
11
0
60
36
-1
TRAV
59
Taste for Travel with Burt Wolf
<No Description>
<Unknown>
8
9
11
0
30
-1
UNI
60
Pícara soñadora
<No Description>
Novela
8
9
11
0
60
82
-1
USA
62
Just the Ten of Us
<No Description>
Comedy
8
9
11
0
30
22
-1
WGN
65
Charlie's Angels
<No Description>
Crime Drama
8
9
11
0
```

```
60
27
36
-1
WOR
66
Partridge Family
<No Description>
Comedy
8
9
11
0
30
22
-1
DIS
14
DuckTales
<No Description>
Cartoon
8
9
11
0
25
19
-1
TBS
52
```

LEARNTV TEXT FILES

```
# network.txt

# List of Networks for use with Learntv
# Jasba Simpson

A&E
ABC
AMC
AT
BET
BRAV
CAR
CBS
CNBC
CNN
COM
CRT
CSP2
CSPN
DIS
DSC
E!
ENC
ESP2
ESPN
F&V
FAM
FLIX
FOOD
FOX
FOXM
GALA
GOLF
HBO
HBO2
HBO3
HGTV
HIST
HSN
INSP
JCN
LIFE
MAX
MAX2
ME/U
MTV
NBC
NICK
NOST
PBS
```

APPENDIX A
92500.937

Express Mail #EM100740937US

PLAY
Q2
QVC
SCI
SHO
SHO2
STRZ
TBS
TCM
TEL
TLC
TMC
TNN
TNT
TRAV
UNI
UPN
USA
VH1
WB
WGN
WOR
f/X

--- topics.txt

List of all topics used by Learntv
Jasba Simpson

ABC
Academic Contest
Adolescentes
Adventure
Animation
Anthology
Arts
Auto
Auto Racing
Auto Repair
Aventura
Ballet
Baptist
Baseball
Biblical
Biography
Boating
Boxing
Business
Cartoon
Catholic
Children
Comedy

APPENDIX A
92500.937

Computers
Concert
Cooking
Crafts
Crime
Current Events
Dance
Debate
Discussion
Disney
Docudrama
Documentary
Drag Racing
Drama
Dramatization
Driver
Economics
Education
Exercise
Extreme Sports
Fantasy
Fashion
Finance
Fishing
Fitness
Football
Game
Gardening
Golf
Gospel Music
Health
History
Home
Home Improvement
Home Projects
Home Repair
Horror
Horse Racing
Hunting
In German
In Spanish
Information
Instruction
Interior Decorating
Interview
Lecture
Lottery
Magazine
Medicine
Methodist
Motor Sports
Motorcycle Racing
Music
Music Videos

APPENDIX A
92500.937

Musical
Mystery
Nature
News
Newsmagazine
Novela
Nutrition
Olympics
Opera
Outdoors
Parenting
Pet Care
Phone-In
Politics
Profile
Puppets
Racing
Religion
Renovation
Repair
Report
Restoration
Retrospective
Review
Satire
Science
Science Fiction
Serial
Shopping
Social Studies
Sociology
Speculation
Speech
Sports
Technology
Teenagers
Terror
Thriller
Travel
Variety
Viewpoint
Western
Wildlife
Woodworking

APPENDIX A
92500.937

4

Express Mail #EM100740937US

Appendix B

LEARNTV

```c
// header.h
//
// global definitions for LearnTV
// Jasba Simpson
// include <stdio.h>
include <bios.h>
#include <ctype.h>
#include <stdlib.h>
#include <math.h>
#include <dos.h>
#include <conio.h>
#include <string.h>
#include <fstream.h>
#include <time.h>
#include <iostream.h>
#include <io.h>
#include <fcntl.h>
#include <process.h>
#include <alloc.h>
#include <dos.h>
#include <stdlib.h>

// Include the GX Development Series defines
#include "c:\genus\include\gxlib.h"
#include "c:\genus\include\grlib.h"
#include "c:\genus\include\txlib.h"
#include "c:\genus\include\pcxlib.h"

define   BUFMAX     6384           // GX Kernel buffer size define MAX_DSS 500
define MAX_CHAR 300
#define MAX_PROGRAMS 300
#define MAX_TOPICS 125
#define MAX_CHANNELS 100
#define MAX_TOPICS_PER_PROGRAM 3
#define PRIMARY_OUTPUT 0
#define SECONDARY_OUTPUT 1

// margins, adjust for fonts
#define X_START 50
#define Y_START 50
#define XMARGIN 70
#define YMARGIN 40
#define XRESPONSE      595
#define YRESPONSE 120

// layout, adjust for fonts
#define BAR_WIDTH 7
#define RANK_START            X_START
#define NETWORK_START    RANK_START + grMaxX()/8
#define NAME_START               NETWORK_START + grMaxX()/8
define TYPE_START       NAME_START + grMaxX()/3 define PRIMARY_OUTPUT    0
define SECONDARY_OUTPUT  1

// colors
#define GREENISH GREEN
#define REDISH RED
#define FCOLOR gxWHITE
#define BCOLOR gxBLUE
```

1

APPENDIX B
92500.937

Express Mail #EM100740937US

```
#define SHADOW gxBLACK

// PCX Globals                               /* PCX Header structure     */
PCXHEADER  pcxhdr;
short      pcxtype, ctype;                   /* PCX display and color type */
char       pcximage[65] = "tvblur.PCX";      /* PCX image filename      */
char       pcxpal[768];                      /* Palette                 */
char       buffer[BUFMAX];                   /* Kernel buffer           */

// GX Globals
GXHEADER   vhptr;
GXHEADER   vhptr2;
short      gxtype = gxVGA_12;    /* <-- Change this constant for your display */

// Text Globals
char     txfont[] = "c:\\genus\\fonts\\HED22.GFT";
char     txfont_s[] = "c:\\genus\\fonts\\HED38.GFT";
char     txhead[] = " ";
short    vmajor, vminor;
char     txmessage[128];
TXHEADER tv;
TXHEADER tvs; // Small
```

```
//////////////////////////////////////////////////////////////////////////
// ir.cpp
//
// JDS Infrared Xpander 2 Firmware for LearningTV
// WDI - Cambridge
// Scott Miller Begins 6 Sept 96
// Mod 26 Sept 96
//////////////////////////////////////////////////////////////////////////
//     functions:
//
//     int change_channel(int dss_rec,int channel)
//              returns(1) if parameters out of bounds, else (0)
//
// void pip(void)
//     routine to switch between video 1 and video 2 feeds using pip
//
// void open_serial(void)
//     opens COM6 and COM7
//
// void close_serial(void)
//              closes COM6 and COM7
//
//////////////////////////////////////////////////////////////////////////

/*************************** #includes ***************************/
//#include "header.h"

/*************************** #defines  ***************************/
//#define DEBUG                             1      //0 to run, 1 to print instead of write define PORT_COM6                           5
define PORT_COM7                           6
#define UPLOAD_REQ_LEN          10
#define LEARN_LEN                           16
#define PLAY_LEN                14
#define RESET_LEN                           8
#define ERROR                   -1
#define UART_PARAMS             0x03 | 0xA0 // 2400 bps 8 data 1 stop no parity
#define MIN_CHAN_NO                         1
#define MAX_CHAN_NO                         999
#define MIN_DSS                             1      // if change -> must change switch cases
#define MAX_DSS                             6
#define DELAY_TIME                          350    // time between DSS ir commands
#define PIP_DELAY1              850
```

APPENDIX B
92500.937

```c
#define PIP_DELAY2      800
#define PIP_DELAY3      450
#define PIP_DELAY4      350
define MAX_MOVE                    3           // number of pip moves /************************* globals ****************************/
static int port_handle1 = NULL, port_handle2 = NULL;
static char *LEARN_HEADER = "6C86F40";
static char *LEARN_FOOTER = "0A000000";
static char *PLAY_HEADER  = "6C85F50";
static char *PLAY_MIDDLE  =       "012";
static char *PLAY_FOOTER  = "00";
//static char play_kludge[PLAY_LEN];
//static char learn_kludge[LEARN_LEN];
static char *play_pip    = "6C85F510012400";
static char *play_switch = "6C85F511012400";
static char *play_move   = "6C85F512012400";
static char *learn_pip    = "6C86F4100A000000";
static char *learn_switch = "6C86F4110A000000";
static char *learn_move   = "6C86F4120A000000";

/*************************** Prototypes ******************************/
void open_serial(void);
void close_serial(void);
int  change_channel(int dss_no, int channel_no);
void pip(void);

// learning ir commands -> do not change
void learn_channel(void);
void learn_pip_commands(void);

/*************************** function main() ******************************/
void main_ir(void)
{
  int dss_no, channel_no, err_chk, done = 0;
  int option;

while(done != 1)
  {
#if DEBUG
   printf("RUNNING IN DEBUG MODE !!!\n");
#endif
        printf("\nEnter Selection:\n\n");
    printf("0 -> Open Com6 & Com7\n");
        printf("1 -> DSS\n");
    printf("2 -> PIP\n");
    printf("3 -> Learn DSS\n");
    printf("4 -> Learn PIP\n");
    printf("5 -> Close Com6 & Com7\n");
    printf("6 -> Quit\n\n");

option = getch();

switch (option)
    {
                case '0':
        open_serial();
        break;

case '1':
        printf("\nEnter channel and DSS number:");
                scanf("%d %d", &channel_no, &dss_no);
                err_chk = change_channel(dss_no, channel_no);
                if(err_chk)
                            printf("Invalid parameters!!\n");
                break;

case '2':
                pip();
                break;
```

```
            case '3':
                    learn_channel();
                            break;
                case '4':
                        learn_pip_commands();
                            break;

case '5':
                close_serial();
                break;

case '6':       // Quit
                    done = 1;
                    break;

default: break;
        } // switch

} // while

} // main

/*************************** definitions ******************************/
void open_serial(void)
{
        int com_status1 = 0, com_status2 = 0;

// open comm 6
#if DEBUG
        printf("Simulated COM6 and COM7 open\n");
#else
    if ((port_handle1 = open("COM6", O_RDWR | O_BINARY)) == -1)
                {
                        cprintf("\n\rCouldn't open Com6, Exiting");
                        //return(ERROR);
                }

//      Reset Communication Parameters
        com_status1 = bioscom(_COM_INIT,UART_PARAMS,PORT_COM6);
        if(com_status1 & 0x8000)
                {
                        cprintf("\n\rCommunication Parameters Questionable");
                }

// open comm 7
        if ((port_handle2 = open("COM7", O_RDWR | O_BINARY)) == -1)
                {
                        cprintf("\n\rCouldn't open Comm7, Exiting");
                        //return(ERROR);
                }

//      Reset Communication Parameters
        com_status2 = bioscom(_COM_INIT,UART_PARAMS,PORT_COM7);
        if(com_status2 & 0x8000)
                {
                        cprintf("\n\rCommunication Parameters Questionable");
                }
#endif
}

/**********************************************************************/
void close_serial(void)
{
#if DEBUG
        printf("Simulated COM6 and COM7 Closed\n");
#else
        close(port_handle1);
```

APPENDIX B
92500.937

```
   close(port_handle2);
#endif
}
/****************************************************************/
int change_channel(int dss_no, int channel_no)
{
        int chan_digit[4], index;
   char play_num[80], junk1[2], junk2[2];
   enum {port1 = 1, port2 = 2, port3 = 4, port4 = 8};

// error check
   if ((channel_no < MIN_CHAN_NO) || (channel_no > MAX_CHAN_NO) ||
       (dss_no < MIN_DSS)       || (dss_no > MAX_DSS))
       {
        return(1);
       } if(channel_no >= 100)
        chan_digit[0] = (channel_no - (channel_no % 100))/100;
   else
        chan_digit[0] = 0;

if(channel_no >= 10)
        chan_digit[1] = ((channel_no - 100 * chan_digit[0])-(channel_no % 10))/10;
   else
        chan_digit[1] = 0;

chan_digit[2] = (channel_no - 100 * chan_digit[0] - 10 * chan_digit[1]);
   chan_digit[3] = 11;  // kludge for enter for (index = 0; index < 4; index++)
   {
           strcpy(play_num, PLAY_HEADER);
      if(chan_digit[index] != 11)
      {
              if (chan_digit[index] == 9)  // xpander address start at 1, not 0
              {
                strcpy(junk1,"A");
              }
              else
              {
                itoa((chan_digit[index]+1), junk1, 10);
              }
      }
      else
      {
         strcpy(junk1,"B");  // enter
              }
      junk1[1]='\0';

strcat(play_num, junk1);
           strcat(play_num, PLAY_MIDDLE);
      switch(dss_no)
      {
       case 1: case 5:
         itoa(port1,junk2,10);
         break;

case 2: case 6:
         itoa(port2,junk2,10);
          break;

case 3:
         itoa(port3,junk2,10);
         break;

case 4:
         itoa(port4,junk2,10);
          break;
```

APPENDIX B
92500.937                                           Express Mail #EM100740937US

```
            )
        junk2[1]='\0';

strcat(play_num, junk2);
        strcat(play_num, PLAY_FOOTER);
//      strcpy(play_kludge, play_num);

if(dss_no <= 4)
#if DEBUG
                        printf("IR Command: %s\n", play_num);
#else
        write(port_handle1, &play_num, PLAY_LEN);
#endif
        else
#if DEBUG
                        printf("IR Command: %s\n", play_num);
#else
        write(port_handle2, &play_num, PLAY_LEN);
#endif
        delay(DELAY_TIME);
     } // for
     return(0);
)

/****************************************************************/
void learn_channel(void)
{
 int selection;
 char memory_address[2], learn_code[80];

printf("Enter Channel Number to Learn (enter = 11): \n");
        scanf("%d", &selection);
    if((selection >= 0) && (selection <= 9))
    {
        printf("Press Channel %d on the remote now.\n", selection);
        if(selection == 9)
          strcpy(memory_address,"A");
        else
          itoa((selection+1), memory_address, 10);
        memory_address[1]='\0';
                strcpy(learn_code, LEARN_HEADER);
        strcat(learn_code, memory_address);
        strcat(learn_code, LEARN_FOOTER);
        printf("IR command: %s   \n",learn_code);
//      strcpy(learn_kludge, learn_code);
#if !DEBUG
        write(port_handle1, &learn_code, LEARN_LEN);
        write(port_handle2, &learn_code, LEARN_LEN);
#endif
    )
    else
    {
        if(selection == 11)
        {
          printf("Press Enter on the remote now.\n");
          strcpy(learn_code, LEARN_HEADER);
          strcat(learn_code, "B");
          strcat(learn_code, LEARN_FOOTER);
          printf("\nIR command: %s   \n\n",learn_code);
//        strcpy(learn_kludge, learn_code);
#if !DEBUG
          write(port_handle1, &learn_code, LEARN_LEN);
          write(port_handle2, &learn_code, LEARN_LEN);
#endif
        }
        else
          printf("Selection out of bounds\n");
    }
 }

/****************************************************************/
```

APPENDIX B
92500.937

Express Mail #EM100740937US

```c
void learn_pip_commands(void)
{
        int selection;
    char temp1[80], temp2[80], temp3[80], memory_address[1];

printf("Choose from the following options:\n");
    printf("1 -> Learn PIP\n");
    printf("2 -> Learn Switch\n");
    printf("3 -> Learn Move\n");

scanf("%d",&selection);

switch (selection)
            {
            case 1:
                        printf("Press PIP Button on TV Remote Now\n");
            printf("PIP Learn command: %s\n", learn_pip);
#if !DEBUG
                        strcpy(temp1, learn_pip);
            memory_address[0]='\0';
                        strcat(temp1, memory_address);
                    write(port_handle1, &temp1, LEARN_LEN);
                    write(port_handle2, &temp1, LEARN_LEN);
#endif
            break;

case 2:
                        printf("Press Switch Button on TV Remote Now\n");
            printf("Switch Learn command: %s\n", learn_switch);
#if !DEBUG
                        strcpy(temp2, learn_switch);
            memory_address[0]='\0';
                        strcat(temp2, memory_address);
                    write(port_handle1, &temp2, LEARN_LEN);
                    write(port_handle2, &temp2, LEARN_LEN);
#endif
            break;

case 3:
                        printf("Press Move Button on TV Remote Now\n");
            printf("Move Learn command: %s\n", learn_move);
#if !DEBUG
                        strcpy(temp3, learn_move);
            memory_address[0]='\0';
                        strcat(temp3, memory_address);
                    write(port_handle1, &temp3, LEARN_LEN);
                    write(port_handle2, &temp3, LEARN_LEN);
#endif
            break;

default: break;
        }
}
/*******************************************************************/
void pip(void)
{
 int counter;
 char temp1[80], temp2[80], temp3[80], memory_address[1];

#if DEBUG
     printf("PIP Play Command: %s\n",play_pip);
     printf("Switch Play Command: %s\n",play_switch);
     for (counter = 0; counter <= MAX_MOVE; ++counter)
        {
         printf("Move Play Command: %s\n",play_move);
        }
     printf("PIP Play Command: %s\n",play_pip);
     printf("PIP Play Command: %s\n",play_pip);
#else
```

APPENDIX B
92500.937

Express Mail #EM100740937US

```
            strcpy(temp1, play_pip);                    // 1 = pip
    memory_address[0]='\0';
    strcat(temp1, memory_address);

strcpy(temp2, play_switch);                         // 2 = switch
    memory_address[0]='\0';
    strcat(temp2, memory_address);

strcpy(temp3, play_move);                           // 3 = move
    memory_address[0]='\0';
    strcat(temp3, memory_address);

write(port_handle2, &temp1, PLAY_LEN);              // pip
    delay(PIP_DELAY1);

write(port_handle2, &temp2, PLAY_LEN);              // switch
    delay(PIP_DELAY2);

for (counter = 0; counter <= MAX_MOVE; ++counter)
    {
        write(port_handle2, &temp3, PLAY_LEN);          // move
        delay(PIP_DELAY3);
    } write(port_handle2, &temp1, PLAY_LEN);              // pip
    delay(PIP_DELAY4);

write(port_handle2, &temp1, PLAY_LEN);              // pip
#endif
}
/********************** end of this file *****************************/

///////////////////////////////////////////////////////////////////////
// clrgrph.cpp
//
// Graphics Output Module for LearnTV
// v. 2.0
// Gillian Lee
// Last Modified 9/15/96
//
// Functions for External Use
// Graphics Kernel: init_graphics, close_graphics
// Drawing Functions: make_graph, show_description, show_command, show_response,
//                                                  show_title, show_command,
// show_recommendation
///////////////////////////////////////////////////////////////////////

///////////////////////////////////////////////////////////////////////
// Graphics Kernel:
//              select_display
//              init_graphics, startup_graphics
//              close_graphics, cleanup_graphics
//              clear_output
///////////////////////////////////////////////////////////////////////

///////////////////////////////////////////////////////////////////////
int select_display(int monitor)
// selects display 0 (LTV monitor) or display 1 (secondary output)
// returns 1 if successful, 0 if not successful
///////////////////////////////////////////////////////////////////////
{
    #if LEARNTV
        int SCPAddress = 0x348;         // hardware address of graphics card
        unsigned char SCP,PCP;                          // hardware addresses of control
ports
```

APPENDIX B
92500.937

```
        if ((monitor != PRIMARY_OUTPUT) && (monitor != SECONDARY_OUTPUT))
    {
        cerr << "\Call to select_display failed.\nMonitor must be 0 or 1";
              return 0;
    }

SCP = ((monitor * 2)+1) & 0x03;     // 1 for port 0, or 3 for port 1 if (monitor < 2)                                  // each graphics card supports 2
ports
              PCP = 0;
        else
              PCP = monitor / 2;

outport (SCPAddress+4,PCP);       /* Output to PCP to select card */
        outport (SCPAddress,SCP);         /* Output to SCP to select A or B */
        #endif
    return 1;
}

////////////////////////////////////////////////////////////////////////
void clear_output()
// clears output display
////////////////////////////////////////////////////////////////////////
{
        #if LEARNTV || GRAPHICS
    select_display(SECONDARY_OUTPUT);
    txSetViewPort(0,0,grMaxX(),grMaxY());
    txSetColor (FCOLOR, BCOLOR);
    //gxClearDisplay(BCOLOR, 0);
    gxVirtualDisplay(&vhptr, 0, 0, 0, 0, 640, 480, 0);
    select_display(PRIMARY_OUTPUT);
    #else
    clrscr();
    #endif
} void far * far pascal MyFarMalloc(unsigned long bytes)
{
    return (farmalloc(bytes));
} short far pascal MyFarFree(void far *ptr)
{
    farfree(ptr);
    return (0);
} unsigned long far pascal MyFarCoreLeft(void)
{
    return (farcoreleft());
}
////////////////////////////////////////////////////////////////////////
void init_genus_graphics()
// initializes graphics if required
// returns 1 if successful, 0 if not successful
////////////////////////////////////////////////////////////////////////
{
    #if LEARNTV || GRAPHICS
    int retcode;
    short rc;
        long vfree, vsize;

rc = gxSetUserMalloc(MyFarMalloc,MyFarFree,MyFarCoreLeft);
    if (rc != gxSUCCESS) {
```

9

APPENDIX B
92500.937

Express Mail #EM100740937US

```
    cout << "gxSetUserMalloc error: [%d] ...\n" <<rc <<endl;
}
#if DEBUG
printf("Virtualfree: %lu\n",gxVirtualFree(gxCMM));
rc = gxInit();
printf("Virtualfree: %lu\n",gxVirtualFree(gxCMM));
rc = gxDone();
printf("Virtualfree: %lu\n",gxVirtualFree(gxCMM));
getch();
endif
        /* Allocate a larger toolkit buffer, to speed up file and display speed. */
        /* The kernel defaults to allocating a 4KB buffer during initialization, */
        /* but if you can spare more memory than that, allocate it before gxInit. */
        /* REMEMBER: This MUST be a GLOBAL buffer (ie, declare OUTSIDE of procs) */
        gxSetBuffer(buffer, BUFMAX);

// Initialize GX Kernel
        retcode = gxInit();
    if (retcode != gxSUCCESS)
    {
    printf("GX Kernel initialization failed: %d\n", retcode);
    exit(1);
        }

/* Get PCX header from the file */
    rc = pcxGetFileHeader(pcximage, &pcxhdr);
#if DEBUG
    cout << "get file header: " <<rc << endl;
    getch();
endif
    if (rc == gxSUCCESS) {
      /* Get display type from file */
      pcxtype = pcxGetFileType(pcximage);
#if DEBUG
        cout << "Display Type: "<<pcxtype <<endl;
        getch();
endif
      /* See if we can display the image with current hardware */
      if (gxVerifyDisplayType(pcxtype) != gxSUCCESS) {
        /* No, so try to map it to another type */
        ctype   = gxGetColorType(pcxhdr.nplanes*pcxhdr.bitpx);
        pcxtype = gxMatchDisplayType(gxDETECT, gxDETECT, ctype, gxMATCHHW);
#if DEBUG
        cout << "Display Type: "<<pcxtype <<endl;
        getch();
endif
      }
      /* Make sure we did determine the display type */
      if ((pcxtype >= pcxMINDISP) && (pcxtype <= pcxMAXDISP)) {
            #if LEARNTV
            select_display(PRIMARY_OUTPUT);
            rc = gxSetDisplay(gxGRAPHICS);
                        select_display(SECONDARY_OUTPUT);
            #endif
        /* Set the display type and mode we will be using */
        if ((rc = gxSetDisplay(pcxtype)) == gxSUCCESS) { if LEARNTV
            select_display(PRIMARY_OUTPUT);
            rc = gxSetMode(gxGRAPHICS);
                        select_display(SECONDARY_OUTPUT);
            #endif
          /* Now enter graphics mode */
          if ((rc = gxSetMode(gxGRAPHICS)) == gxSUCCESS) {

/* We are in graphics mode, so get the image file palette */
            if (pcxGetFilePalette(pcxtype, pcximage, pcxpal) == gxSUCCESS) {
              /* Now set it */
              #if LEARNTV
              select_display(PRIMARY_OUTPUT);
              gxSetDisplayPalette(pcxpal);
```

APPENDIX B
92500.937

Express Mail #EM100740937US

```
        select_display(SECONDARY_OUTPUT);
        #endif
        gxSetDisplayPalette(pcxpal);
      }

/* Check for any errors */
      if (rc != gxSUCCESS) {
        /* Error displaying the file */
        printf("pcxFileDisplay error: %d\n", rc);
      }

}
    else {
      /* Error setting the mode */
      printf("gxSetMode error: %d\n", rc);
    }
  }
  else {
    /* Error setting the display type */
    printf("gxSetDisplay error: %d\n", rc);
  }
}
else {
  /* Error determining display type */
  printf("This image requires different hardware: %d\n\n", pcxtype);
  printf("Try using the pcxColor utility to convert the image to the\n");
  printf("number of colors appropriate for your adapter, or see the \n");
  printf("pcxDith example program for an example of color dithering.\n\n");
}

}
else {
  /* Error reading PCX header */
  printf("pcxGetFileHeader error: %d\n\n", rc);

printf("Make sure that the image %s is in the current directory.\n\n", pcximage);
}
#if DEBUG
cout << "Opened Graphics Mode Successfully" <<endl;
getch();
endif select_display(SECONDARY_OUTPUT);

pcxFileDisplay(pcximage, 0, 0, 0);
vfree = gxVirtualFree(gxEMM);
vsize = gxVirtualSize(pcxtype, 640, 480);

if(vfree > vsize)    //sufficient conventional memory
{
    retcode = gxCreateVirtual(gxEMM, &vhptr, pcxtype, 640, 480);
    retcode = gxCreateVirtual(gxEMM, &vhptr2, pcxtype, 640, 480);
    if (retcode == gxSUCCESS)
    {
      gxDisplayVirtual(0,0,640,480,0,&vhptr,0,0);
      gxDisplayVirtual(XRESPONSE-200, YRESPONSE, 640, YRESPONSE + 40,0,&vhptr2,0,0);
    }
}
else
{
#if DEBUG
cout << "Unable to open Virtual Buffer" <<endl;
getch();
endif
}

// load font
    txFileFont(gxEMM,txfont,&tv);
    txFileFont(gxEMM,txfont_s,&tvs);
```

APPENDIX B
92500.937

Express Mail #EM100740937US

```
        // small white shadowed font
    txSetFont(&tvs);
        txSetColor(FCOLOR,BCOLOR);
    txSetFace(txSHADOW | txTRANS );
    txSetShadowPos(2,2);
    txSetShadowColor(SHADOW);

// large white shadowed font
    txSetFont(&tv);
        txSetColor(FCOLOR,BCOLOR);
    txSetFace(txSHADOW | txTRANS);
    txSetShadowPos(2,2);
    txSetShadowColor(SHADOW);

#if DEBUG
      cout << "Font Loaded and set" <<endl;
      getch();
    #endif endif
}
///////////////////////////////////////////////////////////////////
int startup_graphics()
// Graphic Startup
// returns 1 if successful, 0 if not successful
///////////////////////////////////////////////////////////////////
{

// Must init vga 0 BEFORE vga 1 .
    #if GRAPHICS || LEARNTV
    init_genus_graphics();
    select_display(PRIMARY_OUTPUT);
    // Setup TV Screen
    select_display(SECONDARY_OUTPUT);
        //clear_output();

// Return to primary output
    select_display(PRIMARY_OUTPUT);
    #endif return 1;
}

///////////////////////////////////////////////////////////////////
void close_graphics() {
// shuts down graphics if required
/////////////////////////////////////////////////////////////////// if LEARNTV || GRAPHICS if LEARNTV
    select_display(PRIMARY_OUTPUT);
    gxSetMode(gxTEXT);
    select_display(SECONDARY_OUTPUT);
    #endif
    gxSetMode(gxTEXT);
    select_display(PRIMARY_OUTPUT);
    gxDone();   // shut down graphics system
    #endif
    return;

}
```

APPENDIX B
92500.937

Express Mail #EM100740937US

```
///////////////////////////////////////////////////////////////
int cleanup_graphics()
// Graphic clean-up
// returns 1 if successful, 0 if not successful
///////////////////////////////////////////////////////////////
{
    // Must close vga 0 BEFORE vga 1
    gxDestroyVirtual(&vhptr);
    gxDestroyVirtual(&vhptr2);
    select_display(PRIMARY_OUTPUT);
    close_graphics();
    select_display(SECONDARY_OUTPUT);
    close_graphics();
    select_display(PRIMARY_OUTPUT);
    return 1;
}

///////////////////////////////////////////////////////////////
///////////////////////////////////////////////////////////////
///////////////////////////////////////////////////////////////

///////////////////////////////////////////////////////////////
// draws the current interest level for num_elements topics
// first of two functions
void make_graph(float *p, char **topics, int num_elements, int per_screen)
{
    int i;                          // topic counter,
    #if LEARNTV || GRAPHICS
    //int j;
    int center, element_depth;      // unit counter, current yposition
    int right, bottom;              // coordinates of bar
    int unit, remainder, new_graph_margin, graph_margin = 50;
    int y;

// setting up graphics
    clear_output();
    select_display(SECONDARY_OUTPUT);
    txSetColor (FCOLOR, BCOLOR);
    //gxClearDisplay(BCOLOR, 0);
    txSetAlign(txCENTER, txTOP);
    txMoveTo(grMaxX()/2, graph_margin + 60);
    txOutText("Guest Profile");
    y = txGetY() + txChrHeight() + 15;

txSetAlign(txCENTER, txBOTTOM);

// each pixel must represent a whole value
    remainder = (grMaxX()-2*graph_margin) % 10;
    if (remainder)
    {
        new_graph_margin = graph_margin - remainder/2;
        graph_margin = new_graph_margin;
    }

// positioning values
    unit = (grMaxX() - 2*graph_margin)/10;
    center = graph_margin + 5*unit;

//element_depth = ((int)( (grMaxY()-2*graph_margin) / per_screen) );
    element_depth = ((int)( (grMaxY() - graph_margin - y) / per_screen) + 10 );
    bottom = y + element_depth;
    //bottom = graph_margin + element_depth + 10;

// draw scale for (i = 0; i < num_elements; i++)
```

```
{
  // draw scale
      grSetFillStyle(grFSOLID, grGRAY, grOPAQUE);
   grDrawRect(graph_margin, bottom - BAR_WIDTH, graph_margin + 10*unit , bottom, grFILL);

// draw data
  right = center + (p[i] * (10*unit)) - (5*unit);
  if (p[i] <= 0.5) grSetFillStyle(grFSOLID, REDISH, grOPAQUE);
  else grSetFillStyle(grFSOLID, GREENISH, grOPAQUE);
  grDrawRect(center, bottom - BAR_WIDTH + 1, right, bottom - 1, grFILL);

bottom += element_depth;
}

// draw scale

//for(j=0; j<11 ; j++) {
//  -   grSetColor(BCOLOR);
//      grDrawLine(graph_margin + j*unit, 0, graph_margin + j*unit, grMaxY());
//}

// draw topic names
bottom = y + element_depth;
for (i = 0; i < num_elements; i++)
{
   txMoveTo(center, bottom - BAR_WIDTH);
   txOutText(topics[i]);
   bottom += element_depth;
}
select_display(PRIMARY_OUTPUT);
#else
for (i = 0; i < num_elements; i++) {
     cout << topics[i] << "\t\t" << p[i] << endl;
}
    #endif
}
/////////////////////////////////////////////////////////////////////
// draws the previous and current interest level for num_elements topics
// function overloading of make_graph
void make_graph(float *p, float *p2, char **topics, int num_elements, int per_screen)
{
     int i;
  #if LEARNTV || GRAPHICS       // topic counter
       //int j;
  int center, element_depth;  // unit counter, current yposition
       int right1, right2, bottom;   // coordinates of bar
       int unit, remainder, new_graph_margin, graph_margin=50;
  int y;

// setting up graphics
  clear_output();
       select_display(SECONDARY_OUTPUT);
       txSetColor (FCOLOR, BCOLOR);
       // gxClearDisplay(BCOLOR, 0);
       txSetAlign(txCENTER, txTOP);
  txMoveTo(grMaxX()/2, graph_margin + 60);
       txOutText("Guest Profile");
  y = txGetY() + txChrHeight() + 15;

txSetAlign(txCENTER, txBOTTOM);

// each pixel must represent a whole value
       remainder = (grMaxX()-2*graph_margin) % 10;
       if (remainder)
       {
       new_graph_margin = graph_margin - remainder/2;
    graph_margin = new_graph_margin;
       } unit = (grMaxX() - 2*graph_margin)/10;
```

APPENDIX B
92500.937

Express Mail #EM100740937US

```
center = graph_margin + 5*unit;

element_depth = ((int)( (grMaxY() - graph_margin - y) / per_screen) + 10 );
    bottom = y + element_depth;

// draw scale for (i = 0; i < num_elements; i++)
    {
     // draw scale
     grSetFillStyle(grFSOLID, grGRAY, grOPAQUE);
   grDrawRect(graph_margin, bottom - 2*BAR_WIDTH, graph_margin + 10*unit , bottom, grFILL);

// draw data
    right1 = center + (p[i] * (10*unit)) - (5*unit);
    right2 = center + (p2[i] * (10*unit)) - (5*unit);

if (p[i] <= 0.5) grSetFillStyle(grFSOLID, REDISH, grOPAQUE);
    else grSetFillStyle(grFSOLID, GREENISH, grOPAQUE);
    grDrawRect(center, bottom - 2*BAR_WIDTH + 1, right1, bottom - BAR_WIDTH - 1, grFILL);

// draw previous values
        grSetFillStyle(grFSOLID, grYELLOW, grOPAQUE);
     grDrawRect(center, bottom - BAR_WIDTH + 1, right2, bottom - 1, grFILL);

bottom += element_depth;
 }

// draw scale
//grSetColor(BCOLOR);
//for(j=0; j<11 ; j++) {
//    grDrawLine(graph_margin + j*unit, 0, graph_margin + j*unit, grMaxY());
//}

// draw topic names
bottom = y + element_depth;
for (i = 0; i < num_elements; i++)
{
  txOutTextXY(topics[i], center, bottom - 2*BAR_WIDTH);
  bottom += element_depth;
}
select_display(PRIMARY_OUTPUT);
 #else
    for (i = 0; i < num_elements; i++) {
    cout << topics[i] << "\t\t" << p[i] << "\t\t" << p2[i] << endl;
  }
 #endif
}

////////////////////////////////////////////////////////////////////////
void show_program_description(class program_description ipd, int live_tv)
// draw program network, name, type and description on output device
// wraps text as necessary
{ int text_height;
  char date[80];

if LEARNTV || GRAPHICS if (!live_tv)
  {
      clear_output();
  }
  else
  {
     select_display(SECONDARY_OUTPUT);
     gxClearDisplay(gxBLUE,0);
  }
  select_display(SECONDARY_OUTPUT);
```

APPENDIX B
92500.937

Express Mail #EM100740937US

```
        txSetViewPort(0,0,grMaxX(),grMaxY());
            txSetColor (FCOLOR, BCOLOR);
    //gxClearDisplay(BCOLOR, 0);
            text_height = txChrHeight();

// Show Date as Title
        strcpy(date,asctime(&ipd.program_time.start));
        txSetAlign(txCENTER, txTOP);
        txMoveTo(grMaxX()/2, Y_START);
        txOutText(date);

// text positioning functions
        txSetViewPort(X_START, 100 + txGetY() + text_height, grMaxX()-50, grMaxY());    // limited to one
    line output
        txSetClipRegion(X_START, 100+txGetY() + text_height, grMaxX()-50, grMaxY());
        txSetClipping(txCLIP);
        txSetAlign(txLEFT, txTOP);

// network
            txOutTextXY("Network:  ", 0, 0);
        txMoveTo(txStrWidth("Network:  "), 0);
        txWrapText(ipd.network);

// name
        txOutTextXY("Name:  ", 0, txGetY() + text_height);
        txMoveTo(txStrWidth("Name:  "), txGetY() + text_height);
        txWrapText(ipd.name);

// type
            txOutTextXY("Type:  ", 0, txGetY() + text_height);
        txMoveTo(txStrWidth("Type:  "), txGetY() + text_height);
            txWrapText(ipd.type);

// description
        txOutTextXY("Description:  ", 0, txGetY() + text_height);
        txMoveTo(txStrWidth("Description:  "), txGetY() + text_height);
        txWrapText(ipd.description);
        txSetClipping(txNOCLIP);
        txSetViewPort(0,0,grMaxX(),grMaxY());

select_display(PRIMARY_OUTPUT);
        #else
            cout    << "Newtwork:     " << ipd.network << endl
                << "Name:         " << ipd.name << endl
                << "Type:         " << ipd.type << endl
                    << "Description:  " << ipd.description << endl;

#endif
    }

///////////////////////////////////////////////////////////////
    void show_title(char * title)
    ///////////////////////////////////////////////////////////////
    { if LEARNTV || GRAPHICS
        clear_output();
            select_display(SECONDARY_OUTPUT);
        txSetViewPort(0,0,grMaxX(),grMaxY());
        txSetColor (FCOLOR, BCOLOR);
        txSetFont(&tvs);
            txSetAlign(txCENTER, txCENTER);
        txOutTextXY(title, grMaxX()/2, grMaxY()/2);
        txSetViewPort(0,0,grMaxX(),grMaxY());
        txSetFont(&tv);
        select_display(PRIMARY_OUTPUT);
```

APPENDIX B
92500.937                                       Express Mail #EM100740937US

```
    #else
        cout << "Title: " << title << endl;

#endif
}
///////////////////////////////////////////////////////////////////
void show_name(char *name)
///////////////////////////////////////////////////////////////////
{
        #if LEARNTV || GRAPHICS
    select_display(SECONDARY_OUTPUT);

txSetViewPort(0,0,grMaxX(),grMaxY());
    txSetColor (FCOLOR, BCOLOR);
    txSetAlign(txCENTER, txCENTER);
    txMoveTo( grMaxX()/2, grMaxY()/10);
    txOutText(name);
    txSetViewPort(0,0,grMaxX(),grMaxY());
    select_display(PRIMARY_OUTPUT);

#else
    cout << command << endl;

#endif
}
///////////////////////////////////////////////////////////////////
void show_command(char *command)
///////////////////////////////////////////////////////////////////
{
        #if LEARNTV || GRAPHICS
    select_display(SECONDARY_OUTPUT);

txSetViewPort(0,0,grMaxX(),grMaxY());
    txSetColor (FCOLOR, BCOLOR);
    txSetAlign(txCENTER, txCENTER);
    txMoveTo( grMaxX()/2, grMaxY() - grMaxY()/16);
    txOutText(command);
    txSetViewPort(0,0,grMaxX(),grMaxY());
    select_display(PRIMARY_OUTPUT);

#else
    cout << command << endl;

#endif
}
///////////////////////////////////////////////////////////////////
int show_response(int response, int mode, int live)
// shows response below in upper right corner of output device
// 0 no, 1 yes, 2 ?, 3 Skip
// 0 hide, 1 show
///////////////////////////////////////////////////////////////////
{
        char response_map[MAX_CHAR];

#if LEARNTV || GRAPHICS
    select_display(SECONDARY_OUTPUT);
    txSetViewPort(0,0,grMaxX(),grMaxY());

if (live)
    {
      if(mode)
      {
         txSetColor (FCOLOR, BCOLOR);
         txSetShadowColor(SHADOW);
      }
      else
```

APPENDIX B
92500.937

Express Mail #EM100740937US

```
    {
       txSetColor (BCOLOR,BCOLOR);
       txSetShadowColor(BCOLOR);
    }
    switch(response)
    {
            case 0: strcpy(response_map,"No");              break;
       case 1: strcpy(response_map,"Yes");          break;
       case 2: strcpy(response_map,"Response?"); break;
       case 3: strcpy(response_map,"Skip");         break;
       default: strcpy(response_map,"Invalid Response");  return 0;
    }
  }
  else
  {
    gxVirtualDisplay(&vhptr2, 0, 0, XRESPONSE - 200, YRESPONSE, 640, YRESPONSE + 40, 0);

if(mode)
    {
        txSetColor (FCOLOR, BCOLOR);
       txSetShadowColor(SHADOW);
       switch(response)
       {
               case 0: strcpy(response_map,"No");            break;
          case 1: strcpy(response_map,"Yes");         break;
          case 2: strcpy(response_map,"Response?"); break;
          case 3: strcpy(response_map,"Skip");           break;
          default: strcpy(response_map,"Invalid Response");  return 0;
          }
    }
  } txSetAlign(txRIGHT, txTOP);
  txOutTextXY(response_map, XRESPONSE, YRESPONSE);
  txSetShadowColor(SHADOW);
  txSetViewPort(0,0,grMaxX(),grMaxY());
  select_display(PRIMARY_OUTPUT);

#else
  switch(response) {
        case 0: strcpy(response_map,"No");            break;
     case 1: strcpy(response_map,"Yes");         break;
     case 2: strcpy(response_map,"Response?");  break;
     case 3: strcpy(response_map,"Skip");          break;
     default: strcpy(response_map,"Invalid Response");  return 0;
  }
  cout << "RESPONSE: " << response_map << endl;

#endif
  return 1;
}

//////////////////////////////////////////////////////////////////////
void show_choices(char *r[20][2], int c[20], int columns, int rows)
// displays a two column table
// font red or GREENISH
//////////////////////////////////////////////////////////////////////
{
      int i, j;
   int current_height = 0, next_height = 0;

if LEARNTV || GRAPHICS clear_output();
   select_display(SECONDARY_OUTPUT);
   txSetViewPort(0,0,grMaxX(),grMaxY());
        txSetColor(FCOLOR, BCOLOR);
   //gxClearDisplay(BCOLOR, 0);
```

18

APPENDIX B
92500.937

Express Mail #EM100740937US

```
// Show Titles
txSetAlign(txCENTER, txTOP);
txMoveTo(grMaxX()/2, Y_START + 60);
txOutText("Program Choices");

txSetAlign(txLEFT, txTOP);
txMoveTo(2*X_START, txGetY() + txChrHeight() + 15);
txOutText("Program Name");
txMoveTo(grMaxX()/2 + X_START, txGetY());
txOutText("Type");

// text positioning functions
txSetAlign(txLEFT, txTOP);
    current_height = txGetY() + txChrHeight() + 10;

for(i=0; i<rows; i++)
{
   if (c[i]) txSetColor(GREENISH, BCOLOR);
   else                   txSetColor(REDISH, BCOLOR);
     for(j=0; j<columns; j++)
     {
           switch(j)    // user must customize column spacing as required
           {
           case 0:
       {
            txSetViewPort(2*X_START, 0, grMaxX()/2, grMaxY());
            txSetClipRegion(2*X_START, 0, grMaxX()/2, grMaxY());
                        txSetClipping(txCLIP);
            txMoveTo(0, current_height);
            break;
       }
           case 1:
       {
            txSetViewPort(grMaxX()/2 + X_START, 0, grMaxX() - 2*X_START, grMaxY());
            txSetClipRegion(grMaxX()/2 + X_START, 0, grMaxX() - 2*X_START, grMaxY());
                        txSetClipping(txCLIP);
            txMoveTo(0, current_height);
            break;
       }
                           default:
       {
                        // error handling code to be added
            break;
       }
        }
             txWrapText(r[i][j]);
       if(txGetY() >= next_height) next_height = txGetY()+txChrHeight();
         }
current_height = next_height + 5;
next_height = 0;
}
     txSetClipping(txNOCLIP);
txSetViewPort(0,0,grMaxX(),grMaxY());
select_display(PRIMARY_OUTPUT);

#else
for(i=0; i<rows; i++)
{
   for(j=0; j<columns; j++)
   {
                    cout << r[i][j] << "\t";
    }
     cout << endl;
}
#endif
}
```

////////////////////////////////////////////////////////////////////////////

APPENDIX B
92500.937

Express Mail #EM100740937US

```
void show_recommendations(char *r[10][4], int columns, int rows, char *date)
// displays a two column table
// font red or GREENISH
//////////////////////////////////////////////////////////////////////
{
    int i, j; // x;
    int current_height = 0, next_height = 0;

if LEARNTV || GRAPHICS clear_output();
    select_display(SECONDARY_OUTPUT);
    txSetViewPort(0,0,grMaxX(),grMaxY());
        txSetColor(FCOLOR, BCOLOR);
    //gxClearDisplay(BCOLOR, 0);

// Show Titles
    txSetAlign(txCENTER, txTOP);
    txMoveTo(grMaxX()/2, Y_START + 60);
        txOutText("Scout Recommendations");
    txMoveTo(grMaxX()/2, txGetY() + txChrHeight() + 5);    txOutText(date);

// Show Subtitles
    txSetAlign(txLEFT, txTOP);
    txMoveTo(RANK_START, txGetY() + txChrHeight() + 10);   txOutText("Rank");
    txMoveTo(NETWORK_START, txGetY());      txOutText("Ntwk");
    txMoveTo(NAME_START, txGetY());                 txOutText("Program Name");
    txMoveTo(TYPE_START, txGetY());                 txOutText("Type");

// text positioning functions
    txSetAlign(txLEFT, txTOP);
        current_height = txGetY() + txChrHeight() + 5;

for(i=0; i<rows; i++)
    {
        for(j=0; j<columns; j++)
        {
            switch(j)    // user must customize column spacing as required
            {
            case 0:
            {
                txSetViewPort(RANK_START, 0, NETWORK_START, grMaxY());
                txSetClipRegion(RANK_START, 0, NETWORK_START, grMaxY());
                            txSetClipping(txCLIP);
                txMoveTo(0, current_height);
                break;
            }
                case 1:
            {
                txSetViewPort(NETWORK_START, 0, NAME_START, grMaxY());
                txSetClipRegion(NETWORK_START, 0, NAME_START, grMaxY());
                            txSetClipping(txCLIP);
                txMoveTo(0, current_height);
                break;
            }
            case 2:
            {
                txSetViewPort(NAME_START, 0, TYPE_START, grMaxY());
                txSetClipRegion(NAME_START, 0, TYPE_START, grMaxY());
                            txSetClipping(txCLIP);
                txMoveTo(0, current_height);
                break;
            }
            case 3:
            {
                txSetViewPort(TYPE_START, 0, grMaxX() - 40, grMaxY());
                txSetClipRegion(TYPE_START, 0, grMaxX() - 40, grMaxY());
                            txSetClipping(txCLIP);
                txMoveTo(0, current_height);
                break;
            }
```

APPENDIX B
92500.937

Express Mail #EM100740937US

```
                        default:
            {
                                        // error handling code to be added
                break;
            }
         }
                txWrapText(r[i][j]);
        if(txGetY() >= next_height) next_height = txGetY()+txChrHeight();
        }
 current_height = next_height + 5;
 next_height = 0;
 }
        txSetClipping(txNOCLIP);
    txSetViewPort(0,0,grMaxX(),grMaxY());
    select_display(PRIMARY_OUTPUT);

#else
 for(i=0; i<rows; i++)
 {
    for(j=0; j<columns; j++)
    {
                        cout << r[i][j] << "\t";
    }
        cout << endl;
 }
 #endif
}

//////////////////////////////////////////////////////////////////////
//////////////////////////////////////////////////////////////////////
// MISC and TESTING functions void test_show_recommendations() {
        char   *r[2][4];
    char *date = "this is the date";
    r[0][0]="p1";
    r[0][1]="p2 This program's name is very long and difficult to read";
    r[0][2]="p3";
    r[0][3]="p4";
    r[1][0]="2p1";
    r[1][1]="2p2";
    r[1][2]="2p3 This program's name is also very long and difficult to read";
    r[1][3]="2p4";
        show_recommendations(&r, 4, 2, date);
} void test_choices() {
            int i;
        char   *r[4][2];
        r[0][0]="p1";
        r[1][0]="p2 This program's name is very long and difficult to read";
        r[2][0]="p3";
        r[3][0]="p4";
        r[0][1]="2p1";
        r[1][1]="2p2";
        r[2][1]="2p3 This program's name is also very long and difficult to read";
        r[3][1]="2p4";
        int c[10];
        for(i=0;i<10;i++) {c[i]=1;} show_choices(&r, c, 2, 4);
} test_makegraph() {
```

APPENDIX B
92500.937

Express Mail #EM100740937US

```
    float p[] = {1.0, 0.1, 0.2, 0.3, 0.4, 0.5, 0.J, 0.7, 0.3, 0.6};
    float p2[] = {0.9, 0.2, 0.3, 0.4, 0.5, 0.4, 0.7, 0.8, 0.2, 0.1};
    char* topics[] = {"cartoon", "news", "western", "sci-fi", "comedy", "drama", "documentary",
"musical", "children", "murder"};
    make_graph(p, topics, 10, 10);
    getch();
    make_graph(p, p2, topics, 10, 10);
    return 1;
} int test_show_program_description()
{
    class program_description ipd;
    ipd.name = "cheers wtih a very \\f long name that must be wrpaed bty the esadsfdf";
    ipd.network = "ABC";
    ipd.type = "comedy";
    ipd.description = "woody brings a new friend to the bar. her name is ellen. ellen sits at the
table and enjoys many beers while talking with woody";
    show_program_description(ipd,0);
    return 1;
} void test_show_response()
{
    //show_channel(888,1);
    //sleep(3);
    //show_channel(888,0);
        show_response(0,1,0);
    sleep(3);
    show_response(0,0,0);
        show_response(1,1,0);
    sleep(3);
    show_response(1,0,0);
    show_response(2,1,0);
    sleep(3);
    show_response(2,0,0);
} void test_show_title()
{
    char *title = "Title";
    show_title(title);
} void test_show_command()
{
    char *command = "Yes/No/Skip";
    show_command(command);
} void test() { init_genus_graphics();
    //vm();
    //test_makegraph();
    //test_show_program_description();
    //test_show_response();
    //test_show_command();
    //test_show_recommendations();
    //test_choices();
    //test_genus();
    //test_show_title();
    //getch();
    close_graphics();
}
```

APPENDIX B
92500.937

Express Mail #EM100740937US

```
///////////////////////////////////////////////////////////////////
// classes.cpp
//
// Classes Definition Module for LearnTV
// v. 2.0
// Gillian Lee
// Last Modified 9/15/96
//
// Functions for External Use
///////////////////////////////////////////////////////////////////
// TOPIC_PREFERENCE
// TOPIC_GUIDE
///////////////////////////////////////////////////////////////////
/*
class topic_preference is an element of class array_topic_preference
array_topic_preference index identifies topic
*/
class topic_preference {
        public:
           double yes, no;
           topic_preference() {yes=0.0; no=0.0;}
                  double expectation();
        double confidence();
        double unrated();
};

double topic_preference::unrated()
{
        return ((yes==0)&&(no==0));
}

/* expectation = (a+1)/(a+b+2) */
double topic_preference::expectation() {
        return (yes+1.0)/(yes+no+2.0);
}

/* confidence = 1 - sigma^2 */
double topic_preference::confidence() {
           double variance;
     double confidence;
     variance =(((yes+1.0)*(no+1.0))/((yes+no+2.0)*(yes+no+2.0)*(yes+no+3.0)));
           if (variance >0)
     {    confidence = 1.0 - sqrt(variance);}
     else
     {
           confidence = 0.0;
     }
     return confidence;
} class topic_guide {
           public:
              class topic_preference atp[MAX_TOPICS];
              int number_topics;
              int load_topics(char *filename);
          int save_topics(char *filename);
              int print_topics();
};

int topic_guide::load_topics(char *filename) { int i; // topic counter if DEBUG
     cout << "Loading" << filename << "\n";
     #endif
     ifstream source_topic_guide(filename);
           if (!source_topic_guide) {
             cerr << "The attempt to open topic guide failed!\n";
           return(0);
```

APPENDIX B
92500.937

Express Mail #EM100740937US

```
    }
    for (i=0;i<number_topics;i++)
    {
       source_topic_guide >> atp[i].yes;
       source_topic_guide >> atp[i].no;
    }
    source_topic_guide.close();
    return 1;
} int topic_guide::save_topics(char *filename) { int i; // topic counter if DEBUG
   cout << "Saving " <<filename << "\n";
   #endif
   ofstream source_topic_guide(filename);
        if (!source_topic_guide) {
         cerr << "The attempt to Save topic guide failed!\n";
      return(0);
    }

// Save all topics
        for (i=0;i<number_topics;i++)
    {
        source_topic_guide << atp[i].yes << "\t"
                                          << atp[i].no << endl;
    }
    source_topic_guide.close();
    return 1;
} int topic_guide::print_topics() { int topic = 1;   // topic counter while(topic <= number_topics) {
       cout << topic << "\t"
                       << atp[topic].yes << "\t"
            << atp[topic].no << "\n";
       topic++;
    }
    getch();
    return 1;
} int test_topic_guide() { char *filename = "..\\guest\\jasbat.TXT";
   char *filename2 = "..\\guest\\jasbat2.TXT";
        class topic_guide instance_topic_guide;
        class topic_guide instance_topic_guide2;

instance_topic_guide.load_topics(filename);
        instance_topic_guide.print_topics();
   instance_topic_guide.save_topics(filename2);

instance_topic_guide2.load_topics(filename2);
        instance_topic_guide2.print_topics();
   getch();
   return 1;
}

///////////////////////////////////////////////////////////////////
// TIME
///////////////////////////////////////////////////////////////////

// time class
class my_time {
```

APPENDIX B
92500.937

Express Mail #EM100740937US

```
        public:
                struct tm start;
        int duration;
            int is_on(struct tm now);
            int print();
};
//////////////////////////////////////////////////////////////////////
// TOPIC_NAME
//      TOPIC_MAP
////////////////////////////////////////////////////////////////////// class topic_name {
        public:
            char *name;
};

class topic_map {
        public:
            class topic_name atn[MAX_TOPICS];
        int number_names;
            int load_names(char *filename);
        int print_names();
};

int topic_map::load_names(char *filename) { int i; // name counter
    char name[MAX_CHAR]; // input buffer ifstream source_names(filename);
          if (!source_names)
    {
            cerr << "The attempt to open "<< filename << " failed!\n";
        return(0);
    }
    /* dynamically allocate memory for program features */
    i=0;
    while(!source_names.eof())
    {
            source_names.getline(name, MAX_CHAR);
                    if (i >= MAX_TOPICS) {
            cerr << "More topics in " << filename << " than defined in MAX_TOPICS";
            getch();
            return (0);
        }
        else
        {
          if (strlen(name)>0)
          {
                delete [] atn[i].name;
                atn[i].name = new char[strlen(name)+1];
                strcpy(atn[i].name, name);
                i++;
          }
                }
    }
    number_names = i; // store number of topics
    source_names.close();
    return 1;
} int topic_map::print_names() {
        int i=0; // name counter
    while(i<number_names) {
        cout << i << "\t"
            << atn[i].name << "\n";
        i++;
        }
    return 1;
```

APPENDIX B
92500.937

Express Mail #EM100740937US

```
)
test_map() {
        char *filename = "../topic/topics.txt";
        class topic_map instance_map;
    instance_map.load_names(filename);
    instance_map.print_names();
    getch();
    return 1;
}

///////////////////////////////////////////////////////////////////////
// PROGRAM_DESCRIPTION
// PROGRAM_GUIDE
///////////////////////////////////////////////////////////////////////

// returns 1 if program occurs now, else 0
int my_time::is_on(struct tm now) { time_t tt_start, tt_now;   // alternative types for calculations
    double diff;

tt_start = mktime(&start);
    tt_now = mktime(&now);

diff = difftime(tt_now, tt_start);

if(diff > 0 && diff < duration*60)
        return (1);   // program is on
    else
        return (0);   // program is off
} int my_time::print() {
        char str1[200];
    strcpy(str1,asctime(&start));
    cout << str1
                << duration << "\n";
    return 1;
}

// program guide loaded at run-time, constantly modified
class program_description {
        public:
        char *network;
        int network_code;
        char *name;
        char *description;
        char *type;
        class my_time program_time;
        int number_topics;
        int topics[MAX_TOPICS_PER_PROGRAM];
        int watched;
        program_description() {watched = 0;}
        int score(class guest_profile&, double&, double&);
};
//int program_description::score(class guest_profile& tg, double& expectation, double& confidence)

// an array of program_descriptions
class program_guide {
        public:
        class program_description apd[MAX_PROGRAMS];
        int number_programs;
        char filename[80];
        int get_time(struct tm *time);
          int load_programs();
        int save_programs();
        int print_programs();
};
```

APPENDIX B
92500.937

Express Mail #EM100740937US

```
int program_guide::get_time(struct tm *time)
{
        // Does not apply between midnight and 3 am
        char desc[80];
    char str[5];
    // generate filename
    #if DEBUG
    cout << "\nChecking current loaded file\n";
    #endif
    strcpy(desc,"../desc/\");
    if (((time->tm_mon)+1)<10)
    {
        strcat(desc,"0");
    }
    strcat(desc,itoa(((time->tm_mon)+1),str,10));
    if (time->tm_mday <10)
    {
        strcat(desc,"0");
    }
    strcat(desc,itoa(time->tm_mday,str,10));
    if (time->tm_hour <7){strcat(desc,"e");}
    else if (time->tm_hour <11){strcat(desc,"m");}
    else if (time->tm_hour <15){strcat(desc,"d");}
    else if (time->tm_hour <19){strcat(desc,"a");}
    else if (time->tm_hour <23){strcat(desc,"p");}
    else {strcat(desc,"n");}
    strcat(desc,"ez.txt");
    //strcat(desc,"pz.txt");

//Determine if current guide is correct
    if (strcmp(filename,desc))
    {
            strcpy(filename,desc);
        load_programs();
        return(0);
    }
    else
    {
        #if DEBUG
        cout << "Using current file\n";
        #endif
        return(0);
    }
} int program_guide::load_programs() { int i = 0,j, topic; // program description counter, topic counter
    char network[MAX_CHAR], name[MAX_CHAR], description[MAX_CHAR], type[MAX_CHAR]; // input buffers if DEBUG
    cout << "Loading " << filename << "\n" ;
    #endif
    ifstream source_program_guide(filename);
        if (!source_program_guide)
        {
          cerr << "The attempt to open " << filename << " failed!\n";
        return (1);
        }
    /* dynamically allocate memory for program features */
    while(!source_program_guide.eof()) { source_program_guide.getline(network, MAX_CHAR);
        delete [] apd[i].network;
        apd[i].network = new char[strlen(network)+1];
        strcpy(apd[i].network,network);
```

APPENDIX B
92500.937

Express Mail #EM100740937US

```
source_program_guide >> apd[i].network_code;

// get rid of the carriage return ...
source_program_guide.getline(name,MAX_CHAR);

delete [] apd[i].name;
    source_program_guide.getline(name, MAX_CHAR);
apd[i].name = new char[strlen(name)+1];
strcpy(apd[i].name,name);

delete [] apd[i].description;
source_program_guide.getline(description, MAX_CHAR);
apd[i].description = new char[strlen(description)+1];
strcpy(apd[i].description,description);

delete [] apd[i].type;
source_program_guide.getline(type, MAX_CHAR);
apd[i].type = new char[strlen(type)+1];
strcpy(apd[i].type,type);

source_program_guide >> apd[i].program_time.start.tm_mon;
source_program_guide >> apd[i].program_time.start.tm_mday;
source_program_guide >> apd[i].program_time.start.tm_hour;
source_program_guide >> apd[i].program_time.start.tm_min;
source_program_guide >> apd[i].program_time.duration;

// !! caution no explicit tm_wday setting
// default time settings
    apd[i].program_time.start.tm_sec = 0;
    apd[i].program_time.start.tm_year = 96;
    apd[i].program_time.start.tm_isdst = 0;
            //reset watched flag
apd[i].watched = 0;

j = 0; // re-initialize topic counter
source_program_guide >> topic;

while (topic>=0)
{
    if (j >= MAX_TOPICS_PER_PROGRAM-1)
    {
        #if DEBUG
        cout << "There are more topics in a program description than MAX_TOPICS_PER_PROGRAM!\n";
        #endif
    }
    else
    {
      apd[i].topics[j] = (topic);
      j++;
    }
    source_program_guide >> topic;

}
apd[i].number_topics = j;

source_program_guide.getline(network, MAX_CHAR);       // ?

i++; // increment program counter
if(i >= MAX_PROGRAMS)
{
  cout << "There are more program descriptions than MAX_PROGRAMS!\n";
  return(0);
        }
}
number_programs = i-1;
source_program_guide.close();
return 1;
} int program_guide::save_programs() {
```

APPENDIX B
92500.937

```
    int i,j;  // program description counter, topic counter if DEBUG
    cout << "Saving " << filename << "\n" ;
    #endif
    ofstream output(filename);
        if (!output)
        {
          cerr << "The attempt to open " << filename << " failed!\n";
        return (-1);
        }
    for (i=0;i<number_programs;i++)
    {
       output << apd[i].network <<endl
              << apd[i].network_code <<endl
              << apd[i].name << endl
              << apd[i].description << endl
              << apd[i].type << endl
                                << apd[i].program_time.start.tm_mon << endl
              << apd[i].program_time.start.tm_mday <<endl
              << apd[i].program_time.start.tm_hour <<endl
              << apd[i].program_time.start.tm_min <<endl
              << apd[i].program_time.duration <<endl;

for(j=0;j<apd[i].number_topics;j++)
       {
          output <<apd[i].topics[j]<<endl;
       }
       output << "-1" << endl;
    }
    output.close();
    return 1;
} int program_guide::print_programs() { int i, j;   // program, topic counters for (i=0;i<number_programs;i++)
    {
               cout << apd[i].network << "\n"
             << apd[i].name << "\n"
             << apd[i].description << "\n"
             << apd[i].type << "\n";
         apd[i].program_time.print();
         cout << "Topics("<<apd[i].number_topics<<"): ";
         for (j=0;j<apd[i].number_topics;j++)
         {
                cout << apd[i].topics[j]<<" ";
         }
         cout << "\n";
         getch();
         }
      return 1;
}

//////////////////////////////////////////////////////////////////////////
// NETWORK_NAME
//       CHANNEL
////////////////////////////////////////////////////////////////////////// class network_name {
         public:
         int show;
```

APPENDIX B
92500.937

```
        char *name;
};
class network_map {
        public:
                // All known networks
                class network_name network[MAX_CHANNELS];
        int number_channels;
                int load_channels(char *filename);
        int print_channels();
        // Networks available by current receiver
                int receiver[MAX_CHANNELS];
        int receiver_channels;
        int load_receiver(char *filename);
};

int network_map::load_receiver(char *filename) { int i; // name counter ifstream source_names(filename);
                if (!source_names)
    {
            cerr << "The attempt to open receiver channels failed!\n";
        return(0);
    }
    /* dynamically allocate memory for program features */
    i=-1;
    while(!source_names.eof())
    {
            source_names >> receiver[++i];
                    if (i >= MAX_CHANNELS)
        {
            cerr << "More channels than defined in MAX_CHANNELS";
            return (0);
        }
    }
    receiver_channels = i; // save number of topics
    source_names.close();
    return 1;
} int network_map::load_channels(char *filename) { int i; // name counter
    char name[MAX_CHAR]; // input buffer ifstream source_names(filename);
            if (!source_names)
    {
            cerr << "The attempt to open network names failed!\n";
        return(0);
    }
    /* dynamically allocate memory for program features */
    i=0;
    while(!source_names.eof())
    {
            source_names.getline(name, MAX_CHAR);
                    if (i >= MAX_CHANNELS)
        {
            cerr << "More channels than defined in MAX_CHANNELS";

return (0);
        }
        else
        {
            if (strlen(name)>0)
            {
                delete [] network[i].name;
```

APPENDIX B
92500.937

```
                network[i].name = new char[strlen(name)+1];
                strcpy(network[i].name, name);
                            i++;
        }           }
    }
    number_channels = i; // save number of networks
    source_names.close();
    return 1;
} int network_map::print_channels() {
        int i=0; // name counter
    while(i<number_channels) {
        cout << i << "\t"
            << network[i].name << "\n";
        i++;
        }
    cout << "Total Channels: " << number_channels <<endl;
    return 1;
}

///////////////////////////////////////////////////////////////////
// DEMOGRAPHICS
///////////////////////////////////////////////////////////////////

// demographics for guest profile
class demographics {
        public:
    char *name;
    char *profession;
    int gender;
    int age;
    int load_demographics(char *filename);
    int save_demographics(char *filename);
    int print_demographics();
};

int demographics::load_demographics(char *filename) { char name_buffer[MAX_CHAR], profession_buffer[MAX_CHAR]; // input buffers if DEBUG
    cout << "Loading " << filename << "\n" ;
    #endif
    ifstream source_demographics(filename);
        if (!source_demographics)
    {
        cerr << "The attempt to open the demographics file failed!\n";
        return(0);
    }
    delete [] name;
        source_demographics.getline(name_buffer, MAX_CHAR);
    name = new char[strlen(name_buffer)+1];
    strcpy(name,name_buffer);

delete [] profession;
    source_demographics.getline(profession_buffer, MAX_CHAR);
    profession = new char[strlen(profession_buffer)+1];
    strcpy(profession,profession_buffer);

source_demographics >> gender;
    source_demographics >> age;

source_demographics.close();
    return 1;
} int demographics::save_demographics(char *filename) {
```

APPENDIX B
92500.937

```
        #if DEBUG
    cout << "Saving" << filename << "\n" ;
        #endif
        ofstream source_demographics(filename);
            if (!source_demographics)
        {
            cerr << "The attempt to open the demographics file failed!\n";
            return(0);
        } source_demographics << name << "\n"
                                << profession << "\n"
                                << gender << "\n"
                                << age << "\n";

source_demographics.close();
    return 1;
} int demographics::print_demographics() {
        cout << name << "\n"
            << profession << "\n"
        << gender << "\n"
        << age << "\n";
    return 1;
} test_demographics () { char *filename = "..\\guest\\jasbad.TXT";
    char *filename2 = "..\\guest\\jasbad.TXT";
        class demographics instance_demographics;
    class demographics instance_demographics2;

instance_demographics.load_demographics(filename);
    instance_demographics.print_demographics();
        instance_demographics.save_demographics(filename2);

instance_demographics2.load_demographics(filename2);
    instance_demographics2.print_demographics();
    getch();
    return 1;
}

////////////////////////////////////////////////////////////////////////
// GUEST PROFILE
//////////////////////////////////////////////////////////////////////// class guest_profile {
        public:
        class topic_guide topicguide;
                class demographics demograph;
                class program_guide history;
        int load_profiles(char *guest);
        int save_profiles(char *guest);
        int print_profiles();
};

// guest serves as filename base
int guest_profile::load_profiles(char *guest) { char name[MAX_CHAR];

strcpy(name,"..\\guest\\");
    strcat(name,guest);
    strcat(name,"t.txt");
    topicguide.load_topics(name);
```

APPENDIX B
92500.937

```
        strcpy(name,"..\\guest\\");
        strcat(name,guest);
        strcat(name,"d.txt");
            demograph.load_demographics(name);

strcpy(name,"..\\guest\\");
        strcat(name,guest);
        strcat(name,"h.txt");
        strcpy(history.filename,name);
            history.load_programs();
        return 1;
    }
    // guest serves as filename base
    int guest_profile::save_profiles(char *guest)
    {
            char name[MAX_CHAR];

strcpy(name,"..\\guest\\");
        strcat(name,guest);
        strcat(name,"t.txt");
        topicguide.save_topics(name);

strcpy(name,"..\\guest\\");
        strcat(name,guest);
        strcat(name,"d.txt");
            demograph.save_demographics(name);

strcpy(name,"..\\guest\\");
        strcat(name,guest);
        strcat(name,"h.txt");
        strcpy(history.filename,name);
            history.save_programs();
        return 1;
    } int guest_profile::print_profiles() {
            topicguide.print_topics();
        demograph.print_demographics();
        return 1;
    } int test_guest_profile() {
            char *guest = "jasba";
        class guest_profile instance_guest;
        instance_guest.load_profiles(guest);
        instance_guest.print_profiles();
        getch();
        return 1;
    }

// SCORING FUNCTION int program_description::score(class guest_profile& guest, double& expectation, double& confidence)
    { int i; // topic index
        class topic_preference tp,pp; // a topic representing sum of yes, no for all topics of program
    description tp.yes=0; tp.no =0;
        for (i=0; i<number_topics; i++) {
            tp.yes = tp.yes + guest.topicguide.atp[topics[i]].yes;
            tp.no = tp.no + guest.topicguide.atp[topics[i]].no;
        } expectation = tp.expectation();
        confidence = tp.confidence();

pp.yes=0;pp.no=0;
        // Match Shows
```

APPENDIX B
92500.937

```
        for (i=0;i<guest.history.number_programs;i++)
        {
            if (!strcmp(guest.history.apd[i].name,name))
            { if (guest.history.apd[i].network_code == 1)
                {
                        pp.yes++;
                }
                else
                if (guest.history.apd[i].network_code==0)
                {
                        pp.no++;
                }
            }
        }
        if (pp.expectation()>0.5)
        {
                expectation=1+pp.expectation();
        }
        else
        if (pp.expectation()<0.5)
        {
                expectation=-pp.expectation();
        } return 1;
}
/*
int test_score() {
            class program_description pd;
            class topic_guide tg;
        //tg = new topic_guide;
        double expectation, confidence;

pd.topics[0] = 0; pd.topics[1] = 1; pd.topics[2] = 2; pd.number_topics = 3;
        tg.atp[0].yes = 1; tg.atp[1].yes = 2; tg.atp[2].yes = 3;
        tg.atp[0].no = 0; tg.atp[1].no = 0; tg.atp[2].no = 200;

pd.score(tg, expectation, confidence);
            cout << expectation << "\n" << confidence << "\n";
        getch();
        return 1;
}
*/
/* TESTS
// tests loading and printing of program guide
int test_program_guide() {
            char *filename = "../desc/l0818pez.txt";
            class program_guide instance_program_guide;
            instance_program_guide.load_programs(filename);
            instance_program_guide.print_programs();
        getch();
        return 1;
} int test_my_time() { class my_time instance_my_time;
        struct tm now;

instance_my_time.start.tm_sec = 0;
        instance_my_time.start.tm_min = 0;
        instance_my_time.start.tm_hour = 9;
        instance_my_time.start.tm_mday = 1;
        instance_my_time.start.tm_mon = 1;
        instance_my_time.start.tm_year = 96;
        instance_my_time.start.tm_isdst = 0;
        instance_my_time.duration = 30;
        instance_my_time.start.tm_wday = 1;    // hardwired
```

APPENDIX B
92500.937

```cpp
    now.tm_sec = 0;
    now.tm_min = 10;
    now.tm_hour = 9;
    now.tm_mday = 1;
    now.tm_mon = 1;
    now.tm_year = 96;
    now.tm_isdst = 0;

instance_my_time.print();
    cout << instance_my_time.is_on(now);
    getch();
        return 1;
}
*/

//////////////////////////////////////////////////////////////////////
// learntv.cpp
//
// Learntv Logic Control Module
// v. 2.0
// Jasba Simpson
// Last Modified 9/15/96
//
// LEARNTV Demo V5.0
#include "header.h"

//
// Caution: Update_channel() must be issued regularly
// bug: if nothing is playing on right now, it crashes.
// bug:load topic for profile should go to end of file, not supplied #
//#define LIVE_TV 0  // No Live TV Feed
#define LEARNTV 1  // On LearnTV Box
#define GRAPHICS 1 // Turn Graphics on
define DEBUG 0 // Debug define NUM_PROTO_TOPICS 16
define NUM_PROGRA_TOPICS 1 include "classes.cpp"
include "clrgrph.cpp"
#include "ir.cpp"

// If on LEARNTV box set to 1, otherwise 0

//Demo parameters define RECOMMEND 5 // # of recommended shows per time slot
// Global TV Declarations
class program_guide program;
class topic_map topic;
class network_map provider;
class guest_profile guest;
class guest_profile proto;
class topic_preference guess;
int order[MAX_CHANNELS]; // interest sorted pointer to shows.
int order_pointer=0;
int current_channel=1;
int current_channel_interest = 0;
char guest_name[MAX_CHAR];
int delay_time =1000;
// END Global TV Declarations

// PROGRAM CODE void pause() // Pause for CastMember to press SPACE BAR
{
    char input;
    cout << "Pausing ... press Space Bar";
    while (input !=' ')
```

APPENDIX B
92500.937

```
    {
        input = getch();
    }
    cout << "  ok!" <<endl;
} int display_show(int index,int live)
{
    // Display show INDEX //
    if ((index <0)||(index>program.number_programs))
    {
        show_title("NO LISTING");
    }
    else
    {
        show_program_description(program.apd[index],live);
    }
    return(1);
} void view_guest_history(class guest_profile& gt)
{
        int i,pointer,x;
    char  *r[20][2];
    int c[20];
    int max_lines=6;
    char input;

show_title("GUEST PROGRAM PROFILE");
    pause();
    #if 0
    for (i=0;i<gt.history.number_programs;i++)
    {
     if (gt.history.apd[i].network_code)
     {
      cout          << "\t" << gt.history.apd[i].name<<endl;
     }
        }
    #endif;
    i=0;
    pointer = 0;
    input='d';
    while (input != 'q')
    {
        switch (input)
        {
          case '?':
          {
          cout << "\nHelp Menu:"
               << "\n\tu,d page up/down profile"
               << "\n\tq quit"
               <<endl;
          break;
          }
          case 'u': case 'U': case 'd': case 'D':
          { if ((input=='u')||(input =='U'))
            {
                pointer -= 2*max_lines;
              if (pointer<0) pointer=0;
              i= pointer;
                }
          x = 0;

while ((x<max_lines)&&(i<gt.history.number_programs))
            {
                r[x][0]=gt.history.apd[i].name;
```

APPENDIX B
92500.937

```
            r[x][1]=gt.history.apd[i].type;
            c[x]=gt.history.apd[i].network_code;
            i++;
            x++;
          }
          if (pointer <max_lines+gt.history.number_programs) pointer += max_lines;

if (x == 0)
          {
                show_title("END");
          }
          else
          {
            show_choices(&r, c, 2, x);
            show_name(gt.demograph.name);
          //show_choices(&r, 2, x);
                          }
            break;
                  }
          default:
          {
            cout << "Unknown Key" <<endl;
          }
        }
        show_command("UP/DOWN");
        input = getch();
      }
    clear_output();
    // graphic mode RANK the shows.
} void view_guest_profile(int mode)
{
    int list[MAX_TOPICS];
    double expect,expect2;
    int  i,j,x;
    int swap,pointer,pointer2;
    char input=' ';
    int max_lines;
    float p[10],p2[10];
          char *text[10];
    char out[80];

if (mode==1)
    {
        max_lines = 7;
    }
    else if (mode ==2)
    {
        max_lines=6;
    } show_title("GUEST TOPIC PROFILE");
    pause();
    for (i=0;i<topic.number_names;i++)
    {
        list[i]=i;
    }
    // Bubble Sort Topics
    for (j=0;j<topic.number_names-1;j++)
            {
        for (i=j+1;i<topic.number_names;i++)
            {
            expect= guest.topicguide.atp[list[j]].expectation();
            expect2= guest.topicguide.atp[list[i]].expectation();
            //if (guest.topicguide.atp[list[j]].unrated())(expect = 0;)
```

APPENDIX B
92500.937

```
//if (guest.topicguide.atp[list[i]].unrated())(expect2 = 0;)
            if (guest.topicguide.atp[list[j]].yes==guest.topicguide.atp[list[j]].no)
    {
         expect=0;
    }
    if (guest.topicguide.atp[list[i]].yes==guest.topicguide.atp[list[i]].no)
    {
         expect2=0;
    } if ( expect<expect2 )
    {
         swap=list[j];
         list[j]=list[i];
         list[i]=swap;
    }
  }
} // End Bubble Sort //list keywords, probabilities, confidence//
pointer=0;
pointer2=0;
i=0;
input = '0';
while (input != 'q')
{
    switch (input)
    {
    case '?':
    {
    cout << "\nHelp Menu:"
         << "\n\tu,d page up/down profile"
         << "\n\tq quit"
         <<endl;
     break;
    }
    case 'u': case 'U': case 'd': case 'D':
    {
     if ((input=='u')||(input =='U'))
     {
         pointer -= 2*max_lines;
      if (pointer<0) pointer=0;
      i= pointer;
      pointer2=pointer;
         }
     x=0;

while ((x<max_lines)&&(i<topic.number_names)&&(i>=0))
    {
             j=list[i++];
     if
((!guest.topicguide.atp[j].unrated())||((mode==2)&&(!proto.topicguide.atp[j].unrated()))))
    {
                    p[x] = guest.topicguide.atp[j].expectation();
                       p2[x]= proto.topicguide.atp[j].expectation();
         text[x] = topic.atn[j].name;
         x++;
     }
    }
    pointer2=pointer2+x;
    if (pointer <max_lines+pointer2) pointer += max_lines;

if (x == 0)
    {
         show_title("END");
    }
    else
    {
         strcpy(out,guest.demograph.name);
```

APPENDIX B
92500.937

```
                    if (mode ==1)
                    {
                            make_graph(p, text, x, 10);
                    }
                    else if (mode ==2)
                    { strcat(out," ");
                    strcat(out,proto.demograph.name);

make_graph(p,p2,text,x,10);
                    }
                show_name(out);
            }
            break;
        default:
        {
            cout << "Unknown Key" <<endl;
        }
        }
        show_command("Up/Down");
        input = getch();
    }
    clear_output();
} void prepare_channels(struct tm *now,int live)
{
    int i,index;

// what is on right now?
    for (i=0;i<provider.number_channels;i++)
    {
            provider.network[i].show = -1;
    }
    // could add check for two shows same channel...
        for (index=0;index<program.number_programs;index++)
    {
            if ((program.apd[index].program_time.is_on(*now))&&
            ((!live)||(provider.receiver[program.apd[index].network_code]>=0)))
        {
                        if (provider.network[program.apd[index].network_code].show>=0)
            {
                #if DEBUG
                cout << "\nError - trying to assign two shows to "
                        << provider.network[program.apd[index].network_code].name <<endl;
                #endif
            }
            provider.network[program.apd[index].network_code].show=index;
            }
    }
    for (i=0;i<provider.receiver_channels;i++)
    {
        order[i]=i;
    }
} void rank_channels()
{
        int i,j,index,x;
    int network;
    double conf,conf2,expect,expect2;

// bubble sort the programs
        for (j=0;j<provider.receiver_channels-1;j++)
    {
                for (i=j+1;i<provider.receiver_channels;i++)
```

APPENDIX B
92500.937

```
            {
                  expect =0;
                  expect2 =0;
                  //network = provider.receiver[order[i]];
               network = order[i];
                    if (network >=0){index = provider.network[network].show;}
                    else                              {index = -1;}
                    if (index>=0)
                    {
                            program.apd[index].score(guest,expect,conf);
                    }
                    //network = provider.receiver[order[j]];
               network = order[j];
                    if (network >=0){index = provider.network[network].show;}
                    else                              {index = -1;}
                    if (index>=0)
                    {
                            program.apd[index].score(guest,expect2,conf2);
                    }
                    if (expect2>expect)
                    {
                    x=order[j];
                    order[j]=order[i];
                    order[i]=x;
                    }
            }
      }
      #if 0
      expect=0;
      for (i=0;i<provider.receiver_channels;i++)
      {
          cout <<"#"<<i<<" " << order[i];
        network = order[i];
                    if (network >=0){index = provider.network[network].show;}
                    else                              {index = -1;}
                    if (index>=0)
                    {
                            program.apd[index].score(guest,expect,conf);

}
         cout <<program.apd[index].name <<" " <<expect<<"--";
      }
      #endif }
void view_guest_future(int family)
{
     char str[RECOMMEND][5];
     char *r[10][4];
     double expect, conf;
        struct tm *now;          // Time Structures
          time_t t;
     char date[40];
     int i,x,index;   // Indexes for search
     char input;
     int live = 0;

// Obtain current Time
     t = time(NULL);
     now = localtime(&t);

// Set time
     //now->tm_mday++;  // Tomorrow
     now->tm_hour = 7;   // 7 in the morning
     now->tm_min = 0;    // 1 minute after the hour
     input =' ';
     while ((input !='q'))
     {
      switch (input)
      {
```

APPENDIX B
92500.937

```
case '?': //help
{
   cout << "\nHelp Menu:"
        << "\n\tu,d page up/down (by hour)"
        << "\n\t+,- add/minus one day"
                                << "\n\tq   quit"
        <<endl;

break;

}
case 'u': case 'U':
{
                    if (now->tm_hour>7)
    {
            now->tm_hour--;
    }
    break;
}
case 'd': case 'D':
{
            if (now->tm_hour < 23)
            {
                    now->tm_hour++;
            }
    break;
}
case '+':
{
   if (now->tm_mday<30)
    {
        now->tm_mday++;
        if (now->tm_wday<6)
        {
          now->tm_wday++;
        }
        else
        {
          now->tm_wday=0;
        }
    }
    break;
}
case '-':
{
    if (now->tm_mday>1)
    {
        now->tm_mday--;
        if (now->tm_wday>0)
        {
          now->tm_wday--;
        }
        else
        {
          now->tm_wday=6;
        }
    }
    break;
}
} // End switch if (family) //obtain right profile
{
   if (now->tm_hour <8) { guest.load_profiles("bart");}
   else if (now->tm_hour <15) { guest.load_profiles("mom");}
   else if (now->tm_hour <17) { guest.load_profiles("bart");}
   else if (now->tm_hour <18) { guest.load_profiles("dad");}
   else if (now->tm_hour <23) { guest.load_profiles("elise");}
}
// get the right description file
```

APPENDIX B

```
    program.get_time(now);

prepare_channels(now, live);

rank_channels();
    // Create Date strcpy(date,asctime(now));

// Search through Channels
    i=provider.receiver_channels-1;
    while ((provider.receiver[order[i]]<0)&&
                (i>=0))
    {
        i--;
    }
    index=0;
    x=0;
    while ((i>=0)&&(index>=0)&&(x<RECOMMEND))
    {
        index = provider.network[order[i]].show;

if (index >=0)
        {
         program.apd[index].score(guest,expect,conf);
                if (expect >0.5)
          {
             itoa((1+x),str[x],10);
             r[x][0]=str[x];
             r[x][1]=program.apd[index].network;
             r[x][2]=program.apd[index].name;
             r[x][3]=program.apd[index].type;
             x++;
                }
        }
        i--;
            }
    if (x>0)
    {
                show_recommendations(&r, 4, x, date);
            show_command("Up/Down");

}
    else
    {
        show_title("NOTHING TO RECOMMEND");
        show_command(date);
    }
    show_name(guest.demograph.name);
    input=getch();
    }
    clear_output();

} int update_channels(struct tm *now,int live)
// Create a list of shows that are currently on at now
{
        // Not able to parse midnight to 3 am // Obtain files for time
    program.get_time(now);
    // Map to channels
    prepare_channels(now,live);

#if DEBUG
    cout << "Done updating Channels\n";
    #endif
    return (1);
```

APPENDIX B
92500.937

```cpp
}
void load_classes()
{
    // Initial load of topic names, descriptions...
    char *topic_file= "../desc/topics.txt";
    char *network_file="../desc/network.txt";
    char *receiver_file="../desc/allchan.txt";
    // Time Structures
    struct tm *now;
        time_t t;

// Obtain current Time
    t = time(NULL);
    now = localtime(&t);

topic.load_names(topic_file);
    guest.topicguide.number_topics=topic.number_names;
    proto.topicguide.number_topics=topic.number_names;

delete [] guest.demograph.name;
    guest.demograph.name= new char[strlen(" ")+1];
    strcpy(guest.demograph.name," ");
    delete [] proto.demograph.name;
    proto.demograph.name= new char[strlen(" ")+1];
    strcpy(proto.demograph.name," ");

provider.load_channels(network_file);
    provider.load_receiver(receiver_file);
    update_channels(now, 1);
}

//Update Guest Profile 1 is yes, 0 is no
void update_guest_profile(int index,int value)
{
        int i,t,p;

if ((index >=0)&&(index<program.number_programs))
    {

// Update the History
        p=guest.history.number_programs;
        if (p<MAX_PROGRAMS)
        {
        //guest.history.apd[p] = program.apd[index];
         delete [] guest.history.apd[p].name;
         guest.history.apd[p].name= new char[strlen(program.apd[index].name)+1];
         strcpy(guest.history.apd[p].name,program.apd[index].name);
         delete [] guest.history.apd[p].type;
         guest.history.apd[p].type= new char[strlen(program.apd[index].type)+1];
         strcpy(guest.history.apd[p].type,program.apd[index].type);
         guest.history.apd[p].network_code=value;
         guest.history.number_programs++;
        }
        else
        {
        cout << "Out of Memory for Guest History" <<endl;
        } for (i=0;i<program.apd[index].number_topics;i++)
        {
        t =program.apd[index].topics[i];
         if ((t>=0)&&(t<topic.number_names))
         {
                    if (value ==1)
                {
                #if DEBUG
                            cout << "Increasing :"<< topic.atn[t].name <<endl;
                #endif
```

APPENDIX B
92500.937

```
                        guest.topicguide.atp[t].yes++ ;
                }
                else
                if (value==0)
                {
                #if DEBUG
                        cout << "Decreasing :"<< topic.atn[t].name <<endl;
                #endif
                        guest.topicguide.atp[t].no++ ;
                }
        }
        else
        {
                cout << "index=" <<index << "Topic==" <<t;
        }
    }

// Finished Updating History

}
} int compare_program_profiles(class guest_profile& gt, class guest_profile& proto)
{ int i, j;
    int num_match = 0;

// Program Matches
    for (i = 0; i < gt.history.number_programs; i++)
    {
        for (j = 0; j < proto.history.number_programs; j++)
        {
        // if matching preference
        if ((!strcmp(gt.history.apd[i].name,proto.history.apd[j].name))&&
            (gt.history.apd[i].network_code==proto.history.apd[j].network_code))
            {
                num_match++;
            }
            else
            {
            }
        }
    }
    return (num_match);
}
int compare_topic_profiles(class guest_profile& gt, class guest_profile& proto)
{ int i;
    int num_match = 0;

// Program Matches
    for (i = 0; i < gt.topicguide.number_topics; i++)
    { if (((gt.topicguide.atp[i].expectation()>0.5)&&
            (proto.topicguide.atp[i].expectation()>0.5)))

//||((gt.topicguide.atp[i].expectation()<0.5)&&
            //(proto.topicguide.atp[i].expectation()<0.5)))

{
                num_match++;
            }
            else
            {
            }
    }
```

APPENDIX B
92500.937

Express Mail #EM100740937US

```
	return (num_match);
} void merge_profiles(class guest_profile& gt,class guest_profile& proto)
{
	char text[80];
	int p_result,t_result;
int p_threshold = 1;
int t_threshold = 1;
	int i,j,matched,p;

p_result = compare_program_profiles(gt,proto);
       t_result = compare_topic_profiles(gt,proto);

if (p_result>=p_threshold)
   {
       strcpy(text, "Matched with ");
     strcat(text, proto.demograph.name );
     show_title(text);
     pause();
     // Program Matches
  for (i = 0; i < proto.history.number_programs; i++)
  {
     matched =0;
       for (j = 0; j < gt.history.number_programs; j++)
     {
       // if matching preference
       if (!strcmp(proto.history.apd[i].name,gt.history.apd[j].name))
       {
            matched =1;
       }
     }
   //cout << "i" << i << "matched" <<matched <<endl;
   if (!matched)
   {
     strcpy(text,"Adding ");
      strcat(text,proto.history.apd[i].name);
      show_title(text);
      pause();

p=gt.history.number_programs;
       if (p<MAX_PROGRAMS)
       {
       //guest.history.apd[p] = program.apd[index];
       delete [] gt.history.apd[p].name;
       gt.history.apd[p].name= new char[strlen(proto.history.apd[i].name)+1];
       strcpy(gt.history.apd[p].name,proto.history.apd[i].name);
       delete [] gt.history.apd[p].type;
       gt.history.apd[p].type= new char[strlen(proto.history.apd[i].type)+1];
       strcpy(gt.history.apd[p].type,proto.history.apd[i].type);
       gt.history.apd[p].network_code=proto.history.apd[i].network_code;
       gt.history.number_programs++;
       }
       else
       {
       cout << "Out of Memory for Guest History" <<endl;
       }

}

}

} if (t_result>=t_threshold)
```

APPENDIX B
92500.937

```
{
    strcpy(text, "Matched with ");
    strcat(text, proto.demograph.name );
    show_title(text);
    pause();
    // Program Matches
    for (i = 0; i < gt.topicguide.number_topics; i++)
        { if (gt.topicguide.atp[i].unrated()&&!proto.topicguide.atp[i].unrated())
        {
                strcpy(text,"Adjusting ");
            strcat(text, topic.atn[i].name);
            show_title(text);
            pause();

gt.topicguide.atp[i].yes = proto.topicguide.atp[i].yes;
            gt.topicguide.atp[i].no = proto.topicguide.atp[i].no;
        }

}
    } clear_output();
}

// Going live ... on TV
double live_tv(int learning,struct tm *now, int live)
{ class topic_preference result;
        char input=NULL;
    int i,index,best_channel,network;
    double expect,conf,best;
    char store[3],str[10],text[80];
    int channel_request=0;
    int error;
    int dss =1;
    int previous_channel=-1;
    int previous_channel_interest=-1;
    int prev_store = -1;

// Update Channel List
    update_channels(now,live);

// Reset all channels to NOT WATCHED
    for (i=0;i<provider.number_channels;i++)
    {
        program.apd[provider.network[i].show].watched=0;
    }
    // initialize hit ratio counter
    result.yes =0;
    result.no = 0;
    index = -1;
        current_channel_interest = 2;

// Re-order channels by interest
    if (learning)
    {
            rank_channels();
    }

//Select Channel
    order_pointer=provider.receiver_channels-1;
    while (((provider.receiver[order[order_pointer]]<0)||
        (provider.network[order[order_pointer]].show<0)) &&
                (order_pointer>=0))
```

APPENDIX B
92500.937

```
{
    order_pointer--;
}
if (order_pointer<0)
{
    #if DEBUG
        cout <<"Error assigning shows to channels\n";
    #endif
    return(1);
} current_channel = provider.receiver[order[order_pointer]];

if DEBUG
    cout << "Chan: " << current_channel <<endl;
#endif

// loop around live TV until quit
while (input !='q')
{
#if DEBUG
cout << order_pointer << "\t" << current_channel << "\t" << order[order_pointer] <<endl;
#endif
                        if (current_channel!=previous_channel)
        {
            if (current_channel_interest==1)
            {
                        update_guest_profile(index,1);
                result.yes++;
            }
            else if (current_channel_interest==0)
            {
                    update_guest_profile(index,0);
                    result.no++;
            }
            index = provider.network[order[order_pointer]].show;

//if (index>=0)program.apd[index].score(guest,expect,conf);
            //cout << index <<"\tExpectation: " <<expect<<endl;
            //cout << "Channel request:"<<current_channel <<endl;

display_show(index,live);

if (!learning)
            {
             itoa((result.yes+result.no),str,10);
             strcpy(text,"Pick #");
             strcat(text,str);
             strcat(text,"     Yes/No   Up/Down");
            }
            else
            {
            expect =0;
            if (index >=0){
              program.apd[index].score(guest,expect,conf);}
              if (expect>0.5)
              {
                        strcpy(text,"Recommended!");
              }
              else
              {
                        strcpy(text,"Unrated ");
              } strcat(text,"  Pick #");
             itoa((result.yes+result.no),str,10);
             strcat(text,str);
             strcat(text,"  Yes/No   Up/Down");
```

```
        }
        show_command(text);
        //show_channel(previous_channel,0);
        //show_channel(current_channel,1);
       previous_channel=current_channel;
        previous_channel_interest=-1;
        current_channel_interest=2;
        if (live)
        {
              error = change_channel(dss,current_channel);
        }
    }
    if (previous_channel_interest!=current_channel_interest)
    {
        show_response(previous_channel_interest,0,live);
        show_response(current_channel_interest,1,live);
        previous_channel_interest=current_channel_interest;
    } input = getch();

switch (input)
    {
      case '1':
      case '2':
      case '3':
      case '4':
      case '5':
      case '6':
      case '7':
      case '8':
      case '9':
      case '0':
        {
              store[channel_request++]=input;
          store[channel_request]='\0';
          i=atoi(store);
          if (channel_request==1)
          {
              prev_store = i;
              //show_channel(current_channel,0);
            //show_channel(i,1);
          }
          else
          {
              //show_channel(prev_store,0);
            //show_channel(i,1);
            prev_store = i;
          }
          // or 3 in DSS
          if (channel_request<3) { break; }
        }
      case '\r':
        {
                 i=atoi(store);
          //show_channel(i,0);
          if ((i<provider.receiver_channels)&&
              (provider.receiver[i]>=0))
          {
              current_channel = i;
          }
          if (!learning) (order_pointer=i;)
          //show_channel(current_channel,1);
                channel_request=0;
                break;
        }
      case 'y': case 'Y':
        {
                  channel_request=0;
              current_channel_interest=1;
           break;
```

APPENDIX B
92500.937

```
                    }
            case 'n': case 'N':
            {
                            channel_request=0;
                            current_channel_interest=0;

break;
            }
            case '?' : //Help
            {
                    cout << "\nHelp Menu:"
                                        << "\n\tu,d up/down channels"
                             << "\n\ty,n vote Yes or No";
                    if (!live)
                    {
                     cout  << "\n\th,H add/minus one hour"
                             << "\n\tt+,- add/minus one day";
                    }
                    cout << "\n\tq   quit"
                             <<endl;

break;
            }
            case 'r': case 'R':
            {
                            channel_request=0;
                            if (learning)
                    {
                            //recommend show!
                    best_channel=current_channel;
                    best=0;
                    index=0;
                    int looping=0;
                    while (looping++ <2)
                            {   // Find the BEST show playing right now.
                                    for (i=0;i<provider.number_channels;i++)
                                    {
                                    network = provider.receiver[i];
                                     if (network >=0)
                                        {
                                                        index = provider.network[network].show;
                                                                                                        }
                                            else
                                            {
                                                    index = -1;
                                            }
                                            if (index>=0)
                                            {
                                                    program.apd[index].score(guest,expect,conf);
                                                                                                                    if
((expect>best)&&
                                                    (program.apd[index].watched!=1)&&
                                                    (provider.receiver[i]>=0))
                                                                {
                                                                                    best = expect;
                                                                                    best_channel = i;
                                                                }
                                    }
                            }
                            // Check that recommended show is still p>0.5
                            if (best <= 0.5)
                            {
                              // reset all shows to not watched
                              for (i=0;i<provider.number_channels;i++)
                                {
                                        program.apd[provider.network[i].show].watched=0;
                                }
                            }
                            else
                            {
```

```
            looping=2; // found a good show! exit while loop
        }
    }
    program.apd[provider.network
                    [provider.receiver[best_channel]].show].watched=1;
                                if (current_channel != best_channel)
    {
        current_channel = best_channel;
    }
    else
    {
        cout << "Nothing better to recommend." << endl;
    }
}
else
{
    cout << "Not in Learning Mode!" <<endl;
}
break;
}
case 'u': case 'U':
{ //if nothing to find then loops to INFINITY! fix it
    order_pointer++;
    if (order_pointer>=provider.receiver_channels){order_pointer=0;}
    while ((((provider.receiver[order[order_pointer]]<0)&&(live))||
            (provider.network[order[order_pointer]].show<0)||
                (order_pointer>=provider.receiver_channels))
    {
            order_pointer++;
                    if (order_pointer>=provider.receiver_channels)
            {
            order_pointer=0;
            }
    }
    previous_channel = -2;
    current_channel = provider.receiver[order[order_pointer]];
    break;
}
case 'd': case 'D':
{
    order_pointer--;
    if (order_pointer<0) {order_pointer=provider.receiver_channels-1;}
    while ((((provider.receiver[order[order_pointer]]<0)&&(live))||
            (provider.network[order[order_pointer]].show<0))   ||
            (order_pointer<0))
    {
        order_pointer--;
        if (order_pointer<0)
        {
        order_pointer=provider.receiver_channels-1;
        }
    }
    previous_channel = -2;
    current_channel = provider.receiver[order[order_pointer]];
    break;
}
case 'h':
{
    if ((!learning)&&(!live))
    {
        if (now->tm_hour<23)
        {
        now->tm_hour++;
        }
    // Update Channel List
    previous_channel = -2;
    update_channels(now,live);
    }
    break;
}
```

APPENDIX B
92500.937

```
case 'H':
{
  if ((!learning)&&(!live))
  {
      if (now->tm_hour>3)
      {
        now->tm_hour--;
      }
   // Update Channel List
        previous_channel = -2;
   update_channels(now,live);
  }
   break;
}
case '+':
{  if ((!learning)&&(!live))
   {
      if (now->tm_mday<30)
      {
        now->tm_mday++;
        if (now->tm_wday<6)
        {
          now->tm_wday++;
        }
        else
        {
          now->tm_wday=0;
        }
      }
    // Update Channel List
        previous_channel = -2;
    update_channels(now,live);
   }
    break;
}
case '-':
{
   if ((!learning)&&(!live))
   {
      if (now->tm_mday>1)
      {
        now->tm_mday--;
        if (now->tm_wday>0)
        {
          now->tm_wday--;
        }
        else
        {
          now->tm_wday=6;
        }
      }
    // Update Channel List
        previous_channel = -2;
    update_channels(now,live);
   }
    break;
}
#if 0
case 't':
{
      if (!learning)
      t = time(NULL);
            now = localtime(&t);
   // Update Channel List
   update_channels(now);
   }
    break;
}
#endif
case 'q': case 'Q':
{
```

APPENDIX B
92500.937

```
                    channel_request=0;
                        if (current_channel_interest==1)
                    {   result.yes++;   }
                    else if (current_channel_interest==0)
                    {   result.no++;   }
                    current_channel_interest = 0;
                                                            return(0);
            }
            default:
            { cout << "Unknown Key.."<<endl;}
        }
    }
            return(0);
} //.END Live TV void time_warp()
{
    struct tm *now;
    time_t t;
    char input=' ';
    //int hour,min;
    t = time(NULL);
    now = localtime(&t);

live_tv(0,now,0);
} // END Time Warp void user_selection(void)
{
        int i;
    struct tm *now;
    time_t t;

char input=' ';

while (input != 'q')
        {
        show_title("LEARNING TV");
        cout << "enter ? for help"<<endl;

#if DEBUG
        printf("Virtualfree: %lu\n",gxVirtualFree(gxCMM));
        printf("Virtualfree: %lu\n",gxVirtualFree(gxEMM));
        #endif
        input = getch();
        //int hour,min;
        t = time(NULL);
                now = localtime(&t);
        switch (input)
        {
            case '?':  //help//
            {
                    // clear_output();
                // clrscr();
                // cleardevice();
                    cout  << "\nHelp Menu:"
                            // << "\n\t ~ THE SHOW"
                            << "\n\t a Normal TV"
                            <<       "\n\t b Accelerated Learning"
                        << "\n\t c Learn TV"
                        << "\n\t d,F Day/Family Recommendations"
                        << "\n\t h,H view 1,2 Program profile(s)"
                        << "\n\t v,V view 1,2 Topic profile(s)"
                        << "\n\t n,l,s new,load,save guest"
                    // << "\n\t L,P,T,M load,compare Program/Topic,merge prototype"
                        << "\n\t C Collaborative Learning"
                        << "\n\t q quit"
                    //  << "\n\n\t Misc. Functions\n"
                    //  << "\n\t t show title"
```

APPENDIX B
92500.937

```
//    << "\n\t p,r pick,recommend show"
//     << "\n\t f fetch description file"
//    << "\n\t k key color"
//    << "\n\t i irr menu\n"
    <<endl<<endl;

break;
}
case 'i':
{
    main_ir();
    break;
}
case '~':  // THE SHOW!
{
                            // Clear TV
    clear_output();
    break;
}
case 'k':
{
    select_display(SECONDARY_OUTPUT);
    gxClearDisplay(BCOLOR,0);
    select_display(PRIMARY_OUTPUT);
    getch();
    break;
}
case 'd':
{
    show_title("GUEST RECOMMENDATIONS");
    pause();
    view_guest_future(0);
    break;
}
case 'F':
{
    show_title("FAMILY RECOMMENDATIONS");
    pause();
    view_guest_future(1);
    break;
}
case 'a': // Dumb TV //
{
    show_title("NORMAL TV");
    pause();
    live_tv(0,now,1); // CALL Live TV in dumb mode,roam
    show_title("EXITING NORMAL TV");
    pause();
    clear_output();
    break;
}
case 'b': // Accel Learning //
{
    show_title("COMPRESSED TIME");
    pause();
    time_warp(); // CALL Live TV in dumb mode,roam show_title("EXITING COMPRESSED TIME");
    for (i=0;i<guest.topicguide.number_topics;i++)
    {
        proto.topicguide.atp[i].yes=guest.topicguide.atp[i].yes;
        proto.topicguide.atp[i].no =guest.topicguide.atp[i].no;
    }
    delete [] proto.demograph.name;
    proto.demograph.name= new char[strlen("Compressed")+1];
    strcpy(proto.demograph.name,"Compressed");
    pause();
    clear_output();
    break;
}
```

APPENDIX B
92500.937

```
case 'c': // Learn TV //
{
    show_title("LEARNTV");
    pause();
    live_tv(1,now,1); // CALL live_tv with Learning on
    show_title("EXITING LEARNTV");
    pause();
    clear_output();
    break;
}
case 'n': // New Guest Profile
{
                    cout << "\n\nEnter New Guest Name: ";
    cin >> guest_name;
        // Reset all
    for (i=0;i<topic.number_names;i++)
    {
                guest.topicguide.atp[i].yes = 0;
        guest.topicguide.atp[i].no  = 0;
    }
        for (i=0;i<program.number_programs;i++)
    {
        program.apd[i].watched=0;
    }
    guest.history.number_programs = 0;
    for (i=0;i<topic.number_names;i++)
    {
                proto.topicguide.atp[i].yes = 0;
        proto.topicguide.atp[i].no  = 0;
    }
    proto.history.number_programs = 0;
        break;
                }
case 'l': // Load Guest Profile
{
                    cout << "Enter Guest Name: ";
    cin >> guest_name;
                guest.load_profiles(guest_name);
    cout << "Name: " << guest.demograph.name<<endl;
                //guest.print_profiles();
                        break;
                }
case 'L': // Load prototypical Profile
{
                    cout << "Enter Prototype Name: ";
    cin >> guest_name;
                proto.load_profiles(guest_name);
                //proto.print_profiles();
                        break;
                }
case 'P':
{
    int result;
    result = compare_program_profiles(guest,proto);
    cout << "Program Compare Result : " << result <<endl;
    break;
}
case 'T':
{
    int result;
    result = compare_topic_profiles(guest,proto);
    cout << "Topic Compare Result : " << result <<endl;
    break;
}
case 'M':
{
    merge_profiles(guest,proto);
    #if DEBUG
        cout << "Enhanced!" <<endl;
    #endif
    break;
```

APPENDIX B
92500.937

```
}
case 'C':
{
  int i;
  char temp[40],str[10];
  show_title("COLLABORATIVE LEARNING");
  pause();
  guest.save_profiles("TEMP");

for (i=1;i<=NUM_PROTO_TOPICS;i++)
  {
    strcpy(temp,"t");
    strcat(temp,itoa(i,str,10));
    proto.load_profiles(temp);
    merge_profiles(guest,proto);
  }
  for (i=1;i<=NUM_PROGRA_TOPICS;i++)
  {
    strcpy(temp,"p");
    strcat(temp,itoa(i,str,10));
    proto.load_profiles(temp);
    merge_profiles(guest,proto);
  } proto.load_profiles("TEMP");
  delete [] proto.demograph.name;
  proto.demograph.name= new char[strlen("vs Previous")+1];
  strcpy(proto.demograph.name,"vs Previous");
  show_title("Done");
  pause();
  clear_output();
  break;
}
case 's': // Save Guest Profile
{
      cout << "Enter Guest Name:";
      cin >> guest_name;
   delete [] guest.demograph.name;
   guest.demograph.name= new char[strlen(guest_name)+1];
   strcpy(guest.demograph.name,guest_name);
   guest.save_profiles(guest_name);
   break;
}
case 'f': //load desc//
{
      char desc[80];
   char filename[80];

// Code
                    cout << "\nEnter filename:";
   cin >>filename;
   strcpy(desc,"../desc/");
       strcat(desc,filename);
              cout << "Loading " << desc << endl;
                     strcpy(program.filename,desc);
                  program.load_programs();
   break;
} case 'r': //recommend show//
case 'p': //pick show//
{
      int i,index=-1;
              int answer;
              double expect,conf,top=0;

if (input =='p')
   {
      //pick show at randomn//
      index = random(program.number_programs);
```

```
                        )
else if (input == 'r')
{
    top =0;
        for (i=0;i<program.number_programs;i++)
        {
        program.apd[i].score(guest,expect,conf);
                                    if ((expect>top)&&
            (program.apd[i].watched!=1)
            //&&(program.apd[i].program_time.is_on(*now))
            )
        {
                                top = expect;
                                index = i;
        }
        }
}
if (index >=0)
{
                        display_show(index,0);
    show_command("yes/no/skip");
                                input = getch();
                                switch (input)
                                {
                                    case 'y':  case 'Y': {answer=1;break;}
                                    case 'n':  case 'N': {answer=0;break;}
                                    default :            {answer=-1;}
                                }
program.apd[index].watched=1;
program.apd[index].score(guest,expect,conf);
#if DEBUG
cout        << "LearnTV rating: p="<< expect
            << " c="<< conf << endl;
#endif
if (((answer==1)&&(expect >0.5))||
    ((answer==0)&&(expect <0.5)))
{
    guess.yes++;
}
else if (((answer==1)&&(expect<0.5))||
        ((answer==0)&&(expect>0.5)))
{
    guess.no++;
}
#if DEBUG
cout << "LearnTV learning: p="<< guess.expectation()
        << " c=" << guess.confidence()<< endl;
#endif
// Send learntv result to disk
//output      << guess.expectation()
//            << "\t"
//            <<guess.confidence()
//            << "\n";

//adjust user profile//
if (answer != -1)
{
update_guest_profile(index,answer);
}
}
else
{
    show_title("OUT OF SHOWS!");
}
break;
} case 'v': //view profile//
{
```

```
                view_guest_profile(1);

break;
        }
        case 'V': //view profile//
        {
            view_guest_profile(2);

break;
        }
        case 'h': //view profile//
        {
                view_guest_history(guest);
            break;
        }
        case 'H': //view profile//
        {
                view_guest_history(proto);
            break;
        } case 't'://  show title
        {
                show_title("LEARNING TV");
                break;
        }
        case 'q':
        {
            show_title("QUITTING");
            cout <<"Press q again to quit - any other to return"<<endl;
            input=getch();
            clear_output();
            break;
        }
        default :
        {
                    cout << "\n unknown - enter ? for help"<<endl;
            }
        }
        }
    } void main(void)
{ randomize();
    // opening IR
    open_serial();
    #if LEARNTV
    // Setup graphics
    startup_graphics();
    #else if GRAPHICS
    init_genus_graphics();
    #endif // Return to Computer Screen
    #if DEBUG
    cout << "Initializing..." <<endl;
    #endif
    load_classes();
        user_selection();

//clean-up graphics
    cleanup_graphics();
    //clean up ir
    close_serial();
    exit(0);
```

APPENDIX B

```
    // Return to Computer Screen
}
```

We claim:

1. A method for presenting a selection of available programs to a user comprising:

determining initial user interest criteria; said user interest criteria comprising a plurality of program criteria; said user interest criteria further comprising positive and negative factor values for each of a plurality of said program criteria;

monitoring a user's program selection choices;

detecting said user's selection of a first selected program;

incrementing a positive factor value for criteria associated with said first selected program upon said user's selection of said first selected program;

detecting said user's selection of a second selected program prior to the end of said first selected program;

incrementing a positive factor value for criteria associated with said second selected program and incrementing a negative factor value for criteria associated with said first selected program upon said user's selection of said second selected program prior to the end of said first selected program;

ranking available programs according to said user interest criteria;

presenting said available programs to said user according to said ranking.

2. The method of claim 1 wherein said user interest criteria comprises a user profile.

3. The method of claim 1 wherein said user interest criteria comprises program content interest criteria.

4. The method of claim 1 wherein said user interest criteria comprises program title interest criteria.

5. The method of claim 1 further comprising:

augmenting said user interest criteria using collaborative user interest criteria.

6. The method of claim 1 wherein said programs comprise television programs.

7. The method of claim 1 wherein said programs comprise radio programs.

8. The method of claim 1 wherein said programs comprise audio or video programs recorded on digital storage media.

9. The method of claim 1 further comprising:

determining said available programs by consulting program schedule information retrieved from a program schedule information source.

10. The method of claim 9 wherein said program schedule information source is a site on the internet.

11. The method of claim 9 wherein said program schedule information source is a broadcast signal.

12. Program selection apparatus comprising:

a program access device for accessing a plurality of available programs;

a program output device for outputting a program to a user;

a controller coupled to said program access device and said program output device, said controller comprising:
a processor;
memory comprising available program description data and user interest criteria data, said user interest criteria data comprising a plurality of program criteria, said user interest criteria data further comprising positive and negative factor values for each of a plurality of said program criteria, said memory further comprising:

program code readable by said processor for monitoring a user's program selection choices;

program code readable by said processor for detecting said user's selection of a first selected program;

program code readable by said processor for incrementing a positive factor value for criteria associated with said first selected program upon said user's selection of said first selected program;

program code readable by said processor for detecting said user's selection of a second selected program prior to the end of said first selected program;

program code readable by said processor for incrementing a positive factor value for criteria associated with said second selected program and incrementing a negative factor value for criteria associated with said first selected program upon said user's selection of said second selected program prior to the end of said first selected program;

program code readable by said processor for ranking available programs according to said available program description data and said user interest criteria data and for instructing said program output device to present said available programs to said user according to said ranking.

13. The program selection apparatus of claim 12 wherein said user interest criteria comprises a user profile.

14. The program selection apparatus of claim 12 further comprising a user input device for providing user input.

15. The program selection apparatus of claim 14 wherein said memory further comprises program code readable by said processor for updating said user interest criteria based upon said user input.

16. The program selection apparatus of claim 12 further comprising a communications interface coupled to said controller.

17. The program selection apparatus of claim 12 wherein said user interest criteria comprises program content interest criteria.

18. The program selection apparatus of claim 12 wherein said user interest criteria comprises program title interest criteria.

19. The program selection apparatus of claim 16 wherein said memory further comprises program code readable by said processor for receiving augmented user interest criteria via said communications interface.

20. The program selection apparatus of claim 12 wherein said program access device comprises television program receiving apparatus.

21. The program selection apparatus of claim 12 wherein said program access device comprises radio program receiving apparatus.

22. The program selection apparatus of claim 12 wherein said program access device comprises a digital storage media player.

23. The program selection apparatus of claim 16 wherein said memory further comprises program code readable by said processor for receiving said program description data via said communications interface.

24. The program selection apparatus of claim 20 wherein said program access device comprises a decoder for extracting data from a vertical blanking interval of a television program signal.

25. The program selection apparatus of claim 12 wherein said program output device comprises loudspeakers.

26. The program selection apparatus of claim 12 wherein said program output device comprises a video monitor.

27. A program storage device readable by a machine, tangibly embodying a program of instructions executable by the machine to perform a method for presenting a selection of available programs to a user, said method comprising:

> determining initial user interest criteria; said user interest criteria comprising a plurality of program criteria; said user interest criteria further comprising positive and negative factor values for each of a plurality of said program criteria;
>
> monitoring a user's program selection choices;
>
> detecting said user's selection of a first selected program;
>
> incrementing a positive factor value for criteria associated with said first selected program upon said user's selection of said first selected program;
>
> detecting said user's selection of a second selected program prior to the end of said first selected program;
>
> incrementing a positive factor value for criteria associated with said second selected program and incrementing a negative factor value for criteria associated with said first selected program upon said user's selection of said second selected program prior to the end of said first selected program;
>
> ranking available programs according to said user interest criteria;
>
> presenting said available programs to said user according to said ranking.

28. The program storage device of claim 27 wherein said user interest criteria comprises a user profile.

29. The program storage device of claim 27 wherein said user interest criteria comprises program content interest criteria.

30. The program storage device of claim 27 wherein said user interest criteria comprises program title interest criteria.

31. The program storage device of claim 27 wherein said method further comprises:

> augmenting said user interest criteria using collaborative user interest criteria.

32. The program storage device of claim 27 wherein said programs comprise television programs.

33. The program storage device of claim 27 wherein said programs comprise radio programs.

34. The program storage device of claim 27 wherein said programs comprise audio or video programs recorded on digital storage media.

35. The program storage device of claim 27 wherein said method further comprises:

> determining said available programs by consulting program schedule information retrieved from a program schedule information source.

36. The program storage device of claim 35 wherein said program schedule information source is a site on the internet.

37. The program storage device of claim 35 wherein said program schedule information source is a broadcast signal.

* * * * *